US010788366B2

(12) United States Patent
Arbore et al.

(10) Patent No.: US 10,788,366 B2
(45) Date of Patent: Sep. 29, 2020

(54) OPTICAL SYSTEM FOR REFERENCE SWITCHING

(71) Applicant: Apple Inc., Cupertino, CA (US)

(72) Inventors: Mark Alan Arbore, Los Altos, CA (US); Gary Shambat, San Francisco, CA (US); Matthew A. Terrel, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/095,311

(22) PCT Filed: Apr. 13, 2017

(86) PCT No.: PCT/US2017/027353
§ 371 (c)(1),
(2) Date: Oct. 19, 2018

(87) PCT Pub. No.: WO2017/184420
PCT Pub. Date: Oct. 26, 2017

(65) Prior Publication Data
US 2019/0128734 A1 May 2, 2019

Related U.S. Application Data

(60) Provisional application No. 62/325,908, filed on Apr. 21, 2016.

(51) Int. Cl.
*G01J 3/02* (2006.01)
*G01J 3/10* (2006.01)
(Continued)

(52) U.S. Cl.
CPC ........ *G01J 3/0229* (2013.01); *G01J 3/0205* (2013.01); *G01J 3/0216* (2013.01); *G01J 3/0256* (2013.01);
(Continued)

(58) Field of Classification Search
CPC ...... G01J 3/0229; G01J 3/0216; G01J 3/0256; G01J 3/0294; G01J 3/108; G01J 3/36; G01J 3/42; G01N 21/25; G01N 2021/4711

See application file for complete search history.

(56) References Cited

U.S. PATENT DOCUMENTS 3,013,467 A 12/1961 Marvin
4,260,263 A * 4/1981 Kummer ............... G01N 33/10
356/323
(Continued)

FOREIGN PATENT DOCUMENTS

CN 101622566 A 1/2010
CN 102472664 5/2012
(Continued)

OTHER PUBLICATIONS

Final Office Action dated Nov. 30, 2018, for U.S. Appl. No. 15/529,451, filed May 24, 2017, 19 pages.
(Continued)

*Primary Examiner* — Dominic J Bologna
(74) *Attorney, Agent, or Firm* — Brownstein Hyatt Farber Schreck, LLP

(57) ABSTRACT

Systems and methods for determining one or more properties of a sample are disclosed. The systems and methods disclosed can be capable of measuring along multiple locations and can reimage and resolve multiple optical paths within the sample. The system can be configured with one-layer or two-layers of optics suitable for a compact system. The optics can be simplified to reduce the number and complexity of the coated optical surfaces, etalon effects, manufacturing tolerance stack-up problems, and interference-based spectroscopic errors. The size, number, and placement of the optics can enable multiple simultaneous or non-simultanous measurements at various locations across (Continued)

and within the sample. Moreover, the systems can be configured with an optical spacer window located between the sample and the optics, and methods to account for changes in optical paths due to inclusion of the optical spacer window are disclosed.

20 Claims, 24 Drawing Sheets

(51) Int. Cl.
     G01J 3/36      (2006.01)
     G01J 3/42      (2006.01)
     G01N 21/25     (2006.01)
     G01N 21/49     (2006.01)
     G01N 21/47     (2006.01)

(52) U.S. Cl.
     CPC ............ *G01J 3/0294* (2013.01); *G01J 3/10* (2013.01); *G01J 3/108* (2013.01); *G01J 3/36* (2013.01); *G01J 3/42* (2013.01); *G01N 21/25* (2013.01); *G01N 21/49* (2013.01); *G01N 2021/4711* (2013.01)

(56) References Cited

U.S. PATENT DOCUMENTS

| | | | |
|---|---|---|---|
| 4,300,167 A | 11/1981 | Miller | |
| 4,810,077 A | 3/1989 | Sting | |
| 4,827,125 A | 5/1989 | Goldstein | |
| 4,956,796 A | 9/1990 | Rogers | |
| 4,975,581 A | 12/1990 | Robinson et al. | |
| 5,065,008 A | 11/1991 | Hakamata et al. | |
| 5,220,403 A * | 6/1993 | Batchelder ......... | G01N 21/9505 250/358.1 |
| 5,475,235 A | 12/1995 | Phillips et al. | |
| 5,483,261 A | 1/1996 | Yasutake | |
| 5,488,204 A | 1/1996 | Mead et al. | |
| 5,737,078 A | 4/1998 | Takarada | |
| 5,818,629 A | 10/1998 | Kinoshita | |
| 5,825,352 A | 10/1998 | Bisset et al. | |
| 5,835,079 A | 11/1998 | Shieh | |
| 5,880,411 A | 3/1999 | Gillespie et al. | |
| 5,936,739 A | 8/1999 | Cameron et al. | |
| 5,946,100 A | 8/1999 | Ishihara | |
| 6,122,042 A | 9/2000 | Wunderman et al. | |
| 6,188,391 B1 | 2/2001 | Seely et al. | |
| 6,198,531 B1 | 3/2001 | Nielsen | |
| 6,236,459 B1 | 5/2001 | Negandaripour | |
| 6,310,610 B1 | 10/2001 | Beaton et al. | |
| 6,323,846 B1 | 11/2001 | Westerman et al. | |
| 6,353,226 B1 | 3/2002 | Khalil et al. | |
| 6,424,416 B1 * | 7/2002 | Gross ................. | G01J 3/02 356/326 |
| 6,519,033 B1 | 2/2003 | Quist et al. | |
| 6,587,703 B2 | 7/2003 | Cheng et al. | |
| 6,690,387 B2 | 2/2004 | Zimmerman et al. | |
| 6,794,658 B2 | 9/2004 | MacAulay et al. | |
| 6,999,183 B2 | 2/2006 | Nielsen et al. | |
| 7,015,894 B2 | 3/2006 | Morohoshi | |
| 7,075,046 B2 | 7/2006 | Kennedy | |
| 7,170,598 B2 | 1/2007 | Walla | |
| 7,184,064 B2 | 2/2007 | Zimmerman et al. | |
| 7,282,723 B2 | 10/2007 | Schomacker et al. | |
| 7,372,985 B2 | 5/2008 | So et al. | |
| 7,433,042 B1 | 10/2008 | Cavanaugh et al. | |
| 7,440,659 B2 | 10/2008 | Liu et al. | |
| 7,460,248 B2 | 12/2008 | Kurtz et al. | |
| 7,663,607 B2 | 2/2010 | Hotelling et al. | |
| 7,720,291 B2 | 5/2010 | Trifonov et al. | |
| 8,040,495 B2 | 10/2011 | Hendriks et al. | |
| 8,102,530 B2 * | 1/2012 | Sperling ............ | G01J 3/02 356/402 |
| 8,140,147 B2 | 3/2012 | Maynard et al. | |
| 8,479,122 B2 | 7/2013 | Hotelling et al. | |
| 8,518,643 B2 | 8/2013 | Rank et al. | |
| 8,547,535 B2 | 10/2013 | Tezuka et al. | |
| 8,619,237 B2 | 12/2013 | Hillman et al. | |
| 8,634,072 B2 | 1/2014 | Trainer | |
| 8,866,107 B2 | 10/2014 | Cui | |
| 8,958,858 B2 | 2/2015 | Tezuka et al. | |
| 9,013,684 B2 | 4/2015 | Xalter et al. | |
| 9,075,015 B2 | 7/2015 | Shapiro | |
| 9,395,293 B1 | 7/2016 | Acosta et al. | |
| 9,442,084 B2 | 9/2016 | Kakefuda et al. | |
| 9,494,535 B2 | 11/2016 | Sezginer | |
| 9,597,024 B2 | 3/2017 | Robinson et al. | |
| 10,274,426 B2 | 4/2019 | Arbore | |
| 10,551,605 B2 | 2/2020 | Arbore et al. | |
| 2004/0113059 A1 | 6/2004 | Kawano et al. | |
| 2004/0212866 A1 | 10/2004 | Endo et al. | |
| 2005/0200853 A1 * | 9/2005 | Mori ................. | G01N 21/7703 356/445 |
| 2006/0178570 A1 | 8/2006 | Robinson et al. | |
| 2006/0197753 A1 | 9/2006 | Hotelling | |
| 2007/0057211 A1 * | 3/2007 | Bahlman ............ | G01N 21/6452 250/584 |
| 2008/0124070 A1 | 5/2008 | Liang et al. | |
| 2009/0284835 A1 | 11/2009 | Meshulach | |
| 2009/0310132 A1 | 12/2009 | Bennett et al. | |
| 2011/0081064 A1 | 4/2011 | Hsu et al. | |
| 2011/0184260 A1 | 7/2011 | Robinson et al. | |
| 2012/0070817 A1 | 3/2012 | Wang et al. | |
| 2012/0140240 A1 | 6/2012 | Hillman et al. | |
| 2012/0147377 A1 | 6/2012 | Schleipen et al. | |
| 2012/0281258 A1 | 11/2012 | Sheblee et al. | |
| 2014/0043620 A1 | 2/2014 | Ishii et al. | |
| 2014/0192355 A1 | 7/2014 | Froigneux et al. | |
| 2016/0091368 A1 * | 3/2016 | Fish .................. | G01J 3/1895 356/328 |
| 2016/0202164 A1 * | 7/2016 | Trainer ............. | G01N 15/0211 356/336 |
| 2016/0299061 A1 * | 10/2016 | Goldring ............. | G01J 3/0275 |
| 2018/0017491 A1 | 1/2018 | Arbore | |
| 2018/0017772 A1 | 1/2018 | Arbore | |
| 2018/0039055 A1 | 2/2018 | Arbore | |
| 2019/0204221 A1 | 7/2019 | Arbore | |

FOREIGN PATENT DOCUMENTS

| | | |
|---|---|---|
| CN | 102803930 | 11/2012 |
| EP | 0 168 983 A1 | 1/1986 |
| EP | 0 943 950 A1 | 9/1999 |
| JP | 2000-163031 A | 6/2000 |
| JP | 2002-342033 A | 11/2002 |
| JP | 2014163895 | 9/2014 |
| KR | 10-2009-0116731 A | 11/2009 |
| WO | WO-2006/086566 A2 | 8/2006 |
| WO | WO-2016/106350 A1 | 6/2016 |
| WO | WO-2016/106368 A1 | 6/2016 |
| WO | WO-2016/109355 A1 | 7/2016 |

OTHER PUBLICATIONS

Chinese Search Report dated Jun. 24, 2019, for CN Application No. 201580065112.8, filed Dec. 22, 2015, with English translation, five pages.
Notice of Allowance dated Jul. 24, 2019, for U.S. Appl. No. 15/717,573, filed Sep. 27, 2017, seven pages.
Non-Final Office Action dated May 1, 2019, for U.S. Appl. No. 15/529,451, filed May 24, 2017, 20 pages.
Non-Final Office Action dated Mar. 19, 2019, for U.S. Appl. No. 15/717,573, filed Sep. 27, 2017, 8 pages.
Notice of Allowance dated Dec. 14, 2018, for U.S. Appl. No. 15/717,651, filed Sep. 27, 2017, 8 pages.
Aguirre, A. D. et al. (Feb. 17, 2010). "High speed optical coherence microscopy with autofocus adjustment and a miniaturized endoscopic imaging probe," Optical Society of America, vol. 18, No. 5, Retrieved from the Internet: URL:http://www.ncbi.nlm.nih.gov/pmc/articles/PMC2908909/pdf/oe-18-5-4222.pdf , retrieved on Oct. 31, 2014, figures 1, 7, p. 4226-4235. (21575.40 ISR).

(56) References Cited

OTHER PUBLICATIONS

International Search Report dated Apr. 1, 2016, for PCT Application No. PCT/US2015/067445, filed Dec. 22, 2015, five pages. (21573.40).

International Search Report dated Apr. 5, 2016, for PCT Application No. PCT/US2015/067480, filed Dec. 22, 2015, four pages. (21575.40).

International Search Report dated Apr. 25, 2016, for PCT Application No. PCT/US2015/067463, filed Dec. 22, 2015, five pages. (21574.40).

Ke, S. et al. (Feb. 10, 2009) "Three-dimensional coherent transfer function for a confocal microscope with two D-shaped pupils," Applied Optics, Optical Society of America, Washington, DC; US, vol. 48, No. 5, pp. 810-817. (21753.40 ISR).

Kurugol, S. et al. (2011). "Semi-automated Algorithm for Localization of Dermal/Epidermal Junction in Reflectance Confocal Microscopy Images of Human Skin," Proc. of SPIE, vol. 7904, ten pages. (Anonymous. (2011). Spie, PO Box 10 Bellingham, WA, 98227-0010, USA. (21575.40 cited as above in ISR).

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Apr. 6, 2018, for U.S. Appl. No. 15/529,451, filed May 24, 2017, 22 pages. (21575.00).

Non-Final Office Action dated May 15, 2018, for U.S. Appl. No. 15/717,651, filed Sep. 27, 2017, 15 pages. (21574.01).

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Sayli et al., "Two-distance partial pathlength method for accurate measurement of muscle oxidative metabolism using fNIRS," Proceeding of SPIE, Bellingham, Washington USA, vol. 6084, 2006, 8 pages.

* cited by examiner

OPTICAL SYSTEM FOR REFERENCE SWITCHING

CROSS-REFERENCE TO RELATED APPLICATIONS

This application is a National Phase Patent Application under 35 U.S.C. § 371 of International Application No. PCT/US2017/027353, filed Apr. 13, 2017, and claims priority to U.S. Provisional Patent Application Ser. No. 62/325,908 filed Apr. 21, 2016, which are hereby incorporated by reference in their entirety.

FIELD

This relates generally to a reference switch architecture capable of detecting one or more substances in a sample, and more particularly, capable of reimaging one or more optical paths in the sample.

BACKGROUND

Absorption spectroscopy is an analytical technique that can be used to determine one or more properties of a sample. Conventional systems and methods for absorption spectroscopy can include emitting light into the sample. As light transmits through the sample, a portion of the light energy can be absorbed at one or more wavelengths. This absorption can cause a change in the properties of light exiting the sample. The properties of light exiting the sample can be compared to the properties of light exiting a reference, and the one or more properties of the sample can be determined based on this comparison.

The properties of light exiting the sample can be determined using measurements from one or more detector pixels. Measurements along multiple locations within the sample may be useful for accurate determination of one or more properties in the sample. These multiple locations can be at different locations in the sample, which can lead to optical paths with different path lengths, angle of incidence, and exit locations. However, some conventional systems and methods may not be capable of discerning differences in path lengths, depths of penetration, angles of incidence, exit locations, and/or exit angles from measurements along multiple locations within the sample. Those systems and methods that can be capable of measurements at multiple depths or multiple locations can require complicated components or detection schemes to associate optical paths incident on the multiple locations within the sample. These complicated components or detection schemes may not only limit the accuracy of reimaging and resolving the multiple optical paths, but can also place limits on the size and/or configuration of the optical system. Thus, a compact optical system capable of accurately reimaging and resolving multiple optical paths within a sample may be desired.

SUMMARY

This relates to systems and methods for measuring one or more properties of a sample. The systems can include a light source, optic(s), reference, detector array, and controller (and/or logic). The systems and methods disclosed can be capable of measuring one or more properties at multiple locations within the sample. The systems and methods can reimage and resolve multiple optical paths within the sample, including selecting a targeted (e.g., pre-determined) measurement path length such that the spectroscopic signal quality measured by the detector can accurately represent one or more properties of the sample. The system can be configured with one-layer or two-layers of optics suitable for a compact (e.g., less than 1 $cm^3$ in volume) system. The optics can be simplified to reduce the number and complexity of the coated optical surfaces, etalon effects, manufacturing tolerance stack-up problems, and interference-based spectroscopic errors. The optics can be formed such that the number of moving parts can be reduced or moving parts can be avoided, and robustness can be enhanced. Furthermore, the size, number, and placement of the optics can enable multiple simultaneous or non-simultaneous measurements at various locations across and within a sample, which can reduce the effects of any heterogeneity in the sample. Moreover, the systems can be configured with an optical spacer window located between the sample and the optics, and methods to account for changes in optical paths due to inclusion of the optical spacer window are disclosed.

DETAILED DESCRIPTION

Figure 1A:
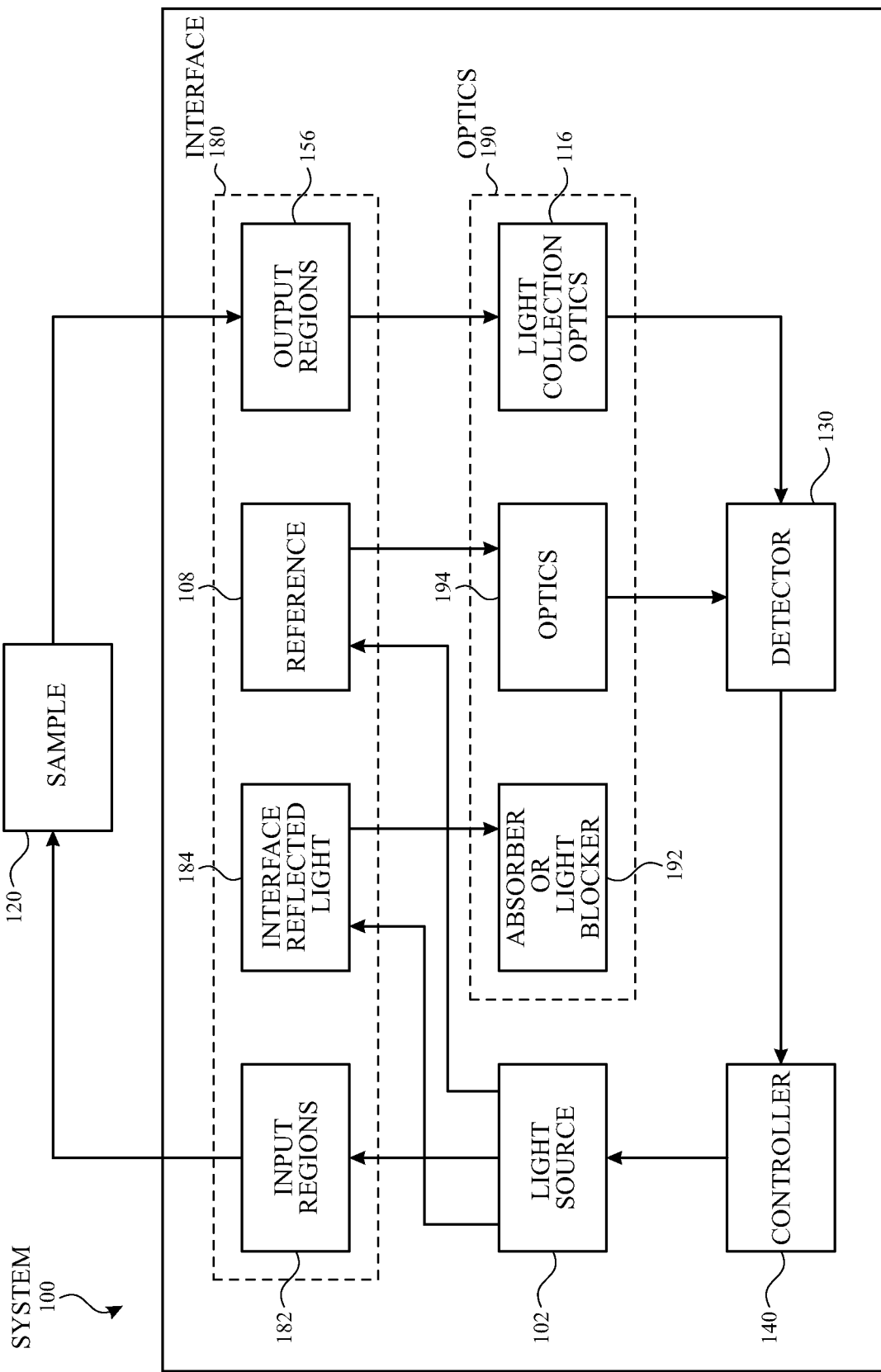
FIG. 1A illustrates a block diagram of an exemplary system capable of measuring one or more properties located at multiple locations within a sample according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

This disclosure relates to systems and methods for determining one or more properties of a sample. The systems can include a light source, optics, reference, detector array, and controller (and/or logic). The systems and methods disclosed can be capable of measuring along multiple locations within the sample to determine the one or more properties. The systems and methods can reimage and resolve multiple optical paths within the sample, including selecting a targeted (e.g., pre-determined) measurement path length such that the spectroscopic signal quality measured by the detector can accurately represent the one or more properties of the sample. The system can be configured with one-layer or two-layers of optics suitable for a compact (e.g., less than 1 $cm^3$ in volume) system. The optics can be simplified to reduce the number and complexity of the coated optical surfaces, etalon effects, manufacturing tolerance stack-up problems, and interference-based spectroscopic errors. The optics can be formed such that the number of moving parts can be reduced or moving parts can be avoided, and robustness can be enhanced. Furthermore, the size, number, and placement of the optics can enable multiple simultaneous or non-simultaneous measurements at various locations across and within a sample, which can reduce the effects of any heterogeneity in the sample. Moreover, the systems can be configured with an optical spacer window located between the sample and the optics, and methods to account for changes in optical paths due to inclusion of the optical spacer window are disclosed.

Absorption spectroscopy is an analytical technique that can be used to determine one or more properties of a sample. Light can have an initial intensity or energy when emitted from a light source and incident on the sample. As light is transmitted through the sample, a portion of the energy can be absorbed at one or more wavelengths. This absorption can cause a change (or loss) in the intensity of light exiting the sample. Light exiting the sample can be due to light that scatters from one or more locations within the sample, wherein the location can include a substance of interest. In some examples, the substance of interest can be present in some or all of the path of light into and/or out of the sample, where the measured absorbance can include absorption at one or more regions where the light scatters. The amount of light exiting the sample can decrease exponentially as the concentration of the substance of interest in the sample increases. In some examples, the substance can include one or more chemical constituents, and the measurement can be used to determine the concentration of each chemical constituent present in the sample.

Figure 1B:
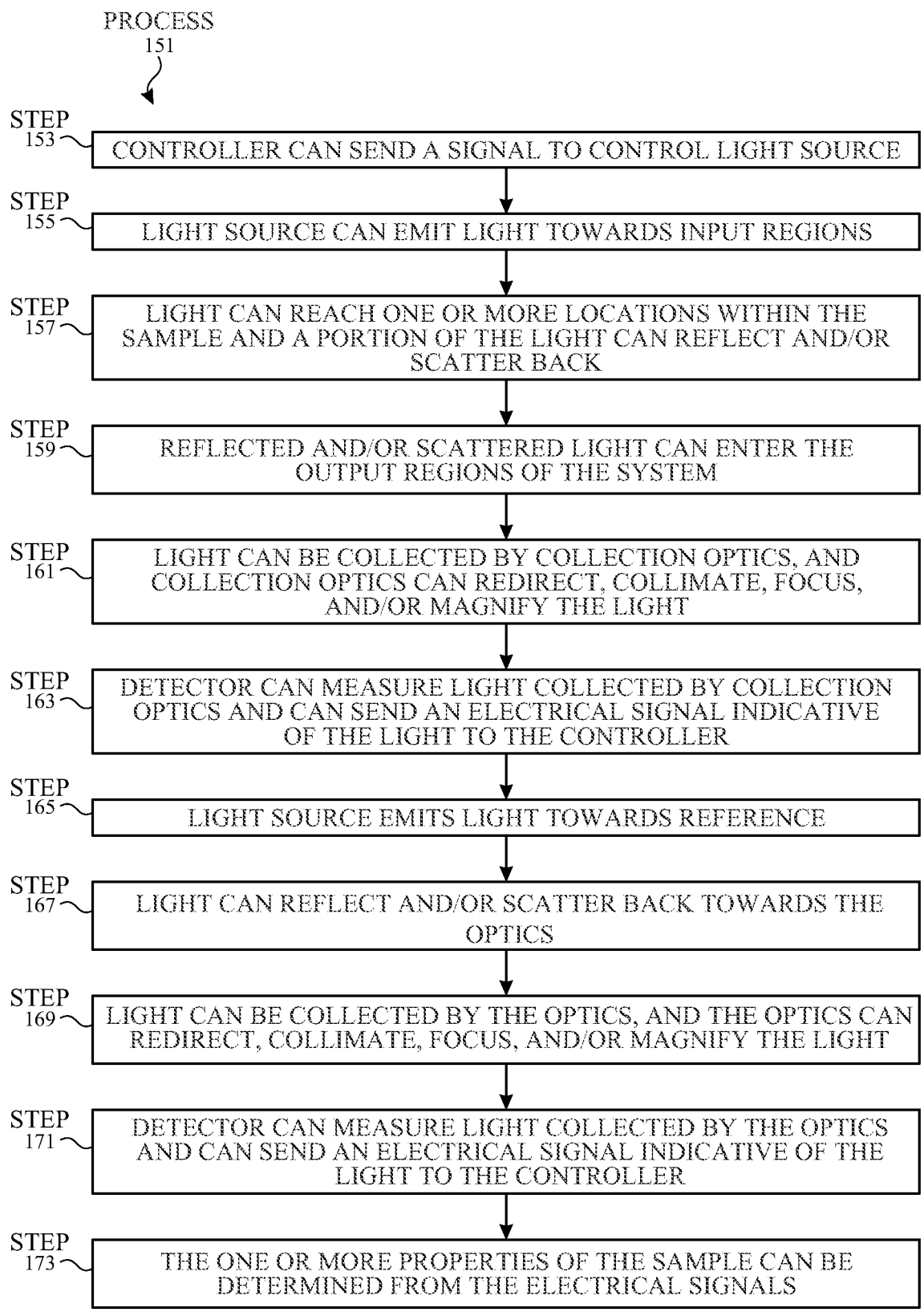
FIG. 1B illustrates an exemplary process flow for measuring one or more properties located at multiple locations within a sample according to examples of the disclosure.

FIG. 1A illustrates a block diagram of an exemplary system and FIG. 1B illustrates an exemplary process flow for measuring one or more substances located at multiple locations within the sample according to examples of the disclosure. System 100 can include interface 180, optics 190, light source 102, detector 130, and controller 140. Interface 180 can include input regions 182, interface reflected light 184, reference 108, and output regions 156. In some examples, input regions 182 and/or output regions 156 can include an aperture layer including one or more openings configured to limit the location and/or angles of light exiting and/or entering the system. By limiting the location and/or angles of light exiting and/or entering the system, the light incident on or exiting from sample 120 can also be limited. Optics 190 can include an absorber or light blocker 192, optics 194 (e.g., a negative micro-lens), and light collection optics 116 (e.g., a positive microlens). Sample 120 can be located near, close to, or touching at least a portion of system 100. Light source 102 can be coupled to controller 140. Controller 140 can send a signal (e.g., current or voltage waveform) to control light source 102 to emit light towards the surface of sample 120 (step 153 of process 151). Depending on whether the system is measuring the one or more properties of the sample or of the reference, light source 102 can emit light towards input regions 182 (step 155 of process 151) or reference 108.

Input regions 182 can be configured to allow light to exit system 100 to be incident on sample 120. Light can penetrate a certain depth into sample 120 and can reflect and/or scatter back towards system 100 (step 157 of process 151). The reflected and/or scattered light can enter back into system 100 at output regions 156 (step 159 of process 151). The reflected and/or scattered light that enters back into system 100 can be collected by light collection optics 116, which can redirect, collimate, focus, and/or magnify the reflected and/or scattered light (step 161 of process 151). The reflected and/or scattered light can be directed towards detector 130. Detector 130 can detect the reflected and/or scattered light and can send an electrical signal indicative of the light to controller 140 (step 163 of process 151).

Light source 102 can, additionally or alternatively, emit light towards reference 108 (step 165 of process 151). Reference 108 can reflect light towards optics 194 (step 167 of process 151). Reference 108 can include, but is not limited to, a mirror, a filter, and/or a sample with known optical properties. Optics 194 can redirect, collimate, focus, and/or magnify light towards detector 130 (step 169 of process 151). Detector 130 can measure light reflected from reference 108 and can generate an electrical signal indicative of this reflected light (step 171 of process 151). Controller 140 can be configured to receive both the electrical signal indicative of light reflected/scattered from sample 120 and the electrical signal indicative of light reflected from reference 108 from detector 130. Controller 140 (or another processor) can determine one or more properties of the sample from the electrical signals (step 173 of process 151).

In some examples, when the system is measuring the one or more substances in the sample and in the reference, light emitted from the light source 102 can reflect off a surface of the sample back into system 100. Light reflected off the exterior interface of the system (e.g., interface where the system contacts the sample) can be referred to as interface reflected light 184. In some examples, interface reflected light 184 can be light emitted from light source 102 that has not reflected off sample 120 or reference 108 and can be due to light scattering. Since interface reflected light 184 can be unwanted, absorber or light blocker 192 can prevent interface reflected light 184 from being collected by optics 194 and light collection optics 116, which can prevent interface reflected light 184 from being measured by detector 130.

Figure 2:
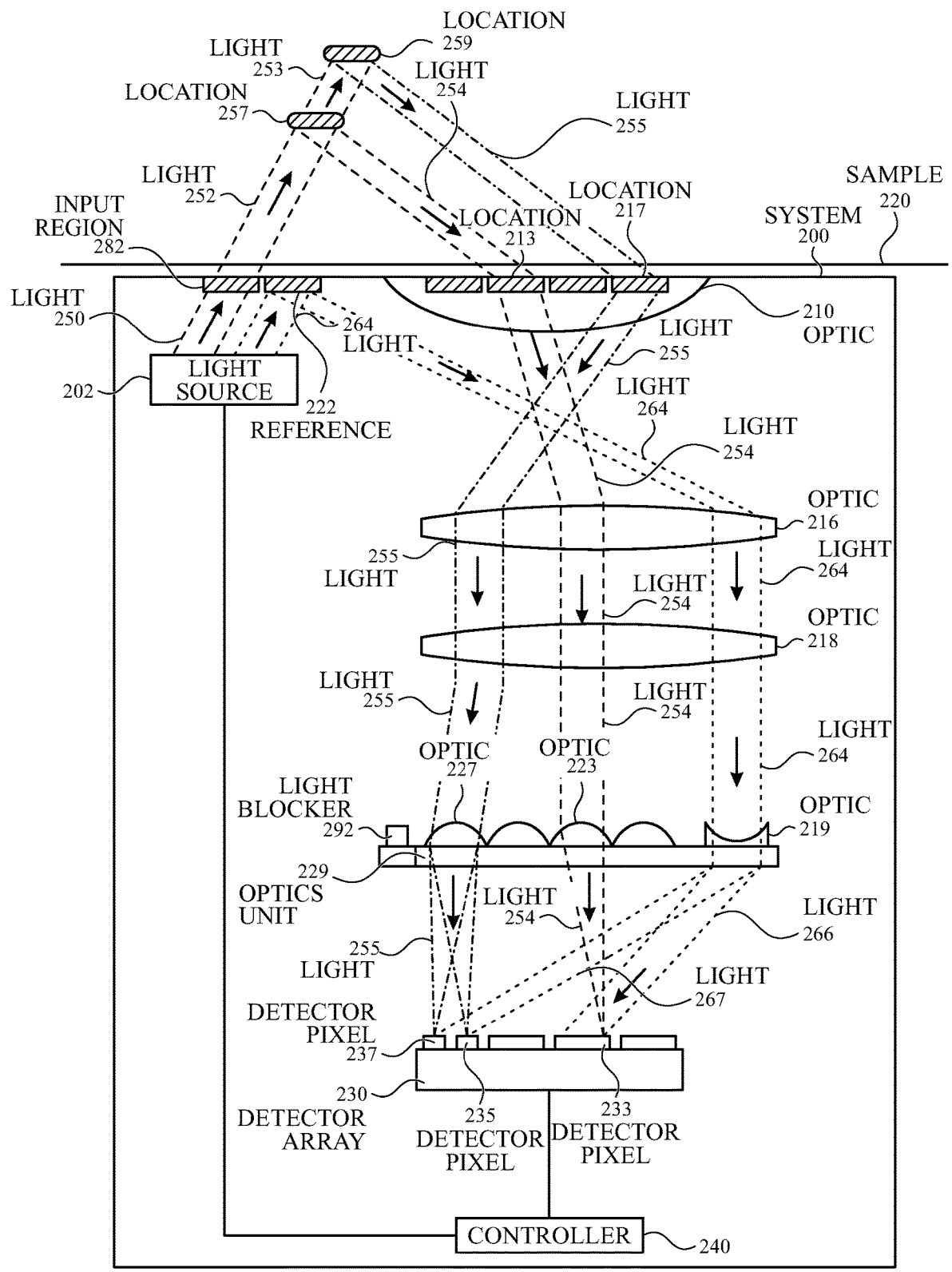
FIG. 2 illustrates a cross-sectional view of an exemplary system configured to determine one or more properties of a sample according to examples of the disclosure.

FIG. 2 illustrates a cross-sectional view of an exemplary system configured to determine one or more properties of a sample according to examples of the disclosure. System 200 can be close to, touching, resting on, or attached to sample 220. Sample 220 can include one or more locations, such as location 257 and location 259. System 200 can include a light source 202. Light source 202 can be configured to emit light 250. Light source 202 can be any source capable of generating light including, but not limited to, a lamp, laser, light emitting diode (LED), organic light emitting diode (OLED), electroluminescent (EL) source, quantum dot (QD) light emitter, super-luminescent diode, super-continuum source, fiber-based source, or a combination of one or more of these sources. In some examples, light source 202 can be capable of emitting a single wavelength of light. In some examples, light source 202 can be capable of emitting a plurality of wavelengths of light. In some examples, light source 202 can be any tunable source capable of generating a SWIR signature. In some examples, a plurality of light sources can be included in the system with each light source 202 emitting a different wavelength range of light (e.g., different colors in the spectrum). In some examples, light source 202 can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Indium Arsenide (AlInAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Indium Arsenide Antimonide Phosphide (GaInAsSbP).

System 200 can include input region 282 located close to or near sample 220 or an external surface of the system. Input region 282 can include one or more transparent components including, but not limited to, a window, an optical shutter, or a mechanical shutter.

Light 250 can exit system 200 through input region 282. In some examples, light 250 can be a collimated beam. Light that exits system 200 and travels through sample 220 to location 257 can be referred to as light 252. Light 252 can be incident on location 257 at any angle including, but not limited to, 45°. In some examples, light 252 can have an angle of incidence at location 257 between 20° to 30°. In some examples, light 252 can have an angle of incidence at location 257 of 35°. Location 257 can include one or more properties of sample 220. Light 252 can be partially absorbed prior to reaching location 257, at location 257, and/or after being partially reflected and/or scattered at location 257, and can be referred to as light 254. In some examples, light 254 can be formed by light transmitting through sample 220. Light 254 can penetrate through sample 220 and can enter system 200 at location 213 of optic 210. In some examples, optic 210 can be in contact or near sample 220. In some examples, optic 210 can be any type of optical component such as a window. In some examples, optic 210 can be any optical component, such as a lens, capable of changing the behavior and properties of the incoming light. In some examples, optic 210 can include a transparent material. Optic 210 can include a plurality of locations, including location 213 and location 217, where light can be allowed to enter. In some examples, optic 210 can be a lens configured with a large aperture (e.g., an aperture larger than the size of the incoming light beam) and a short focal length (e.g., the focal length can be such that a sample within 10 mm proximity to the system is in focus). In some examples, optic 210 can be a Silicon lens or a lens including silicon dioxide.

System 200 can include optics to magnify or reimage the incoming light beam. The optics in system 200 can be capable of reimaging the optical paths including path lengths, angles of incidences, and exit locations to another plane closer to the detector array 230. To reduce the differences in any fluctuations, drifts, and/or variations between a light path (e.g., light 252 or light 253) penetrating through sample 220 and a light path reflecting off a reference 222 (e.g., a reflector), system 200 can share the optics between the two different light paths. System 200 can include optic 210, optic 216, and/or optic 218 for reimaging both light that has penetrated and light that has not penetrated through sample 220. In some examples, optic 216 and optic 218 can be configured such that a reimage of the incident optical paths at the exterior interface of the system (e.g., interface where the system contacts the sample) can be reimaged onto another plane (e.g., plane where detector array 230 is located) without magnification. In some examples, optic 216 and optic 218 can be configured such that a magnification, such as a 2.5×-5× magnification, is introduced into the image.

Light 254 can be transmitted through optic 216 and optic 218 and can be incident on optic 223. Optic 223 can be included in optics unit 229. Optics unit 229 can comprise a plurality of optics, such as optic 223 and optic 227, attached to a substrate. In some examples, the optics can be of any type and can include any type of material conventionally used in optics. In some examples, two or more of the optics can have the same optical (e.g., reflectance, refractive index, and transparency range) and/or geometric properties (e.g., curvature/focal length or pitch). One skilled in the art would appreciate that the same optical properties and the same geometric properties can include tolerances that result in a 15% deviation. In some examples, optics unit 229 can be coupled to one or more aperture layers. In some examples, optics unit 229 can be coupled to a patterned aperture layer, such as an aperture layer including locations between adjacent optics are opaque to prevent light mixing.

Light 254 can be transmitted through optic 223, and optic 223 can converge light 254 to be detected by detector pixel 233 included in detector array 230. In some examples, optic 223 can converge light 254 to a center location (not shown) or an edge location of the detector pixel. Detector array 230 can include one or more detector pixels, such as detector pixel 233, detector pixel 235, and detector pixel 237, disposed on a substrate. A detector pixel can include one or more detector elements with a common footprint (e.g., same size and shape). A detector element can be an element designed to detect the presence of light and can individually generate a signal representative of the detected light. In some examples, at least one detector pixel can be independently controlled (e.g., measured, observed, or monitored) from other detector pixels in detector array 230. In some examples, at least one detector pixel can be capable of detecting light in the short-wave infrared (SWIR) range. In some examples, at least one detector pixel can be a SWIR detector capable of operating between 2.0-2.5 µm. In some examples, at least one detector pixel can be a HgCdTe, InSb, or InGaAs based detector. In some examples, at least one detector pixel can be associated with a particular sample position and/or angle of light incident on a surface of system 200. Detector pixel 233 can detect light 254 and can generate an electrical signal indicative of the properties of detected light 254. Detector array 230 can transmit the electrical signal to controller 240, and controller 240 can process and/or store the electrical signal.

System 200 can determine one or more properties of sample 220 by utilizing the information from light reflected from the sample in conjunction with information from light reflecting off a reference 222, such as a reflector. Light source 202 can emit light 264. Light 264 can be directed at reference 222. Reference 222 can include any type of material capable of at least partially reflecting incident light. Exemplary reflective materials can include, but are not limited to, Titanium (Ti), Cobalt (Co), Niobium (Nb), Tungsten (W), Nickel Chrome (NiCr), Titanium Tungsten (TiW), Chrome (Cr), Aluminum (Al), Gold (Au), and Silver (Ag). In some examples, reflective materials can include one or more dielectric layers. One or more properties (e.g., thickness) of reference 222 can be determined based on the wavelength of light, type of material, and/or composition of reference 222. In some examples, the size and shape of reference 222 can be configured to be larger or the same size and/or shape of light beam of light 264. One skilled in the art would appreciate that the same size and shape can include tolerances that result in a 15% deviation. In some examples, the optical and/or physical properties of reference 222 can be such that the reflectivity of light 264 is greater than 75%. In some examples, the optical and/or physical properties of reference 222 can be such that the reflectivity of light 264 can be greater than 90%. In some examples, the size and shape of reference 222 can be such that less than 15% of light 264 is allowed to transmit through the reference 222 and light 264 is prevented from reaching sample 220. In some examples, the reference 222 can be configured to reflect light 264 as a specular reflection. In some examples, reference 222 can be a spectroscopically neutral blocker. In some examples, the reference signal can include chopping light 264 between light 252 entering sample 220 and light 264 incident on reference 222. Although FIG. 2 illustrates reference 222 as located at the exterior interface of the system (e.g., interface where the system contacts the sample), examples of the disclosure can include the reference located at other locations including, but not limited to, an interior wall of the system, a side of the optics, and the like.

Light 264 can reflect off reference 222 towards optic 216. Light 264 can be transmitted through optic 216 towards optic 218. Light 264 can be transmitted through optic 218 and can be incident on optic 219, included in optics unit 229. Optic 219 can be any type of optics configured for spreading out the incoming light beam. In some examples, optic 219 can be a negative lens, which can be a lens with a focal length that is negative. In some examples, optic 219 can be a prism. In some examples, optic 219 can include a prism wedge angled for each detector pixel in detector array 230. In some examples, optic 219 can be a beamsplitter. In some examples, optic 219 can be configured to spread out or divide light into multiple beams, such as light 266 and light 267. In some examples, optic 219 can spread out light such that each light beam can be directed to a different detector pixel in detector array 230. In some examples, optic 219 can uniformly spread out light such that the properties of each light beam can be the same. One skilled in the art would appreciate that the same properties can include tolerances that result in a 15% deviation. In some examples, optic 219 can spread out light such that intensities of at least two light beams are different. In some examples, optic 219 can comprise multiple optics. In some examples, the size and/or shape of optic 219 can be based on the number of detector pixels that light is spread to, the properties of the one or more light beams exiting optic 219, or both. In some examples, an aperture layer can be coupled to optic 219 to control the properties and/or direction of light exiting optic 219. In some examples, optic 219 or system 200 can be configured such that light that reflects off a surface of the sample back into the system (i.e., light that has not penetrated through sample 220) is prevented from being incident on optic 219, although stray light or background light can be incident on optic 219.

Light 264 can transmit through optic 219 to form light 266. Light 266 can be incident on detector pixel 233. Detector pixel 233 can detect light 266 and can generate an electrical signal indicative of the properties of detected light 266. In some examples, the number of detector pixels configured to detect a light beam can be different for different light beams. For example, light 255 can be detected by two detector pixels (e.g., detector pixel 235 and detector pixel 237), while light 254 can be detected by one detector pixel (e.g., detector pixel 233). The electrical signal can be transmitted from detector array 230 to controller 240. Controller 240 can process and/or store the electrical signal. Controller 240 can utilize the signal information measured from light 254 to determine the reflectivity or one or more sample properties along the light path directed to location 257 and can utilize the signal information from light 266 to detect any fluctuations or drift in light source 202 and/or detector array 230. Using any of the above discussed methods, controller 240 can process the electrical signal and the signal information to determine the one or more properties of sample 220.

The same components in system 200 can be used for measurements at other locations, such as location 259, in sample 220. Light 252 that is not absorbed or reflected along the light path directed to location 257 can be referred to as light 253. Light 253 can be incident on location 259 and can reflect and/or scatter into system 200 as light 255. In some examples, the angle of incidence of light 255 at the surface of system 200 can be different from the angle of incidence of light 254. Light 255 can enter system 200 through optic 210 at location 217. Light 255 can be transmitted through optic 216 and optic 218 and can be incident on optic 227, included in optics unit 229. Light 255 can be transmitted through optic 227, and optic 227 can converge, redirect, collimate, focus, and/or magnify light such that light 255 is detected by detector pixel 235 and detector pixel 237, included in detector array 230. Detector pixel 235 and detector pixel 237 can detect light 255 and can generate electrical signals indicative of the properties of detected light 255. In some examples, optic 227 can converge, redirect, collimate, focus, and/or magnify light such that light 255 is incident on a center location or an edge location of the detector pixel. Any number of detector pixels can be configured to detect a light beam. Detector array 230 can transmit the electrical signal to controller 240. Controller 240 can process and/or store the electrical signal.

Controller 240 can utilize the signal information measured from light 255 to determine one or more properties of sample 220 and can utilize the signal information from light 267 to detect any fluctuations or drift in light source 202 and/or detector array 230. In some examples, controller 240 can detect light 266 incident on detector pixel 233 and light 267 incident on detector pixel 235 and/or detector pixel 237 simultaneously without the need for separate measurements. In some examples, location 257 and location 259 can have the same depth from the surface of sample 220 or the exterior interface of the system (e.g., interface where the system contacts the sample). One skilled in the art would appreciate that the same depth can include tolerances that result in a 15% deviation. In some examples, location 257 and location 259 can have different depths from the surface of sample 220. Controller 240 can measure the reflectivity, refractive index, density, concentration, scattering coefficient, scattering anisotropy, or absorbance at both location 257 and location 259 and can average the values.

Although the figure and discussion above relates to two locations in the sample, examples of the disclosure can include any number of locations and are not limited to one or two locations. In some examples, light can be incident on the multiple locations at the same angle of incidence. In some examples, the light source can be configured to generate one light beam exiting the system that results in multiple input light beams reflected and/or scattered back into the system. In some examples, the system can be configured with one or more light sources that emit light at locations with different angles of incidence, where the light can be emitted at the same time or at different times.

In some examples, system 200 can further include a light blocker 292. Light blocker 292 can include any material capable of absorbing or blocking light. In some examples, light blocker 292 can include any material (e.g., an anti-reflection coating) that prevents incident light from reflecting. That is, light blocker 292 can prevent unwanted light from reaching and being measured by detector array 230. In some examples, light blocker 292 can include any material that reflects at wavelengths different from the detection wavelengths of detector array 230.

As illustrated in the figure, system 200 can include a plurality of optics and a plurality of detector pixels, where each optic can be associated to one or a plurality of detector pixels. Each optics-detector pixel pair can be associated with an optical path in sample 220. In some examples, the association can be one optics-detector pixel pair to one optical path in sample 220. For example, optic 223 and detector pixel 233 can be associated with the optical path from light 254, and optic 227 and detector pixel 237 can be associated with the optical path from light 255. Since controller 240 can associate detector pixel 233 and detector pixel 237 with different locations (e.g., location 257 and location 259) and/or different light paths in sample 220, controller 240 can discern differences in path lengths, depths of penetration, angles of incidence, exit locations, and/or exit angles.

Figure 3:
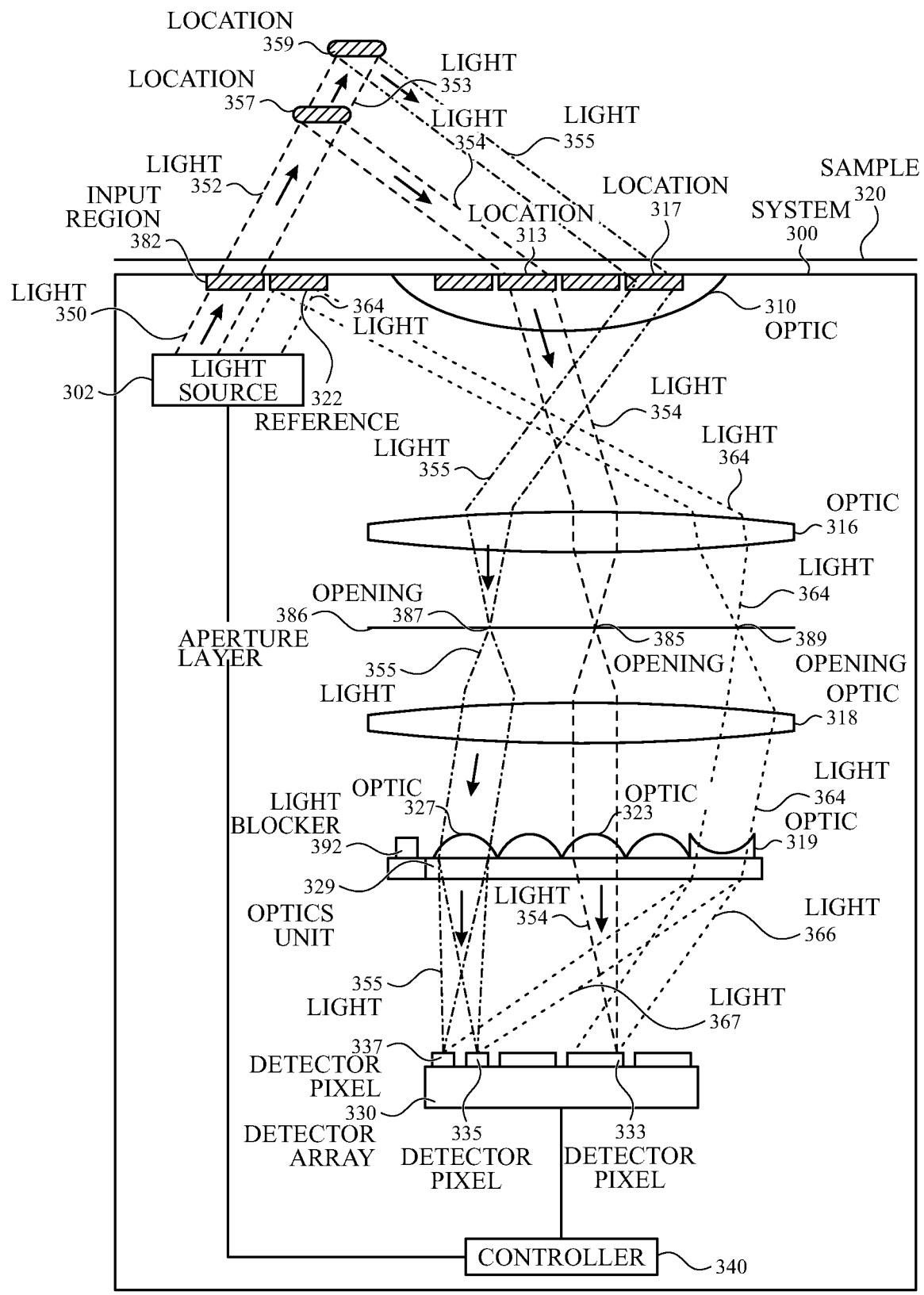
FIG. 3 illustrates a cross-sectional view of an exemplary system configured to determine one or more properties of a sample according to examples of the disclosure.

FIG. 3 illustrates a cross-sectional view of an exemplary system configured to determine one or more properties of a sample according to examples of the disclosure. System 300 can be close to, touching, resting on, or attached to a surface of sample 320. Sample 320 can include one or more locations, such as location 357 and location 359. In some examples, the one or more locations can be associated with one or more scattering events.

System 300 can include a light source 302. Light source 302 can be configured to emit light 350. Light source 302 can be configured to emit light 350. Light source 302 can be any source capable of generating light including, but not limited to, a lamp, laser, light emitting diode (LED), organic light emitting diode (OLED), electroluminescent (EL) source, quantum dot (QD) light emitter, super-luminescent diode, super-continuum source, fiber-based source, or a combination of one or more of these sources. In some examples, light source 302 can be capable of emitting a single wavelength of light. In some examples, light source 302 can be capable of emitting a plurality of wavelengths of light. In some examples, light source 302 can be any tunable source capable of generating a SWIR signature. In some examples, a plurality of light sources can be included in the system with each light source 302 emitting a different wavelength range of light (e.g., different colors in the spectrum). In some examples, light source 302 can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Indium Arsenide (AlInAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Indium Arsenide Antimonide Phosphide (GaInAsSbP).

System 300 can also include an input region 382 located close to or near sample 320 or an external surface of the system. Input region 382 can include one or more transparent components including, but not limited to, a window, optical shutter, or mechanical shutter.

Light 350 can exit system 300 through input region 382. In some examples, light 350 can be a collimated beam. Light that exits system 300 and travels through sample 320 to location 357 can be referred to as light 352. Light 352 can be incident on location 357 at any angle including, but not limited to, 45°. In some examples, light 352 can have an angle of incidence at location 357 between 20° to 30°. In some examples, light 352 can have an angle of incidence at location 357 of 35°. Location 357 can include one or more properties of sample 320. Light 352 can be partially absorbed prior to reaching location 357, at location 357, and/or after being partially reflected and/or scattered at location 357, and can be referred to as light 354. In some examples, light 354 can be formed by light transmitting through sample 320. Light 354 can penetrate through sample 320 and can enter system 300 at location 313 of optic 310. In some examples, optic 310 can be in contact or near sample 320. Optic 310 can be any type of optical component, such as a lens, capable of changing the behavior and properties of the incoming light. Optic 310 can include a plurality of locations, such as location 313 and location 317, where light exiting sample 320 is allowed to enter into system 300. In some examples, optic 310 can include a transparent material. In some examples, optic 310 can be a lens configured with a large aperture (e.g., an aperture larger than the size of the incoming light beam) and a short focal length (e.g., the focal length can be such that a sample 220 within 10 mm proximity to system is in focus). In some examples, optic 310 can be a Silicon lens or a lens including silicon dioxide.

System 300 can include optics, such as optic 316 and optic 318. In some examples, optic 316 and optic 318 can be objective lenses. An objective lens is a lens capable of collecting incident light and magnifying the light beam, while having a short focal length. Optic 316 can collect light 354 and direct light 354 towards opening 385 included in aperture layer 386. Aperture layer 386 can include one or more openings, such as opening 385 and opening 387, configured to allow light to transmit through. Aperture layer 386 can be capable of selecting light with one or more specific path lengths, angles of incidence, or both and rejecting or attenuating light with other path lengths or angles of incidence. Selection and rejection of light based on path length, angle of incidence, or both can be optimized by adjusting the aperture size (i.e., the size of an opening in the aperture layer). The selected light (i.e., light with one or more specific path lengths, angles of incidence, or both) can be in focus when it reaches an opening in the aperture layer, and rejected light can be out of focus. Light that is out of focus can have a beam size that is larger than the aperture size, can have an angle of incidence that is outside the collection range, or both, and therefore can be rejected. Light that is in focus can have a light beam that is within a range of path lengths and range of collection angles, and therefore can be allowed to transmit through the aperture layer.

Light 354 exiting opening 385 in aperture layer 386 can be transmitted through optic 318 and can be incident on optic 323. Optic 323 can be included in optics unit 39. Optics unit 39 can comprise a plurality of optics, such as optic 323 and optic 327, attached to a substrate. In some examples, the optics can be of any type and can include any type of material conventionally used in optics. In some examples, two or more of the optics can have the same optical and/or geometric properties. One skilled in the art would appreciate that the same optical properties and the same geometric properties can include tolerances that result in a 15% deviation. In some examples, optics unit 39 can be coupled to one or more aperture layers. In some examples, optics unit 39 can be coupled to a patterned aperture layer, such as an aperture layer including locations between adjacent optics are opaque to prevent light mixing.

Light 354 can be transmitted through optic 323 and can be incident on detector pixel 333 included in detector array 330. Detector array 330 can include a plurality of detector pixels, such as detector pixel 333, detector pixel 335, and detector pixel 337. A detector pixel can include one or more detector elements with a common footprint (e.g., same size and shape). A detector element can be an element designed to detect the presence of light and can individually generate a signal representative of the detected light. In some examples, at least one detector pixel can be independently controlled (e.g., measured, observed, or monitored) from other detector pixels in detector array 330. In some examples, at least one detector pixel can be capable of detecting light in the SWIR range. In some examples, at least one detector pixel can be a SWIR detector capable of operating between 1.5-2.5 µm. In some examples, at least one detector pixel can be a HgCdTe, InSb, or InGaAs based detector. In some examples, at least one detector pixel can be associated with a particular sample position and/or angle of light incident on a surface of system 300. Detector pixel 333 can detect light 354 and can generate an electrical signal indicative of the properties of the detected light 354. Detector array 330 can transmit the electrical signal to controller 340, and controller 340 can process and/or store the electrical signal.

System 300 can determine the one or more properties in sample 320 by utilizing the information from light penetrating through sample 320 (and reflecting off locations within the sample) in conjunction with the information from light reflecting off reference 322. Light source 302 can emit light 364. Light 364 can be directed at reference 322. Reference 322 can include any type of material capable of at least partially reflecting light. Exemplary reflective materials can include, but are not limited to, Ti, Co, Nb, W, NiCr, TiW, Cr, Al, Au, and Ag. In some examples, reflective materials can include one or more dielectric layers. One or more properties (e.g., thickness) of reference 322 can be determined based on the wavelength of light, type of material, and/or composition of the reference. In some examples, the size and shape of reference 322 can be configured to be larger or the same size and/or shape of light 364. One skilled in the art would appreciate that the same size and same shape can include tolerances that result in a 15% deviation. In some examples, the optical and/or physical properties of reference 322 can be such that the reflectivity of light 364 is greater than 75%. In some examples, the optical and/or physical properties of reference 322 can be such that the reflectivity of light 364 is greater than 90%. In some examples, the size and shape of reference 322 can be such that less than 15% of light 364 is allowed to transmit through reference 322 and light 364 is prevented from reaching sample 320. In some examples, reference 322 can be configured to reflect light 364 as a specular reflection. In some examples, reference 322 can be a spectroscopically neutral blocker. In some examples, the reference signal can include chopping light 364 between sample 320 and reference 322.

Light 364 can reflect off reference 322 towards optic 316. Light 364 can be transmitted through optic 316 towards aperture layer 386. Aperture layer 386 can be configured with opening 389, whose size and shape can be configured to allow light 364 to transmit through. Light 364 exiting opening 389 can be incident on optic 318. Light 364 can be transmitted through optic 318 and be incident on optic 319. Optic 319 can be any type of optics configured for spreading out the incoming light beam. In some examples, optic 319 can be a negative lens, which is a lens with a focal length that is negative. In some examples, optic 319 can be a prism. In some examples, optic 319 can include a prism wedge angled for each detector pixel in detector array 330. In some examples, optic 319 can be a beamsplitter. In some examples, optic 319 can be configured to spread out or divide light into multiple light beams, such as light 366 and light 367. In some examples, optic 319 can spread out light such that each light beam is directed to a different detector pixel on detector array 330. In some examples, optic 319 can uniformly spread out light such that one or more properties of each light beam are the same. One skilled in the art would appreciate that the same properties can include tolerances that result in a 15% deviation. In some examples, optic 319 can spread out the light beam such that intensities of at least two light beams are different. In some examples, optic 319 can comprise multiple optics. In some examples, the size and/or shape of optic 319 can be based on the number of detector pixels and/or the properties of the one or more light beams exiting optic 319. In some examples, an aperture layer can be coupled to optic 319 to control the properties and/or direction of light exiting optic 319.

Light 364 can be transmitted through optic 319 to form light 366. Light 366 can be incident on detector pixel 333. Detector pixel 333 can detect light 366 and can generate an electrical signal indicative of the properties of detected light 366. In some examples, the number of detector pixels configured to detect a light beam can be different for different light beams. For example, light 355 can be detected by two detector pixels (e.g., detector pixel 335 and detector pixel 337), while light 354 can be detected by one detector pixel (e.g., detector pixel 233). The electrical signal can be transmitted from detector array 330 to controller 340. Controller 340 can process and/or store the electrical signal. Controller 340 can utilize the signal information measured from light 354 to determine the reflectivity or one or more properties along the light path directed to location 357 and can utilize the signal information from light 366 to detect any fluctuations or drift in light source 302 and/or detector array 330. Using any of the above discussed methods, the controller 340 can process both the electrical signal and the signal information to determine the one or more properties of sample 320.

The same components can be used for measurements at other locations, such as location 359, in sample 320. Light 352 that is not absorbed or reflected along the light path directed to location 357 can be referred to as light 353. Light 353 can be incident on location 359 and can reflect and/or scatter into system 300 as light 355. In some examples, the angle of incidence of light 355 at the surface of system 300 can be different from the angle of incidence of light 354. Light 355 can enter system 300 through optic 310 at location 317. Light 355 can be transmitted through optic 316 and can be incident on aperture layer 386. Aperture layer 386 can include opening 387 configured to allow light 355 (and any light with the same path length, angle of incidence, or both) to transmit through. One skilled in the art would appreciate that the same path length and same angle of incidence can include tolerances that result in a 15% deviation. In some examples, since light reflected from location 357 can have a path length different from light reflected from location 359, aperture layer 386 can include multiple openings with different sizes and/or shapes to account for the different properties (e.g., path length and angle of incidence) of the optical paths. For example, opening 385 can be configured with a size and shape based on the path length and angle of incidence of light 354, and opening 387 can be configured with a size and shape based on the path length and angle of incidence of light 355. Light 355 can be transmitted through opening 387 in aperture layer 386, can be transmitted through optic 318, and can be incident on optic 327 included in optics unit 39. Light 355 can be transmitted through optic 327, and optic 327 can converge, redirect, collimate, focus, and/or magnify light such that light 355 is detected by detector pixel 335 and detector pixel 337. Detector pixel 335 and detector pixel 337 can detect light 355 and can generate an electrical signal indicative of the properties of detected light 355. The detector array 330 can transmit the electrical signal to controller 340, and controller 340 can process and/or store the electrical signal.

Controller 340 can utilize the signal information measured from light 355 to determine one or more properties of sample 320 and can utilize the signal information from light 367 to detect any fluctuations or drift in light source 302 and/or detector array 330. Controller 340 can process both of the collections of signal information to determine one or more properties along the light path directed to location 359 located in sample 320. In some examples, controller 340 can detect light 366 incident on detector pixel 333 and light 367 incident on detector pixel 335 and detector pixel 337 simultaneously without the need for separate measurements. In some examples, location 357 and location 359 can have the same depth from the surface of sample 320. One skilled in the art would appreciate that the same depth can include tolerances that result in a 15% deviation. In some examples, location 357 and location 359 can have different depths from the surface of sample 320. Controller 340 can measure the reflectivity, refractive index, density, concentration, scattering coefficient, scattering anisotropy, or absorbance at both location 357 and location 359 and can average the values.

Although the figure and discussion above relates to two locations in the sample, examples of the disclosure can include any number of locations and are not limited to one or two locations. In some examples, light can be incident on the multiple locations at the same angle of incidence. In some examples, the light source can be configured to generate one light beam exiting the system that results in multiple input light beams reflected and/or scattered back into the system. In some examples, the system can be configured with one or more light sources that emit light at locations with different angles of incidence, where the light can be emitted at the same time or at different times.

As illustrated in the figure, system 300 can include a plurality of openings in the aperture, a plurality of optics, and a plurality of detector pixels, where each opening and optics can be coupled to a detector pixel. Each opening/optics/detector pixel trio can be associated with an optical path in sample 320. In some examples, the association can be one opening-optics-detector pixel trio to one optical path in the sample 320. For example, opening 385, optic 323, and detector pixel 333 can be associated with the optical path from light 354. Similarly, opening 387, optic 327, and detector pixel 337 can be associated with the optical path from light 355. Since controller can associate detector pixel 333 and detector pixel 337 with different locations (e.g., location 357 and location 359) in sample 320 and different depths or path lengths, the controller 340 can discern differences in path lengths, depths of penetration, angles of incidence, exit locations, and/or exit angles.

In some examples, system 300 can further include a light blocker 392. Light blocker 392 can include any material capable of absorbing or blocking light. In some examples, light blocker 392 can include any material (e.g., an anti-reflection coating) that prevents incident light from reflecting. In some examples, light blocker 392 can include any material that reflects at wavelengths different from the detection wavelengths of detector array 330.

Figure 4A:
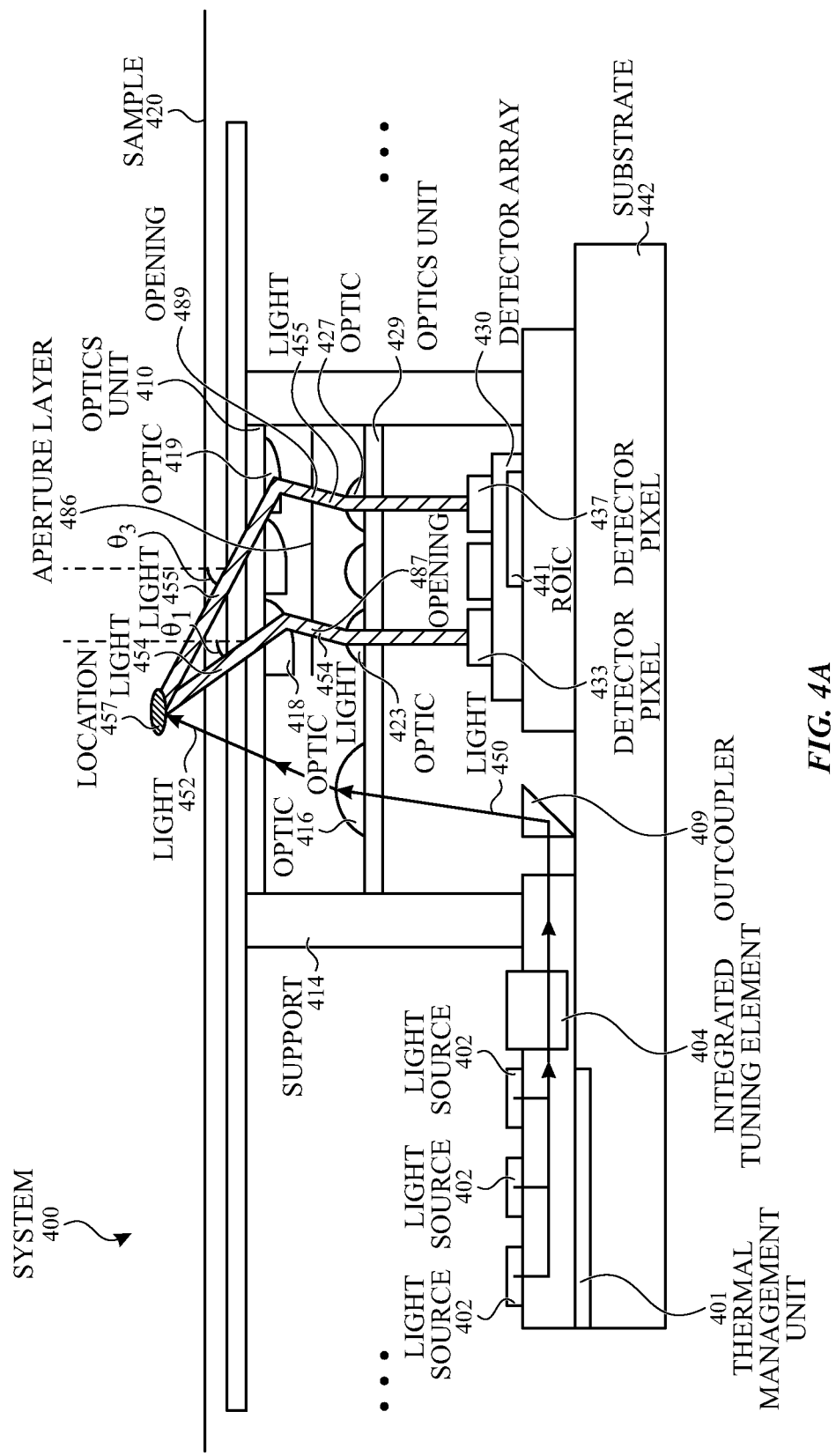
FIG. 4A illustrates a cross-sectional view of an exemplary portion of a system configured for resolving multiple angles of incidence on a sample surface with two-layers of optics according to examples of the disclosure.

FIG. 4A illustrates a cross-sectional view of an exemplary portion of a system configured for resolving multiple angles of incidence on a sample surface with two-layers of optics according to examples of the disclosure. System 400 can be close to, touching, resting on, or attached to sample 420. Sample 420 can include one or more locations, such as location 457. In some examples, the one or more locations can be associated with one or more scattering events. System 400 can be configured to reimage the optical paths in sample 420. For example, system 400 can be configured to reimage the angles of incident light and the exit locations to another plane (e.g., a plane located closer to detector array 430). Reimaging of the optical paths can be performed using one or more layers of optics. System 400 can include two layers of optics, for example. Located below (i.e., opposite the surface of sample 420) the layers of optics can be a detector array 430, and the two-layers of optics can be supported by a support 414. Located between the two layers of optics can be air, a vacuum, or any medium with a refractive index that contrasts the refractive index of the optics. Although the figures illustrates a system including two-layers of optics, examples of the disclosure can include, but are not limited to, any number of layers of optics including one layer or more than two layers.

System 400 can include light sources 402. Light sources 402 can be configured to emit light 450. Light sources 402 can be any source capable of generating light including, but not limited to, a lamp, laser, light emitting diode (LED), organic light emitting diode (OLED), electroluminescent (EL) source, quantum dot (QD) light emitter, super-luminescent diode, super-continuum source, fiber-based source, or a combination of one or more of these sources. In some examples, light sources 402 can be capable of emitting a single wavelength of light. In some examples, light sources 402 can be capable of emitting a plurality of wavelengths of light. In some examples, light sources 402 can be any tunable source capable of generating a SWIR signature. In some examples, each of light sources 402 can emit a different wavelength range of light (e.g., different colors in the spectrum). In some examples, light sources 402 can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Indium Arsenide (AlInAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Indium Arsenide Antimonide Phosphide (GaInAsSbP).

Light from light sources 402 can be combined using integrated tuning elements 404, optical traces (not shown), and one or more multiplexers (not shown). In some examples, integrated tuning elements 404, the optical traces, and the multiplexer(s) can be disposed on a substrate 442 or included in a single optical platform, such as a silicon photonics chip. System 400 can also include a thermal management unit 401 for controlling, heating, or cooling the temperature of light sources 402. Coupled to one or more multiplexers can be outcouplers 409. Outcouplers 409 can optionally be configured to focus, collect, collimate, and/or condition (e.g., shape) the light beam from the multiplexer(s) towards optic 416. In some examples, outcouplers 409 can be configured as a single mode waveguide that directs a well-defined (i.e., directional) light beam towards optic 416. In some examples, light 450 from outcouplers 409 can be a light beam with any suitable shape (e.g., conical, cylindrical, etc.). In some examples, light 450 from outcouplers 409 can become totally internally reflected (TIR) and "trapped" between substrate 442 and one or both of the layers of optics. Optic 416 can receive light 450 and can collimate and/or tilt the light beam towards one or more locations in sample 420. In some examples, optic 416 can include a bottom surface (i.e., surface facing outcouplers 409) that is flat (or within 10% from flat) and a top surface (i.e., surface facing away from outcouplers 409) that is convex. Light that is emitted from light sources 402, collimated by outcouplers 409, transmitted through optic 416, and then exits system 400 can be referred to as light 452.

Figure 4B:
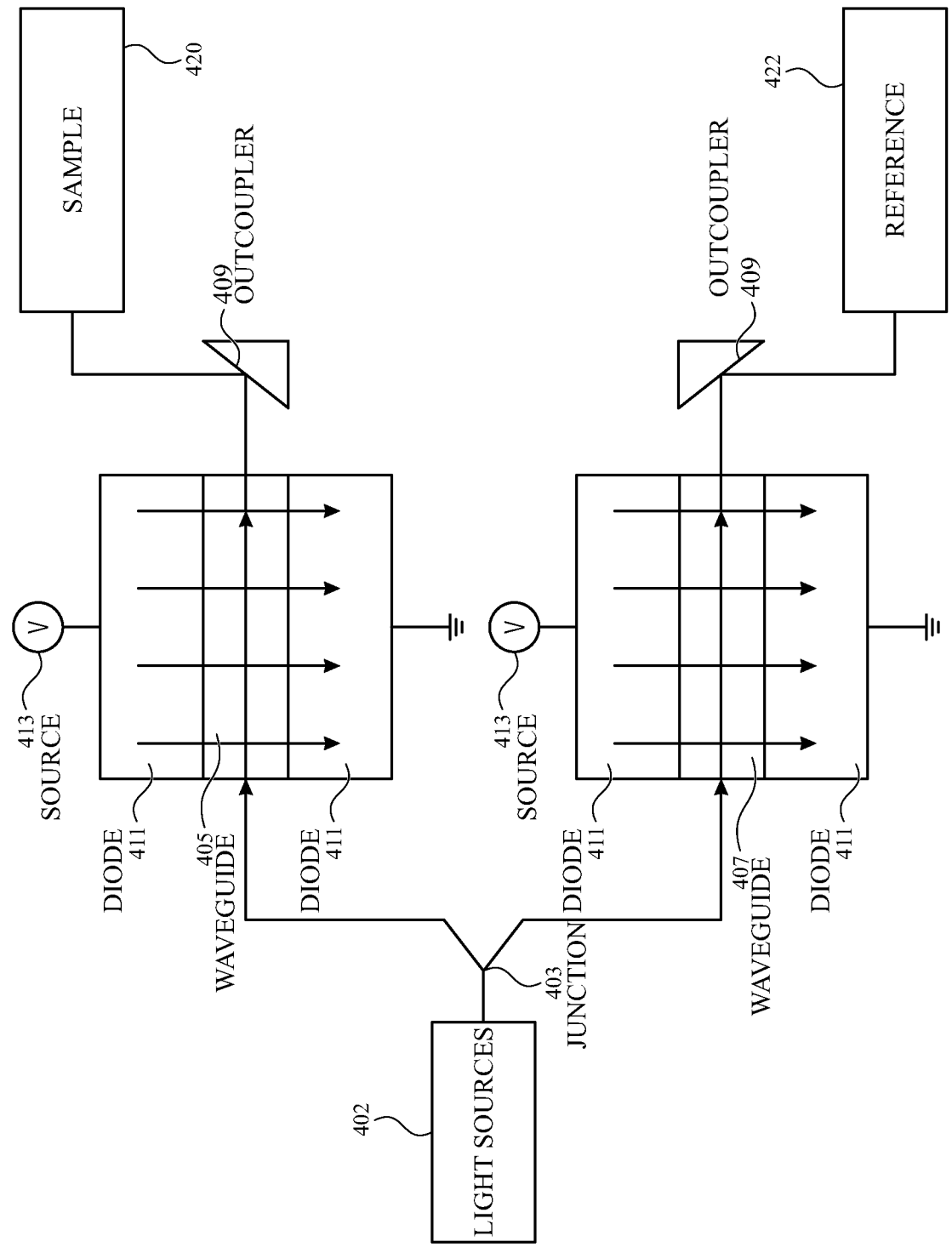
FIG. 4B illustrates an exemplary junction coupled to light sources according to examples of the disclosure.

In some examples, outcouplers 409 can be coupled to a waveguide including in a junction. FIG. 4B illustrates an exemplary junction coupled to the light sources according to examples of the disclosure. Junction 403 can be configured to split or divide light emitted from light sources 402, where a portion of light can be directed to waveguide 405 and a portion of light can be directed to waveguide 407. Waveguide 405 can be coupled to an outcoupler 409, which can direct light to sample 420. Waveguide 407 can also be coupled to an outcoupler 409, which can direct light to reference 422. In some examples, light from light sources 402 can split at junction 403, and light can be split equally among waveguide 405 and waveguide 407. In some examples, junction 403 can be an asymmetric y-junction, and light can be split such that the intensity of light through waveguide 405 is greater than the intensity of light through waveguide 407.

In some examples, the height and width of waveguide 405, waveguide 407, or both can be configured based on the size and shape of the light beam and divergence properties. For example, for an elliptical light beam, the aspect ratio of waveguide 405 can be configured to be greater than one. In some examples, the aspect ratio of waveguide 405 can be equal to one, and the light beam can be circular in shape. In some examples, the aspect ratio of waveguide 405 can be less than one. In some examples, the height of the waveguide can be less than the width of the waveguide such that the light beam diverges asymmetrically.

Figure 4C:
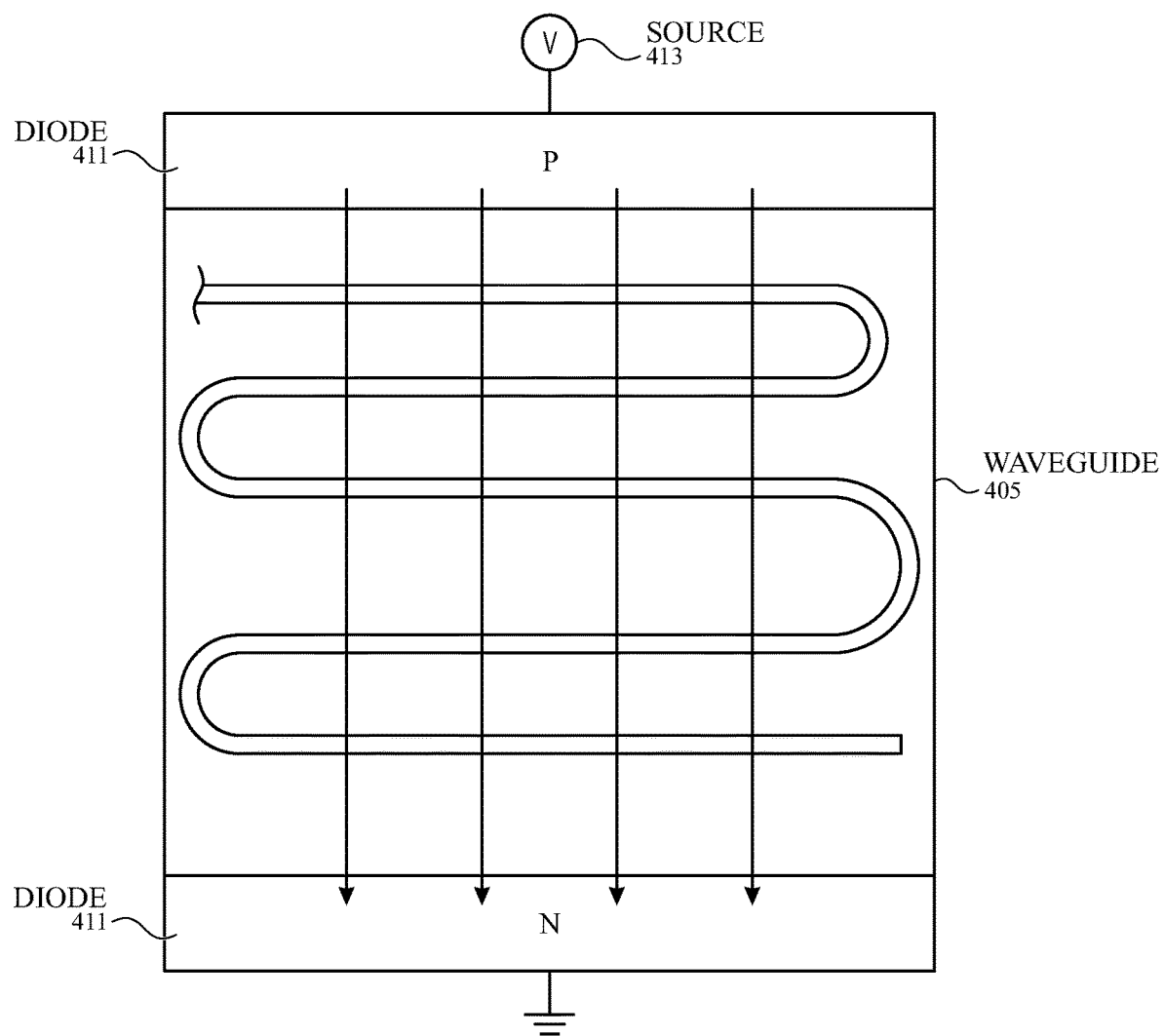
FIG. 4C illustrates an exemplary waveguide coupled to light sources according to examples of the disclosure.

As discussed above, reference switching can include alternating between transmitting light to sample 420 and transmitting light to reference 422. While this switching can be performed using mechanical moving parts, examples of the disclosure can include non-moving parts that block light, such as diode 411. Diode 411 can be coupled to a source 413, which can be configured to supply a current through waveguide 405. With a current through waveguide 405, the electrons in the current can absorb the photons in light traveling through waveguide 405, which can prevent light from being output from waveguide 405. Light through waveguide 407 can also be modulated with another diode 411 coupled to another source 413, which can be configured to supply a current through waveguide 407. In some examples, waveguide 405 and/or waveguide 407 can include be configured such that the current passes through multiple locations along the waveguide, as illustrated in FIG. 4C. By passing current through multiple locations along the waveguide, a lower current supplied from source 413 may be needed to block light, which can lead to lower power consumption. Although FIG. 4B illustrates two diodes (e.g., diode 411 coupled to waveguide 405 and another diode 411 coupled to waveguide 407), examples of the disclosure can include any number of diodes.

Referring back to FIG. 4A, light 452 can be directed at sample 420 and can be incident on location 457. A portion of light 452, referred to as light 454, can reflect back and/or scatter to system 400 with an angle of incidence $\theta_1$. In some examples, light 452 exiting system 400 can be a collimated light beam, where one or more scattering events can occur along the light path directed to location 457 and can lead to light 454 becoming a scattered light beam. Light 454 can enter system 400 and can be incident on optic 418, included in optics unit 410. In some examples, light 454 can be a collimated light beam.

System 400 can include one or more optics units. In some examples, the optics units can have one or more different functionalities and/or can include one or more different materials. For example, optics unit 410 can change the general direction of light, while optics unit 429 can focus the light. In some instances, optics unit 410 can include sapphire lenses, while optics unit 429 can include silicon lenses.

Optics unit 410 can include one or more optics (e.g., lenses, micro-optics, or micro-lens) configured to collect incident light, condition the size and shape of the light beam, and/or focus incident light. For example, optic 418 can collect light 454 incident on system 400 with an angle of incidence $\theta_1$. Optic 418 can change the angle (i.e., redirect the light beam) of light 454 such that light 454 is directed towards the optics unit 429 and has an angle of incidence on the optics unit 429 less than the angle of incidence $\theta_1$. In some examples, the medium between optics unit 410 and optics unit 429 can be configured with a refractive index such that the change in angle (i.e., bending) of light 454 decreases. In some examples, the medium can be multi-functional and can include a conformal material that provides mechanical support. In some examples, optic 418 can focus light 454 at least partially. In some examples, optics unit 410 can preferentially collect light rays included in light 454 with an angle of incidence within a range of collection angles. In some examples, optics unit 410 can include plurality of silicon lenses. In some examples, optics unit 410 can include one or more optics. Although FIG. 4A illustrates optics unit 410 attached to support 414, examples of the disclosure can include optics unit 410 attached to or coupled to optics unit 429 through mechanical features etched into optics unit 410, optics unit 429, or both. In some examples, at least two optics included in optics unit 410 can have different geometric properties. A detailed discussion of the properties of the optics in optics unit 410 is provided below.

System 400 can also include an aperture layer 486. Aperture layer 486 can include an opening 487 configured to allow light 454 (or any light with the same angle of incidence $\theta_1$) to transmit through. One skilled in the art would appreciate that the same angle of incidence can include tolerances that result in a 15% deviation. Light 454 that has been transmitted through opening 487 can be directed towards optic 423, included in optics unit 429. Optics unit 429 can comprise a plurality of optics, such as optic 423 and optic 427, attached to a substrate. In some examples, optic 423 and optic 427 can be any type of optics and can include any type of material conventionally used in optics. In some examples, two or more of the optics in optics unit 429 can have the same optical and/or geometric properties. One skilled in the art would appreciate that the same optical properties and geometric properties can include tolerances that result in a 15% deviation. In some examples, optic 416 and the optics (e.g., optic 423 and optic 427) included in the optics unit 429 can be disposed and/or formed on the same substrate. In some examples, optic 416 and optics unit 429 can be fabricated at the same time using lithography and the same etching process. The lithographic patterning can define the alignments of the optics, which can reduce the number of alignment steps and the number of separately fabricated components. Although FIG. 4A illustrates optics unit 429 attached to support 414, examples of the disclosure can include optics unit 429 attached to or coupled to optics unit 410 through mechanical features etched into optics unit 410, optics unit 429, or both. In some examples, at least two optics included in optics unit 429 can have different geometric properties. A detailed discussion of the properties of the optics in optics unit 429 is provided below.

Optic 423 can focus light 454 towards detector array 430. In some examples, light 454 can undergo at least partial refraction from optic 418. Optic 423 can recollimate light 454 and focus light 454. In some examples, system 400 can be configured such that light 454 is turned by optics unit 410 and focused by optics unit 429. In some examples, system 400 can be configured such that light 454 is turned by both optics unit 410 and optics unit 429. In some examples, optics unit 429 can include a plurality of silicon micro-optics.

Light 454 can transmit through optic 423 and can be detected by detector pixel 433, included in detector array 430. Detector array 430 can include one or more detector pixels, such as detector pixel 433 and detector pixel 437, disposed on a substrate. In some examples, the substrate can be a silicon substrate. A detector pixel can include one or more detector elements with a common footprint (e.g., same size and shape). A detector element can be an element designed to detect the presence of light and can individually generate a signal representative of the detected light. In some examples, at least one detector pixel can be independently controlled from other detector pixels in detector array 430. In some examples, at least one detector pixel can be capable of detecting light in the SWIR range. In some examples, at least one detector pixel can be a SWIR detector capable of operating between 1.5-2.5 µm. In some examples, at least one detector pixel can be a HgCdTe, InSb, or InGaAs based detector. In some examples, at least one detector pixel can be capable of detecting a position and/or angle of light incident on a surface of the detector pixel. Detector pixel 433 can be coupled to an integrated circuit, such as read-out integrated circuit (ROIC) 441. Each circuit in ROIC 441 can store charge corresponding to the detected light (or photons of light) on the detector pixel in an integrating capacitor to be sampled and read out by a processor or controller (not shown). The stored charge can correspond to one or more optical properties (e.g., absorbance, transmittance, and reflectance) of light 454. In some examples, ROIC 441 can be fabricated on a silicon substrate.

Another portion of light 452 incident on location 457 can reflect back into system 400 with an angle of incidence $\theta_3$, and can be referred to as light 455. Light 455 can enter system 400 and can be incident on optic 419, included in optics unit 410. Similar to optic 418, optic 419 can collect incident light, condition the beam size and shape (e.g., redirect the light beam), and/or focus incident light. Light 455 can be transmitted through opening 489 included in aperture layer 486. Light 455 can be directed towards optic 427 included in optics unit 429. Optic 427 can focus light 455 towards detector pixel 437 included in detector array 430. In some examples, system 400 can be configured such that light 455 is redirected by optics unit 410 and focused by optics unit 429. In some examples, system 400 can be configured such that light 455 is redirected by both optics unit 410 and optics unit 429.

As discussed earlier, system 400 can include a plurality of optics (e.g., optic 418 and optic 419) included in optics unit 410 and a plurality of optics (e.g., optic 423 and optic 427) included in optics unit 429, where each of the optics can be coupled to a detector pixel (e.g., detector pixel 433 or detector pixel 437) included in detector array 430. Each first optics-second optics-detector pixel trio can be associated with an optical path in sample 420. In some examples, the association can be one first optics-second optics-detector pixel trio to one optical path in sample 420. For example, optic 418, optic 423, and detector pixel 433 can form a first optics-second optics-detector pixel trio that is associated with the optical path from light 454. Similarly, optic 419, optic 427, and detector pixel 437 can form another first optics/second optics/detector pixel trio that is associated with the optical path from light 455. In this manner, system 400 can be capable of reimaging and resolving the multiple optical paths with different angles of incidence in sample 420, where each detector pixel in detector array 430 can be dedicated to a different optical path.

Although FIG. 4A illustrates detector pixel 433 and detector pixel 437 as single detector pixels, each individually associated with optics, examples of the disclosure can include multiple detector pixels associated with the same optics and multiple optics associated with the same detector pixel.

In some examples, system 400 can integrate the path lengths within a range of path lengths and associate the integrated path lengths with a detector pixel. By integrating the path lengths, different azimuthal angles can be resolved. Since there can be multiple sources (e.g., incident light from a single scattering event or incident light from multiple scattering events that change the path length) to optical paths that can have the same azimuthal angle, system 400 can resolve the different sources. In some examples, resolving the different azimuthal angles can require a large format (e.g., more than a hundred detector pixels) detector array.

In some examples, system 400 can be configured such that at least two first optics/second optics/detector pixel trios can resolve different angles of incidence. For example, as discussed earlier, light 454 can have an angle of incidence $\theta_1$, and light 455 can have an angle of incidence $\theta_3$. In some examples, angle of incidence $\theta_1$ can be different from angle of incidence $\theta_3$. In some examples, light 454 can have a different angle of incidence than light 455, but can have the same path length, for example. One skilled in the art would appreciate that the same path length can include tolerances that result in a 15% deviation. System 400 can associate different detector pixels or the same detector pixels in detector array 430 with different angles of incidence. For example, detector pixel 433 can be associated with angle of incidence $\theta_1$, and detector pixel 437 can be associated with angle of incidence $\theta_3$. In some examples, the optical system can operate at infinite conjugate (i.e., infinite distance where the light rays collimate), so the properties (e.g., focal length, working distance, aperture, pitch, fill-factor, tilt, and orientation) of the optics included in optics unit 410 can be determined based on the angle of incidence.

In some examples, aperture layer 486 can be located between optics unit 410 and optics unit 429. Aperture layer 486 can be located a focal length away from optics unit 410 and a focal length away from optics unit 429. Additionally, system 400 can be configured with detector array 430 located a focal length away from optics unit 429. This configuration can require at least four layers in the stackup of system 400: optics unit 410 on a first layer, aperture layer 486 on a second layer, optics unit 429 on a third layer, and detector array 430 on a third layer. However, fewer numbers of layers may be desired for a system with a thinner stackup, for example.

Figure 4D:
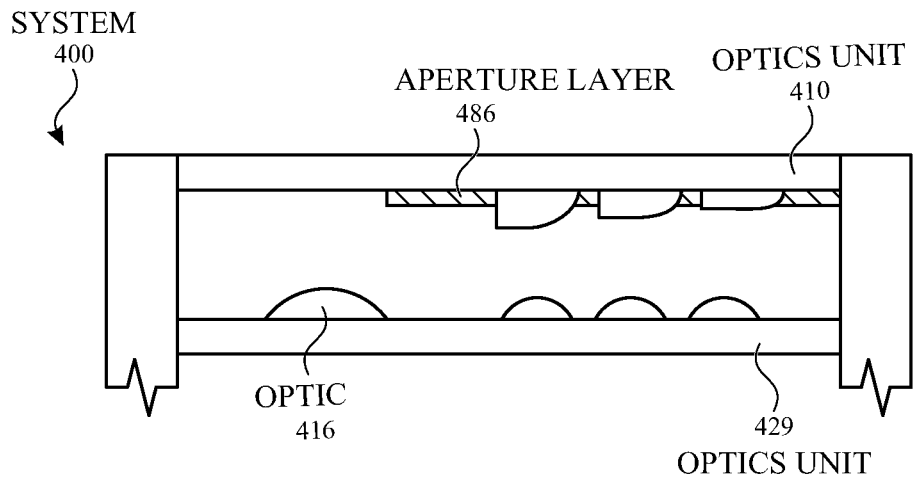
FIGS. 4D-4H illustrate cross-sectional views of exemplary optics layers included in a system configured for resolving multiple optical paths in a sample according to examples of the disclosure.
Figure 4E:
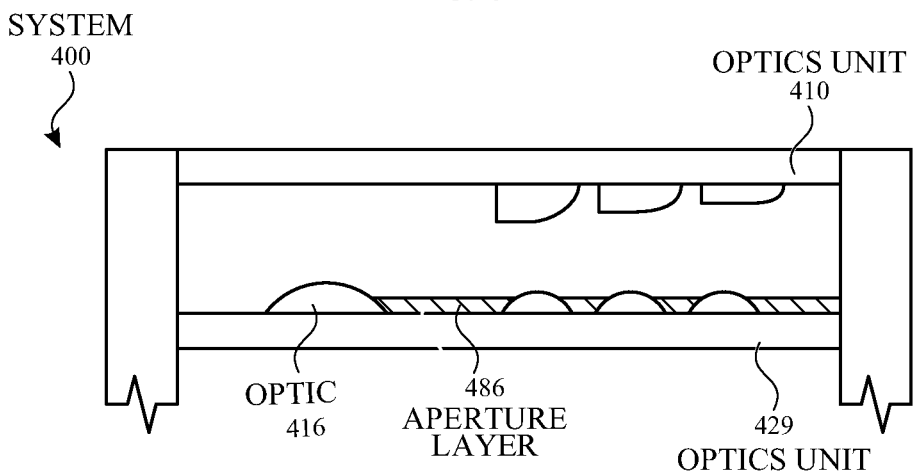
Figure 4F:
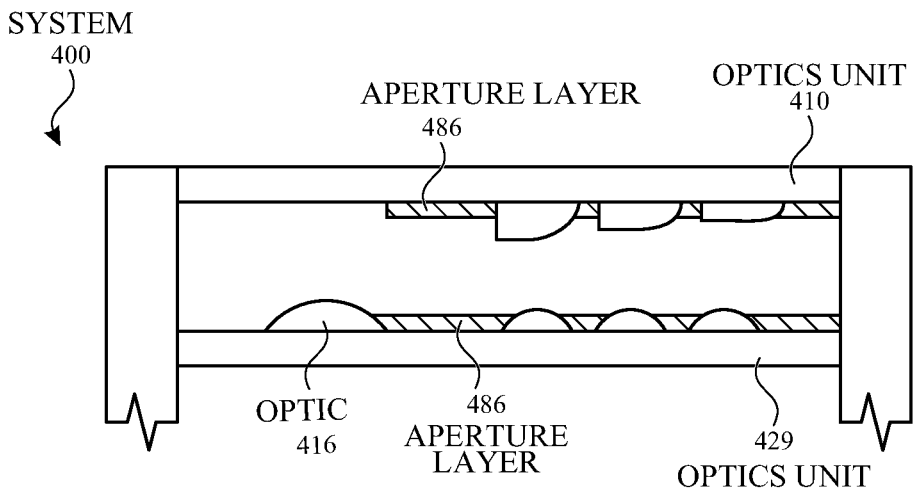

FIGS. 4D-4H illustrate cross-sectional views of exemplary optics included in a system configured for resolving multiple optical paths in a sample according to examples of the disclosure. System 400 can include one or more aperture layers located on the same layer as one or more optics or components in the system. As illustrated in FIG. 4D, aperture layer 486 can be located on the same layer as optics unit 410. In some examples, aperture layer 486 can be located on a surface of optics unit 410. Although the figure illustrates aperture layer 486 as being located on the bottom surface (i.e., surface facing optics unit 429) of optics unit 410, examples of the disclosure can include aperture layer 486 located on the top surface of optics unit 410. In some examples, aperture layer 486 can be located on the same layer as optics unit 429, as illustrated in FIG. 4E. Examples of the disclosure can also include aperture layer 486 located on two layers: the same layer as optics unit 410 and the same layer as optics unit 429, as illustrated in FIG. 4F. In some examples, the aperture layer can comprise an opaque element, such as a metal, at least in part. In some examples, the aperture layer can be a lithographically patterned layer applied to one or more surfaces of the optics unit(s).

Figure 4G:
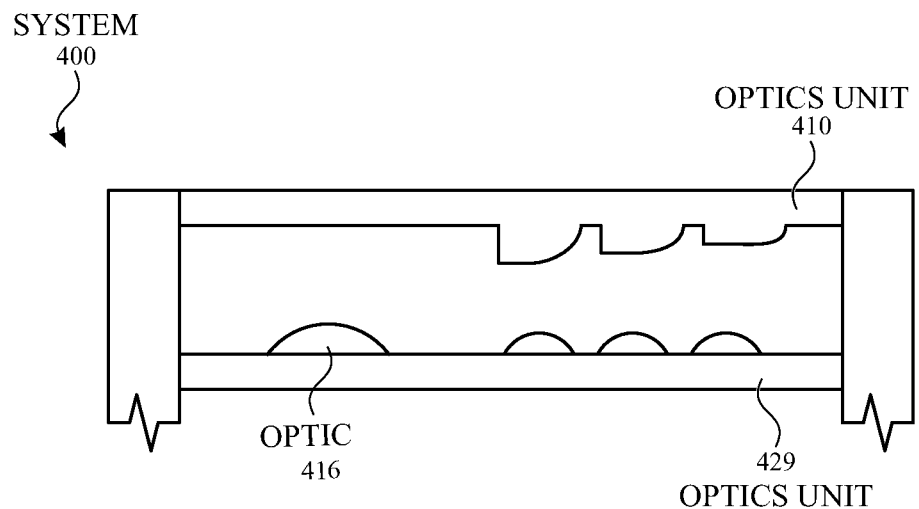
Figure 4H:
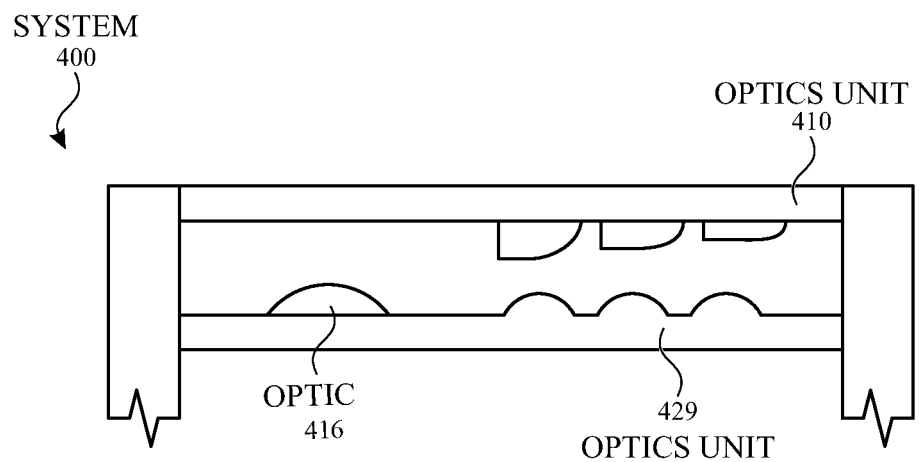

FIG. 4G illustrates one or more optics integrated into the structure of system 400. The integrated optics can be configured to selectively transmit light through the optics based on one or more properties, such as path length or angle of incidence of incident light. In some examples, system 400 can include one or more integrated optics included in the optics unit 429, as illustrated in FIG. 4H. In some examples, the integrated optics illustrated in FIGS. 4G-4H can be continuous with the surface of optics unit 410 and optics unit 429.

Although FIGS. 4D-4H illustrate optic 416 located on the same layer (e.g., integrated with) as optics unit 429, examples of the disclosure can include optic 416 located on the same layer (e.g., integrated with) as optics unit 410. Additionally, although FIGS. 4D-4F illustrate aperture layer 486 located on either the bottom side of optics unit 410 or the top side of optics unit 429, examples of the disclosure can include the same or an additional aperture layer located on the other side.

Figure 4I:
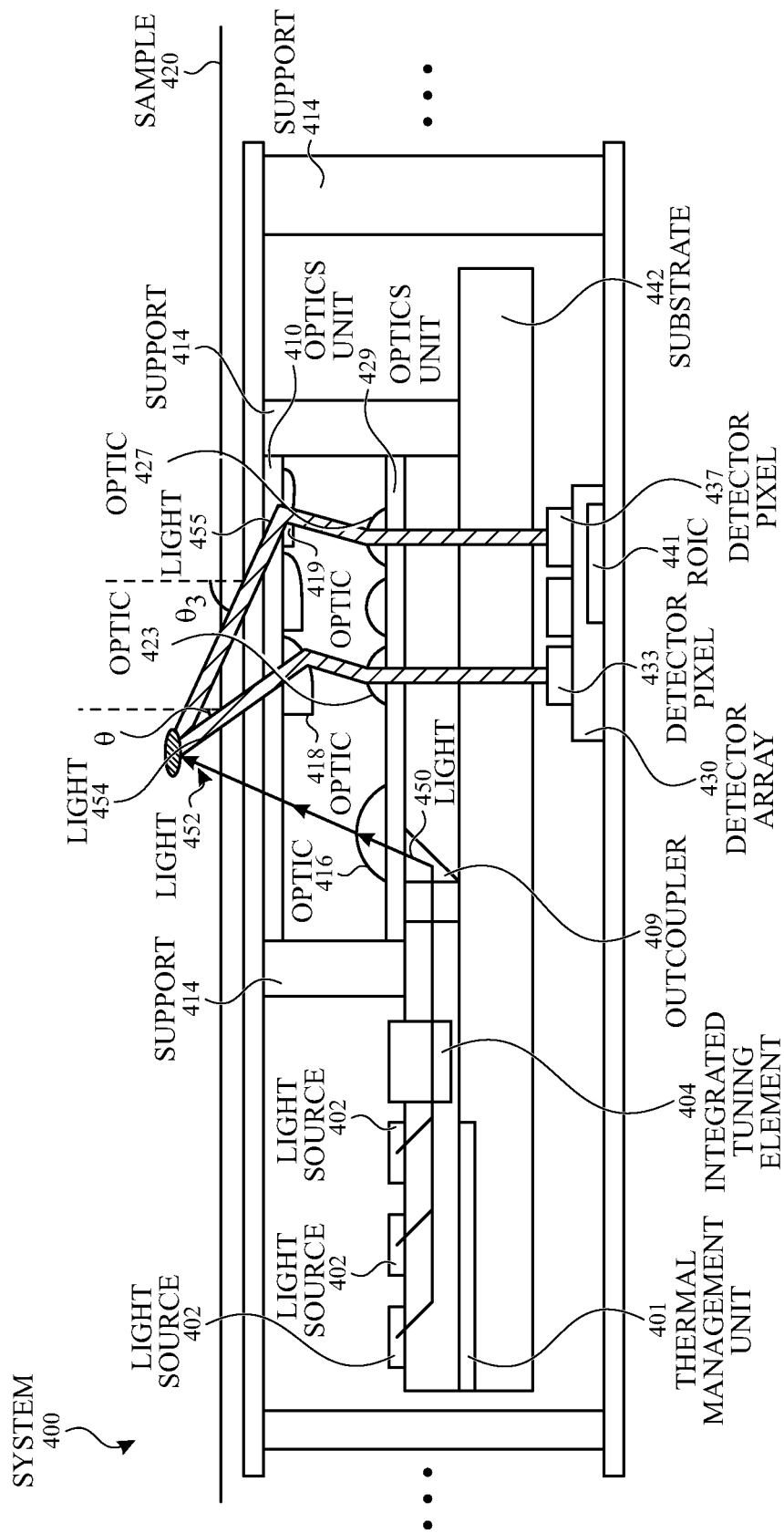
FIG. 4I illustrates a cross-sectional view of a portion of an exemplary system configured for resolving multiple angles of incidence on a sample surface and reducing or eliminating trapped light from light sources according to examples of the disclosure.

FIG. 4I illustrates a cross-sectional view of a portion of an exemplary system configured for resolving multiple angles of incidence on a sample surface and reducing or eliminating TIR trapped light from the light sources according to examples of the disclosure. System 400 can be configured such that outcoupler 409 is in contact with the bottom surface (i.e., the flat surface) of optics unit 429. System 400 can also be configured such that detector array 430 is located below (i.e., opposite optics unit 429) substrate 442. By placing the top surface (i.e., surface where light exits outcouplers 409) of outcouplers 409 in contact with the bottom surface of optics unit 429 and locating detector array 430 below (i.e., away from the direction of light exiting the outcouplers 409) substrate 442, detector array 430 can be prevented from erroneously detecting TIR trapped light that has directly exited outcouplers 409. Furthermore, locating detector array 430 below substrate 442 can prevent light reflected off the bottom surface (i.e., the flat surface) of optics unit 429 from being detected by detector array 430 and erroneously changing the measured signal.

Figure 5:
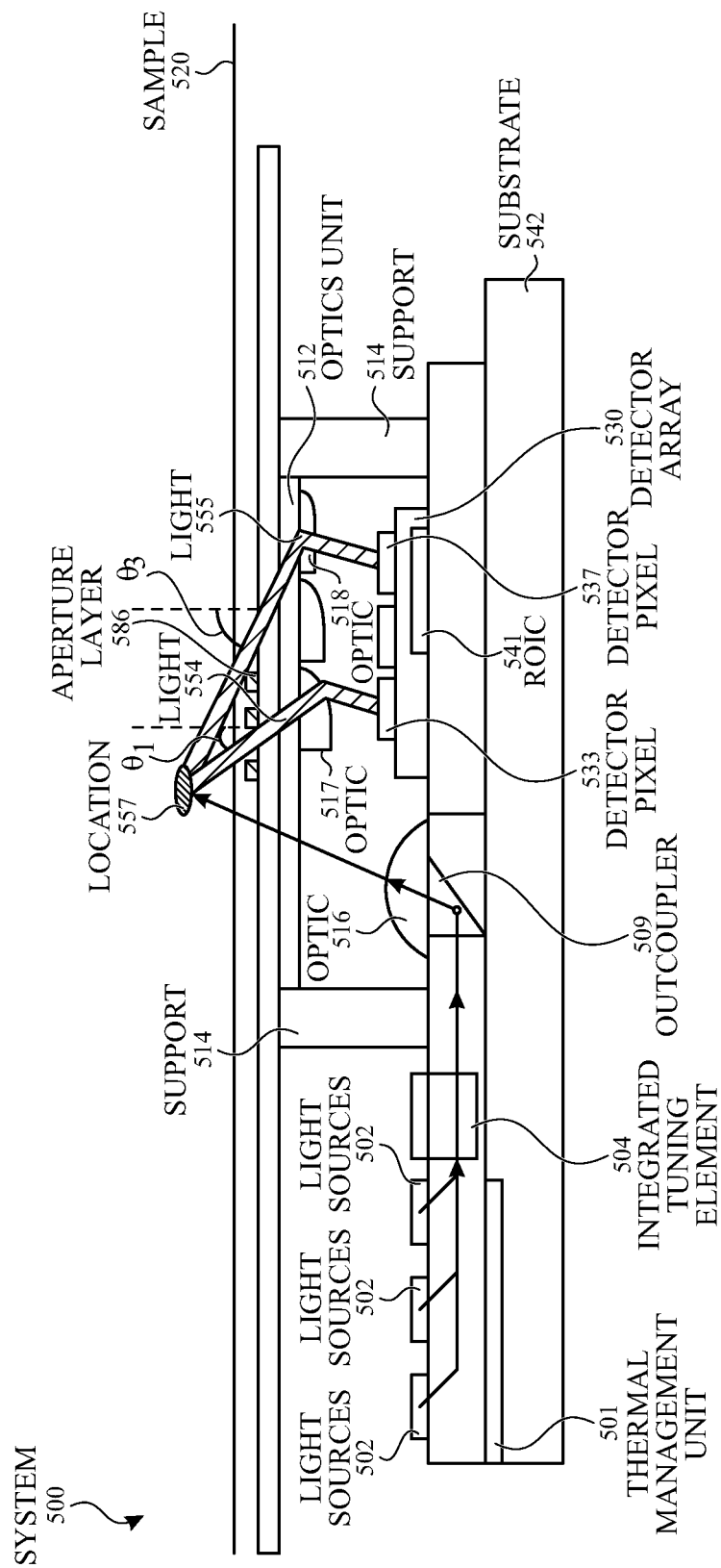
FIG. 5 illustrates a cross-sectional view of a portion of an exemplary system configured for resolving multiple angles of incidence on a sample surface with one-layer of optics according to examples of the disclosure.

FIG. 5 illustrates a cross-sectional view of a portion of an exemplary system configured for resolving multiple angles of incidence on a sample surface with one-layer of optics according to examples of the disclosure. System 500 can include one or more components as discussed in the context of and illustrated in FIGS. 4A-4I. Additionally, system 500 can include optics unit 512, which can be capable of combining the functionality of optics unit 410 and optics unit 429 illustrated in FIGS. 4A-4I. Optics unit 512 can include one or more optics, micro-optics, microlens, or a combination of optics configured to collect incident light, condition the beam size and shape, and focus incident light. Optics unit 512 can collect light 554 and light 555 incident on system 500 with the angles of incidence $\theta_1$ and $\theta_3$, respectively. The optics included in optics unit 512 can change the angle (i.e., redirect the light beam) of light (e.g., light 554 and light 555) such that light is directed towards detector array 530. Turning light 554 and light 555 can lead to an angle of incidence on detector array 530 that is less than angles of incidence $\theta_1$ and $\theta_3$, respectively. In some examples, the medium between optics unit 512 and detector array 530 can be configured with a refractive index such that the changes in angle (i.e., bending) of light 554 and light 555 increase. In some examples, the medium can be multi-functional and can include a conformal insulating material that provides mechanical support. In some examples, the optics included in optics unit 510 can preferentially collect light rays, included in light 554 and light rays included in light 555 with angles of incidence within a range of collection angles. In some examples, the range of collection angles for the optics coupled to light 554 can be different from the range of collection angles coupled to light 555.

Additionally, optic 518 and optics 519, included in optics unit 512, can focus light 554 and light 555 towards detector pixel 533 and detector pixel 537, respectively, included in detector array 530. Although a system (e.g., system 400 illustrated in FIGS. 4A-4I) with two-layers of optics can include an optics unit (e.g., optics unit 410) that can be configured for light collection, turning the beam, and focusing incident light, optics unit 512 can be configured with a higher focusing power (i.e., degree which the optics converges or diverges incident light) than the system with the two-layers of optics. In some examples, optics unit 512 can include a plurality of silicon lenses or lenses including silicon dioxide. In some examples, at least two optics included in optics unit 512 can have different geometric properties. A detailed discussion of the properties of the optics in the optics unit 512 is provided below.

System 500 can also include an aperture layer 586. Aperture layer 586 can include a plurality of openings configured to allow light 554 and 555 (e.g., any light with an angle of incidence within a range of collection angles), respectively, to transmit through. In some examples, aperture layer 586 can be located on an external surface (e.g., the housing) of system 500 and can be configured to allow light to enter into system 500. Although FIG. 5 illustrates aperture layer 586 located on an external surface of the system 500, examples of the disclosure can include aperture layer 586 located on another side (e.g., an internal surface of the system 500) or another layer.

Each optics included in optics unit 512 can be coupled to a detector pixel (e.g., detector pixel 533 or detector pixel 537), included in detector array 530. Each optics-detector pixel pair can be associated with an optical path in sample 520. In some examples, the association can be one optics-detector pixel pair to one optical path. For example, optic 517 and detector pixel 533 can form an optics-detector pixel pair that is associated with the optical path from light 554, and optic 518 and detector pixel 537 can form another optics-detector pixel pair that is associated with the optical path from light 555. Although FIG. 5 illustrates detector pixel 533 and detector pixel 537 as single detector pixels, each individually associated with optics, examples of the disclosure can include multiple detector pixels associated with the same optics and multiple optics associated with the same detector pixel.

In some examples, the system can be configured with one-layer of optics to reduce the stackup or height of the system. In some examples, the system can be configured with two-layers of optics for higher angular resolution, larger angular range of incident light, or both. In some examples, the system can be configured with the number of layers of optics being different for light emitted from the light sources than for light collected from the sample. For example, the system can be configured with one-layer of optics for light emitted from the light sources and two-layers of optics for light reflected from the sample, or the system can be configured with two-layers of optics for light emitted from the light sources and one-layer of optics for light reflected from the sample.

Figure 6:
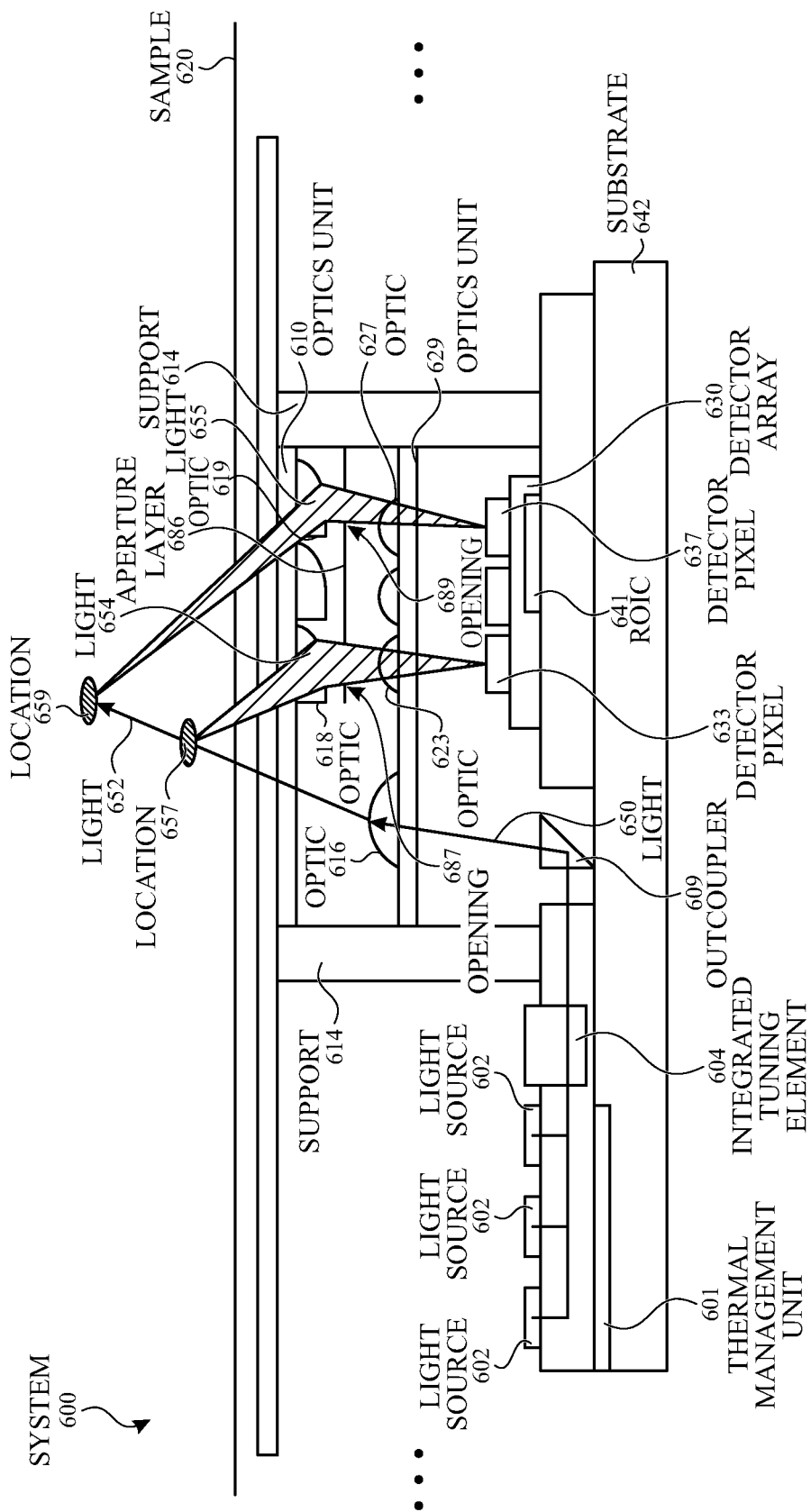
FIG. 6 illustrates a cross-sectional view of a portion of an exemplary system configured for resolving multiple optical path lengths with two-layers of optics according to examples of the disclosure.

FIG. 6 illustrates a cross-sectional view of a portion of an exemplary system configured for resolving multiple optical path lengths with two-layers of optics according to examples of the disclosure. System 600 can be close to, touching, resting on, or attached to sample 620. Sample 620 can include one or more locations, such as location 657 and location 659. System 600 can be configured to reimage and/or resolve the optical paths in sample 620. For example, system 600 can be configured to reimage the path lengths of the optical paths to another plane (e.g., a plane located closer to detector array 630). Reimaging of the optical paths can be performed using one or more layers of optics. System 600 can include two layers of optics and a detector array 630 located below (i.e., opposite the surface of sample 620) with the multiple layers supported by support 614, for example. Located between the two layers of optics can be air, a vacuum, or any medium with a refractive index that contrasts from the refractive index of the optics.

System 600 can include light sources 602. Light sources can be configured to emit light 650. Light source 602 can be any source capable of generating light including, but not limited to, a lamp, laser, LED, OLED, EL source, super-luminescent diode, super-continuum source, fiber-based source, or a combination of one or more of these sources. In some examples, light sources 602 can be capable of emitting a single wavelength of light. In some examples, light sources 602 can be capable of emitting a plurality of wavelengths of light. In some examples, light sources 602 can be tunable sources capable of generating a SWIR signature. In some examples, at least one of light sources 602 can include a III-V material, such as InP or GaSb.

Light from light sources 602 can be combined and amplified using integrated tuning elements 604, optical traces (not shown), and a multiplexer (not shown). In some examples, integrated tuning elements 604, optical traces, and multiplexer can be disposed on a substrate or included in a single optical platform, such as a silicon photonics chip. System 600 can also include a thermal management unit 601 for controlling, heating, or cooling the temperature of light sources 602. Coupled to the multiplexer can be outcouplers 609. Outcoupler 609 can be configured to focus and/or condition (e.g., shape) light 650 from the multiplexer towards optic 616. In some examples, outcouplers 609 can be configured as a single mode waveguide that directs a well-defined (i.e., directional and sharp) light beam towards optic 616. In some examples, light 650 from outcouplers 609 can be a light beam with any suitable shape (e.g., conical, cylindrical, etc.). Optic 616 can collect light 650 and collimate and/or tilt the light beam towards one or more locations in sample 620. In some examples, optic 616 can include a bottom surface (i.e., surface facing outcouplers 609) that is flat and a top surface (i.e., surface facing away from outcouplers 609) that is convex. One skilled in the art would appreciate that a flat surface can include tolerances that result in a 15% deviation. Light that is emitted from light sources 602 that is collimated by outcouplers 609, transmits through optic 616, and then exits system 600 can be referred to as light 652.

Light 652 can be directed at sample 620 and can be incident on location 657. A portion of light 652, referred to as light 654, can reflect back towards system 600. Additionally, a portion of light 652 can be incident on location 659 and can reflect back towards system 600, and can be referred to as light 655. Although light 652 exiting system 600 can be a collimated light beam, scattering events can occur along the light path directed to location 657 and location 659, which can lead to light 654 and light 655 becoming scattered beams. Both light 654 and light 655 can enter system 600, and can be incident on optic 618 and optic 619, included in optics unit 610, respectively. Optics unit 610 can include one or more optics, micro/or focus incident light. For example, optic 618 can collect light 654, and optic 619 can collect light 655. Optic 618 can change the angle (i.e., redirect the light beam) of light 654 such that light 654 is directed towards (i.e., closer to normal incidence than the angle of incidence) optic 623 included in optics unit 629. In some examples, the medium between optics unit 610 and optics unit 629 can be configured with a refractive index such that the change in angle (i.e., bending) of light 654 increases. In some examples, the medium can be multi-functional and can include a conformal insulating material that provides mechanical support. Similarly, optic 619 can change the angle of light 655 such that light 655 is directed towards optic 627 included in optics unit 629. In some examples, optic 618, optic 619, or both can be configured to focus incident light (e.g., light 654 and light 655). In some examples, optics unit 610 can preferentially collect light rays included in light 654, light 655, or both with an angle of incidence within a range of collection angles. In some examples, optics unit 610 can include a plurality of silicon lenses or lenses including silicon dioxide. Although FIG. 6 illustrates optics unit 610 attached to support 614, examples of the disclosure can include optics unit 610 attached to or coupled to optics unit 629 through mechanical features etched into optics unit 610, optics unit 629, or both. In some examples, at least two optics included in optics unit 610 can have different geometric properties. A detailed discussion of the properties of the optics in optics unit 610 is provided below.

System 600 can include an aperture layer 686. Aperture layer 686 can include an opening 687 and opening 689 configured to allow light 654 and light 655 (e.g., any light with an angle of incidence within the range of collection angles), respectively, to transmit through. Light 654 that has been transmitted through opening 687 can be directed towards optic 623 included in optics unit 629. Similarly, light 655 that has been transmitted through opening 689 can be directed towards optic 627 included in optics unit 629. Optics unit 629 can comprise a plurality of optics, such as optic 623 and optic 627, attached to a substrate. In some examples, optic 623 and optic 627 can be any type of optics and can include any type of material conventionally used in optics. In some examples, two or more of the optics in optics unit 629 can have the same optical and/or geometric properties. One skilled in the art would appreciate that the same optical properties and geometric properties can include tolerances that result in a 15% deviation.

Light 645 can undergo some refraction from optic 618. Optic 623 can recollimate light 654 and/or focus light 654 onto detector pixel 633 included in detector array 630. Similarly, optic 627 can recollimate light 655 and/or focus light 655 onto detector pixel 637 included in detector array 630. In some examples, system 600 can be configured such that light 654 is redirected by optics unit 610 and focused by optics unit 629. In some examples, system 600 can be configured such that light 654 is redirected by both optics unit 610 and optics unit 629. In some examples, optics unit 629 can include a plurality of silicon lenses or lenses including silicon dioxide. Although FIG. 6 illustrates optics unit 629 attached to support 614, examples of the disclosure can include optics unit 629 attached to or coupled to optics unit 610 through mechanical features etched into optics unit 610, optics unit 629, or both. In some examples, at least two optics included in optics unit 629 can have different geometric properties. A detailed discussion of the properties of the optics in optics unit 629 is provided below.

Light 654 can be transmitted through optic 623 and can be detected by detector pixel 633 included in detector array 630. Detector array 630 can include one or more detector pixels, such as detector pixel 633 and detector pixel 637 disposed on a substrate. In some examples, the substrate can be a silicon substrate. In some examples, at least one detector pixel can be independently controlled from other detector pixels in detector array 630. In some examples, at least one detector pixel can be capable of detecting light in the SWIR range. In some examples, at least one detector pixel can be a SWIR detector capable of operating between 1.5-2.5 µm. In some examples, at least one detector pixel can be a HgCdTe, InSb, or InGaAs based detector. In some examples, at least one detector pixel can be capable of detecting a position and/or angle of incidence.

Additionally, light 655 can be transmitted through optic 627 and can be detected by detector pixel 637. Detector pixel 633 and detector pixel 637 can be coupled to an integrated circuit, such as ROIC 641. In some examples, detector pixel 633 and detector pixel 637 can be coupled to the same circuitry. In some examples, detector pixel 633 and detector pixel 637 can be coupled to different circuitry. Each circuit in ROIC 641 can store charge corresponding to the detected light (or photons of light) on the corresponding detector pixel in an integrating capacitor to be sampled and read out by a processor or controller. The stored charge can correspond to one or more optical properties (e.g., absorbance, transmittance, and reflectance) of the detected light.

System 600 can include a plurality of optics (e.g., optic 618 and optic 619) included in optics unit 610 and a plurality of optics (e.g., optic 623 and optic 627) included in optics unit 629, where each of the optics can be coupled to a detector pixel (e.g., detector pixel 633 or detector pixel 637) included in detector array 630. Each first optics/second optics/detector pixel trio can be associated with an optical path in the sample. In some examples, the association can be one first optics/second optics/detector pixel trio to one optical path. For example, optic 618, optic 623, and detector pixel 633 can be associated with the optical path from light 654. Optic 619, optic 627, and detector pixel 637 can be associated with the optical path from light 655. In this manner, system 600 can be capable of reimaging and resolving the multiple optical paths with different path lengths in sample 620, where each detector pixel in detector array 630 can be associated with a different optical path. Although FIG. 6 illustrates detector pixel 633 and detector pixel 637 as single detector pixels, each individually associated with optics, examples of the disclosure can include multiple detector pixels associated with the same optics and multiple optics associated with the same detector pixel.

As illustrated in the figure, system 600 can be configured such that at least two first optics/second optics/detector pixel trios can resolve different path lengths. For example, light 654 can have a first optical path length, and light 655 can have a second optical path length. The first optical path length associated with light 654 can be different from the second optical path length associated with light 655 due to the different depths of the different locations (e.g., location 657 and location 659) that the light rays reflect off. In some examples, light 654 can have the same angle of incidence as light 655, but can have a different path length. One skilled in the art would appreciate that the same angle of incidence can include tolerances that result in a 15% deviation. System 600 can couple different detector pixels in detector array 630 with different path lengths. For example, detector pixel 633 can be associated with the first optical path length, and detector pixel 637 can be associated with the second optical path length. In some examples, the optical system can operate at finite conjugate (i.e., a finite distance where the light rays collimate), and the properties (e.g., focal length, working distance, aperture, pitch, fill-factor, tilt, and orientation) of the optics included in optics unit 610 can be determined based on the range of collection angles. In some examples, at least two optics included in optics unit 610 can have the same geometric properties, but can be located in different areas of optics unit 610. A detailed discussion of the properties of the optics in optics unit 610 is provided below.

In some examples, the shapes, sizes, and geometric properties of the optics included in optics unit 610 can be different for an optical system (e.g., system 400 illustrated in FIGS. 4A-4I or system 500 illustrate in FIG. 5) configured to resolve different angles of incidence than an optical system (e.g., system 600 illustrated in FIG. 6) configured to resolve different path lengths.

In some examples, each first optics/second optics/detector pixel trio can be associated with a range of collection angles. As illustrated in the figure, light 654 can scatter from location 657 with a shape that resembles a cone, for example. System 600 can integrate the angles of the light rays included in light 654 azimuthally. Since the path lengths of the light rays can be the same, the integration of the angles within the range of collection angles can reduce the number of angle bins, number of detector pixels, and the complexity of the optics needed for the optical system. One skilled in the art would appreciate that the same path length can include tolerances that result in a 15% deviation. For example, an optical system that does not integrate the angles can require a minimum of eight detector pixels, whereas an optical system that does integrate the angles can require fewer number of detector pixels.

In addition to needing a smaller number of detector pixels, system 600 can utilize a smaller format (i.e., less than a hundred pixels) detector array that can have better performance (e.g., optical efficiency, fill-factor, and/or reliability) than a large format detector array. Additionally, by integrating the angles of the light rays, system 600 inherently performs spatial averaging of nominally equivalent optical paths incident on a detector pixel. The spatial averaging of nominally equivalent optical paths can lead to more light being incident on a detector pixel, which can lead to a higher signal-to-noise ratio (SNR). Spatial averaging also can lead to better measurement accuracy because unimportant light rays can be "canceled" or averaged out.

Although aperture layer 686 is illustrated in FIG. 6 as located between optics unit 610 and optics unit 629, examples of the disclosure can include aperture layer 686 located on the same layer as one or more optics or components in the system. Similar to the examples illustrated in FIGS. 4D-4I, system 600 can be configured with aperture layer 686 located on a surface of optics unit 610. In some examples, aperture layer 686 can be located on the same layer (e.g., a surface) as optics unit 629. In some examples, aperture layer 686 can be located on the same layers as optics unit 610 and the same layer as optics unit 629. In some examples, system 600 can include one or more recessed optics in optics unit 610. The recessed optics can be configured to selectively transmit light through the optics based on one or more properties, such as path length and/or angle of incidence of incident light. In some examples, system 600 can include one or more recessed optics in optics unit 629. One or more of the recessed optics can be continuous with the surface of optics unit 610 and optics unit 629. In some examples, system 600 can include one or more etched or drilled holes for selectively transmitting light through the two-layers of optics to detector array 630. With one or more etched or drilled holes used as an aperture layer, system 600 can include one or more spacers located between the surfaces of the two-layers of optics. The one or more spacers can be used to mechanically support the optics.

Figure 7:
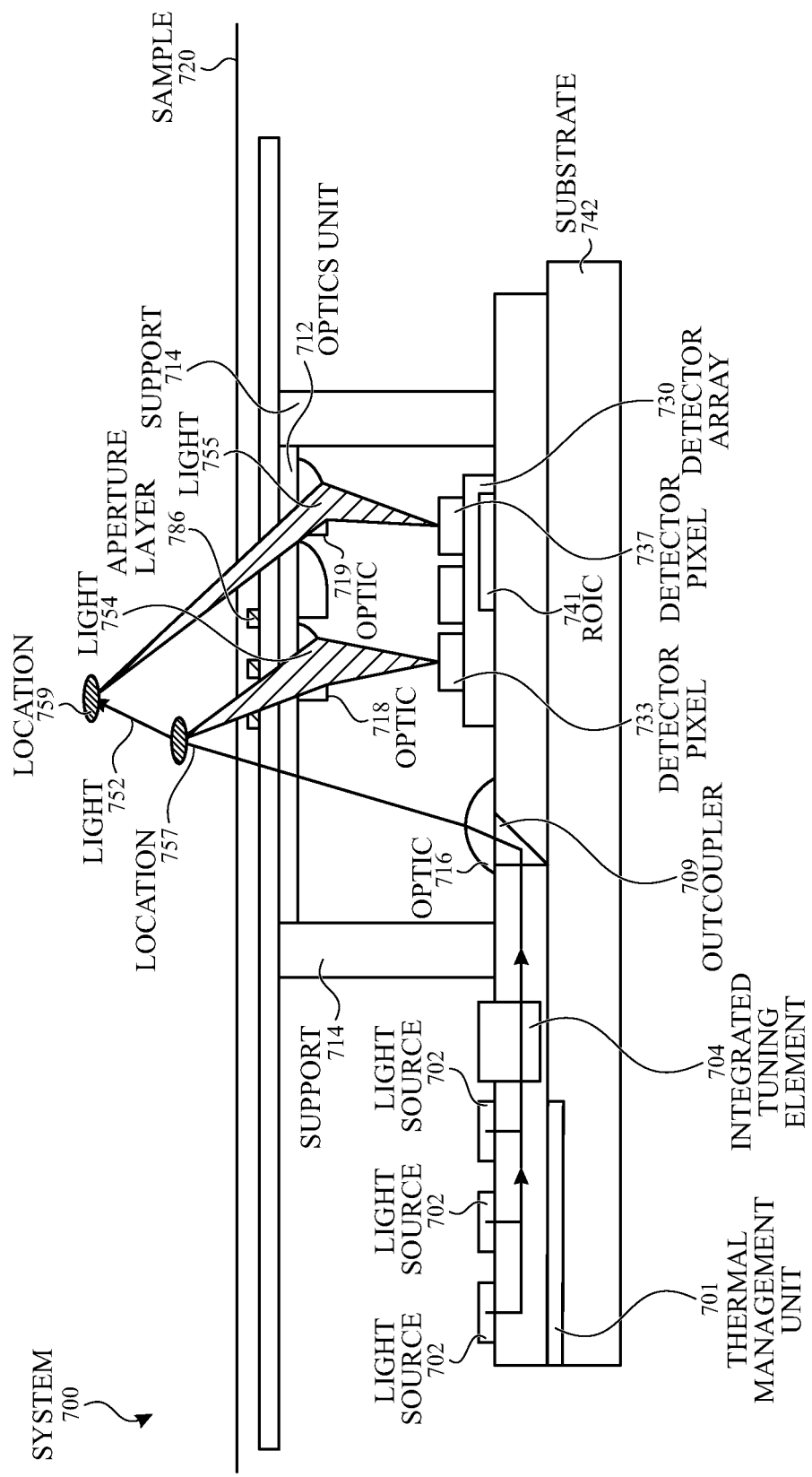
FIG. 7 illustrates a cross-sectional view of a portion of an exemplary system configured for resolving multiple optical path lengths with one-layer of optics according to examples of the disclosure.

FIG. 7 illustrates a cross-sectional view of a portion of an exemplary system configured for resolving multiple optical path lengths with one-layer of optics according to examples of the disclosure. System 700 can include one or more components as discussed in the context of and illustrated in FIG. 6. Additionally, system 700 can include an optics unit 712 that can be capable of combining the functionality of optics unit 610 and optics unit 629 illustrated in FIG. 6. Optics unit 712 can include one or more optics, microoptics, microlens, or a combination configured to collect incident light, condition the light beam size and shape, and focus incident light. Optic 718, included in optics unit 712, can collect light 754 reflected off location 757. Optic 719, included in optics unit 712, can collect light 755 reflected off location 759. The optics (e.g., optic 718 and optic 719) included in optics unit 712 can change the angle (i.e., redirect the light beam) of light (e.g., light 754 and light 755) such that light is directed towards detector array 730. In some examples, the angles of incidence of light 754 and light 755 can be the same, and optic 718 and optic 719 can be configured to redirect incident light by the same degree. One skilled in the art would appreciate that the same angles of incidence and same degree can include tolerances that result in a 15% deviation. In some examples, the medium between optics unit 712 and detector array 730 can be configured with a refractive index such that the change in angle (i.e., bending) of light 754 and light 755 increases. In some examples, the medium can be multi-functional and can include a conformal insulating material that provides mechanical support. In some examples, the optics unit 712 can preferentially collect light rays included in light 754 and light rays included in light 755 with angles of incidence within a range of collection angles.

Additionally, optic 718 and optic 719, included in optics unit 712, can focus light 754 and light 755 towards detector pixel 733 and detector pixel 737, respectively, included in detector array 730. Although a system (e.g., system 600 illustrated in FIG. 6) with two-layers of optics can include an optics unit (e.g., optics unit 610) that can be configured for light collection, turning the beam, and focusing incident light, optics unit 712 can be configured with a higher focusing power (i.e., degree which an optics converges or diverges incident light) than the system with the two-layers of optics. In some examples, optics unit 712 can include a plurality of silicon optics.

System 700 can also include an aperture layer 786. Aperture layer 786 can include a plurality of openings configured to allow light 754 and 755 (e.g., any light with an angle of incidence within a range of collection angles), respectively, to transmit through. In some examples, aperture layer 786 can be located on an external surface (e.g., the housing) of system 700 and can be configured to allow light to enter into system 700. Although FIG. 7 illustrates aperture layer 786 located on an external surface of the system 700, examples of the disclosure can include aperture layer 786 located on another side (e.g., an internal surface of the system 700) or another layer.

Each optics included in optics unit 712 can be coupled to a detector pixel (e.g., detector pixel 733 or detector pixel 737), included in detector array 730. Each optics-detector pixel pair can be associated with an optical path in sample 720. In some examples, the association can be one optics-detector pixel pair to one optical path. For example, optic 718 and detector pixel 733 can form an optics-detector pixel pair that is associated with light 754 (or light with the same optical path length as light 754), and optic 719 and detector pixel 737 can form another optics-detector pixel pair that is associated with light 755 (or light with the same optical path length as light 755). One skilled in the art would appreciate that the same optical path length can include tolerances that result in a 15% deviation. Although FIG. 7 illustrates detector pixel 733 and detector pixel 737 as single detector pixels, each individually associated with optics, examples of the disclosure can include multiple detector pixels associated with the same optics and multiple optics associated with the same detector pixel.

In some examples, the system can be configured with one-layer of optics to reduce the stackup or height of the system. In some examples, the system can be configured with two-layers of optics for higher angular resolution, larger angular range of incident light, or both. In some examples, the system can be configured with the number of layers of optics being different for light emitted from the light sources and for light collected from the sample. For example, the system can be configured with one-layer of optics for light emitted from the light sources and two-layers of optics for light collected from the sample, or the system can be configured with two-layers of optics for light emitted from the light sources and one-layer of optics for light collected from the sample.

Although FIGS. 2-7 illustrate the system close to the sample, examples of the disclosure can include a system configured for touching a surface of the sample. In some examples, a surface of the optics unit (e.g., optics unit 410, optics unit 512, optics unit 610, or optics unit 712) can be touching a surface of the sample. Generally, closer proximity of the sample to the optics unit can lead to fewer and smaller optical components needed in the system, better measurement accuracy, and lower power consumption of the system.

The close proximity of the device can exploit a reduced effective numerical aperture (NA) of the light rays exiting the sample. The reduced effective NA can be used to characterize the range of angles that the system can accept as reflected light from the sample. This reduced effective NA can be due to angles of incidence on the optics and detector that are closer to normal incidence due to Snell's Law. With angles of incidence closer to normal, the aperture size and the pitch of the optics can be made smaller, leading to a smaller system. Additionally, the detector can receive a higher optical power, which can lead to better measurement accuracy and a system that can be configured for lower power consumption.

Figure 8:
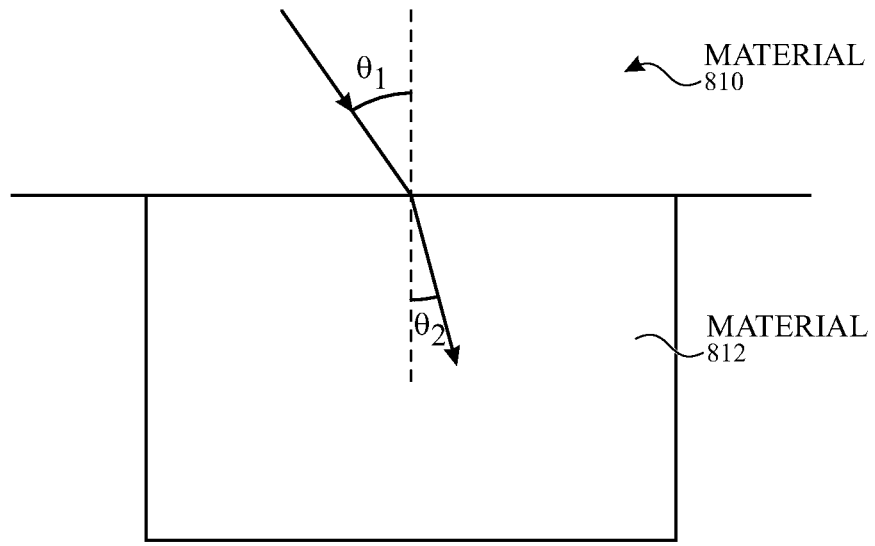
FIG. 8 illustrates Snell's Law according to examples of the disclosure.

FIG. 8 illustrates Snell's Law according to examples of the disclosure. Snell's law can describe the properties of a light ray that refracts at an interface between two materials with different refractive indices. Snell's law is stated as:

$$n_1 \sin \theta_1 = n_2 \sin \theta_2 \qquad (1)$$

Material 810 can have a refractive $n_1$, and material 812 can have a refractive index $n_2$, where the refractive index $n_1$ can be different from the refractive index $n_2$. The light ray can be incident on the material 810-material 812 interface at angle of incidence $\theta_1$. Due to the refractive index difference between the two materials, the light ray can refract and can enter material 812 at an angle of refraction $\theta_2$ different from the angle of incidence $\theta_1$. If material 810 has a refractive index less than the refractive index of material 812, then the angle of refraction $\theta_2$ can be reduced (i.e., closer to normal incidence).

With a high enough optical power, the optics unit can act like an immersion lens objective. An immersion lens objective can be a system where the optics and sample are surrounded or immersed in a medium with a contrasting refractive index. A contrasting refractive index can lead to a larger change in reduced effective NA than a non-immersed (e.g., the optics and sample are surrounded by air) system. A larger change in reduced effective NA can lead to more light refraction, which can reduce the optical aberrations and can lead to better measurement accuracy. The optical immersion can also eliminate or reduce TIR at the exterior interface of the system (e.g., interface where the system contacts the sample), which can lead to more light reaching the detector. As a result of more light reaching the detector, the light sources included in the system can be driven with less power, and thus, the system can require less power.

Additionally, the close proximity of the optics unit to the sample can allow the system to employ a well-defined (i.e., definite and distinct) interface, such as the exterior interface of the system (e.g., interface where the system contacts the sample), as a reference. The system may need to accurately reference the "beginning" or "edge" of the sample in order to reimage and resolve the multiple optical paths within the sample. With the exterior interface of the system (e.g., interface where the system contacts the sample) as a reference, fewer optical elements or components (e.g., a separate window) may be needed, since otherwise an additional optical component can be required to create the well-defined interface. Fewer optical components can lead to a more compact system.

In addition to locating the device in close proximity (e.g., touching) to the sample, the measurement region of the sample can affect the system's capability of accurately reimaging and resolving multiple optical paths within the sample. One factor that can affect the accurate reimaging and resolution can be the measurement path length. The measurement path length can be selected based on a targeted (e.g., pre-determined) path length, which can be a path length such that the spectroscopic signal measured by the detector accurately represents the desired one or more properties of the sample. The targeted measurement path length can be determined based on the scale lengths of the sample. The scale lengths of the sample can be based on the mean absorption length in the sample and the reduced scattering length in the sample.

The mean absorption length in a sample can be the distance over which light can attenuate. If the measurement path length is longer than the mean absorption length, the remaining signal (i.e., signal that has not scattered) or the measured signal intensity can be reduced, while any noise sources may not attenuate by an equivalent amount. As a result of the imbalance in attenuation, the SNR can be lower. The mean absorption length can be defined by the Beer-Lambert Law, which can mathematically describe the absorption A of light by a substance in a sample at a given wavelength as:

$$A = ecL \quad (2)$$

where e is the molar absorptivity (which can vary with wavelength), L is the path length through the sample that light has to travel, and c is the concentration of the substance of interest.

If the background absorption (i.e., absorption by substances different from the substance of interest) is high, the path length through the sample that light has to travel can be less than the mean absorption length. If the background absorption is negligible, the path length can be the same as the mean absorption length. One skilled in the art would appreciate that the same path length can include tolerances that result in 15% deviation. In some examples, the mean absorption length can be selected such that the mean absorption length is greater than or equal to the path length through the sample that light has to travel.

The reduced scattering length can be the distance over which information about the optical path is lost (i.e., randomized or decorrelated). The reduced scattering length can be determined by:

$$\mu_s' = \mu_s(1-g) \quad (3)$$

where $1/\mu_s$ is the mean free path between scattering events and g is the scattering anisotropy. If the measurement path length is greater than the reduced scattering length, the measurement accuracy can be compromised. In some examples, the measurement path length can be selected such that the measurement path length is less than the reduced scattering length.

In some examples, the mean absorption length can be different from the reduced scatter length, and the measurement path length can be selected based on the smaller of the mean absorption length and reduced scattering length. In some examples, the mean absorption length can be short or absorption of light in the sample can be strong such that the signal of reflected light is undetected, and the system can be configured to increase the optical power of the light sources or increase the sensitivity of the detector to compensate. In some examples, the amount of compensation can be based on the power consumption, optical damage to the sample, unwanted heating effects in the sample, effects to the photon shot-noise, detected stray light that has not transmitted through the sample, or any combination of effects. Therefore, the selection of the measurement path length can affect not only the measurement accuracy, but also the power consumption, reliability, and lifetime of the system.

Additionally or alternatively, the system can be configured to utilize the effective scale length when the optical parameters of the sample vary (e.g., by more than 10%) with wavelength, for example. The effective scale length can be determined by calculating individual scale length for each wavelength, and taking an average of the individual scale lengths across the wavelengths of interest. In some examples, the individual scale length for each wavelength can be calculated to determine the range of individual scale lengths. The system can be configured to select the minimum scale length (among the range of individual scale lengths), the maximum scale length (among the range of individual scale lengths), or any scale length between the minimum scale length and the maximum scale length. In some examples, the measurement path length can be selected based on the mean absorption length, reduced scattering length, minimum scale length, maximum scale length, or any combination.

As discussed above, the scale length can be used to determine the size of the measurement region on the sample. Light outside of the measurement region can be light rays that have undergone multiple random scattering events within the sample, and as a result, these light rays can be decorrelated from the optical path traveled within the sample. Decorrelated light rays may not contribute useful information for an accurate measurement, and as a result, can be discarded or ignored without sacrificing an accurate measurement.

For example, the wavelengths of interest can be between 1500 nm-2500 nm (i.e., SWIR range), and the mean absorption length and reduced scattering length averaged over the wavelengths of interest can be 1 mm, which can correspond to a scale length of 1 mm. This scale length can correspond to a region of the sample with a diameter of 1-2 mm to be used for collecting light exiting the sample. That is, the majority (e.g., greater than 70%) of the optical power that exits the sample can be concentrated within this 1-2 mm diameter region, and the light rays exiting the sample outside of this region can be ignored.

The scale length can be also used to determine the size of the input light beam emitted from the outcoupler. The size of the light beam can affect the optical power (i.e., optical intensity) and diffraction effects. Measurement accuracy can favor a collimated input light beam in order for the system to operate with a sufficient optical power (e.g., a signal with a high enough SNR that can be detected by the detector) and minimal diffraction effects. For example, a scale length of 1 mm can correspond to a collimated input light beam with a beam diameter between 100-300 µm. In some examples, the input light beam can be configured with a beam diameter of less than 175 µm.

Similar to the properties of the input light beam, the properties of the optics unit(s) can also affect the system. The optics unit(s) can be formed on a single substrate or layer or can be formed on two or more substrates or layers. In some examples, the optics unit(s), detector array, light sources, or any combination can be mounted onto the same optical platform. In some examples, the optics unit(s) can have a plano (i.e., flat) surface contacting the sample. Configuring the optics with a plano surface can reduce wafer handling and fabrication complexity. In some examples, the other surface (i.e., the surface opposite the sample) can be convex to enhance the optics power. In some examples, this other surface can be a single convex refracting surface. In some examples, the thickness of the optics unit(s) can be based on the amount of light bending. In some examples, the thickness can be between 100-300 µm.

Figure 9A:
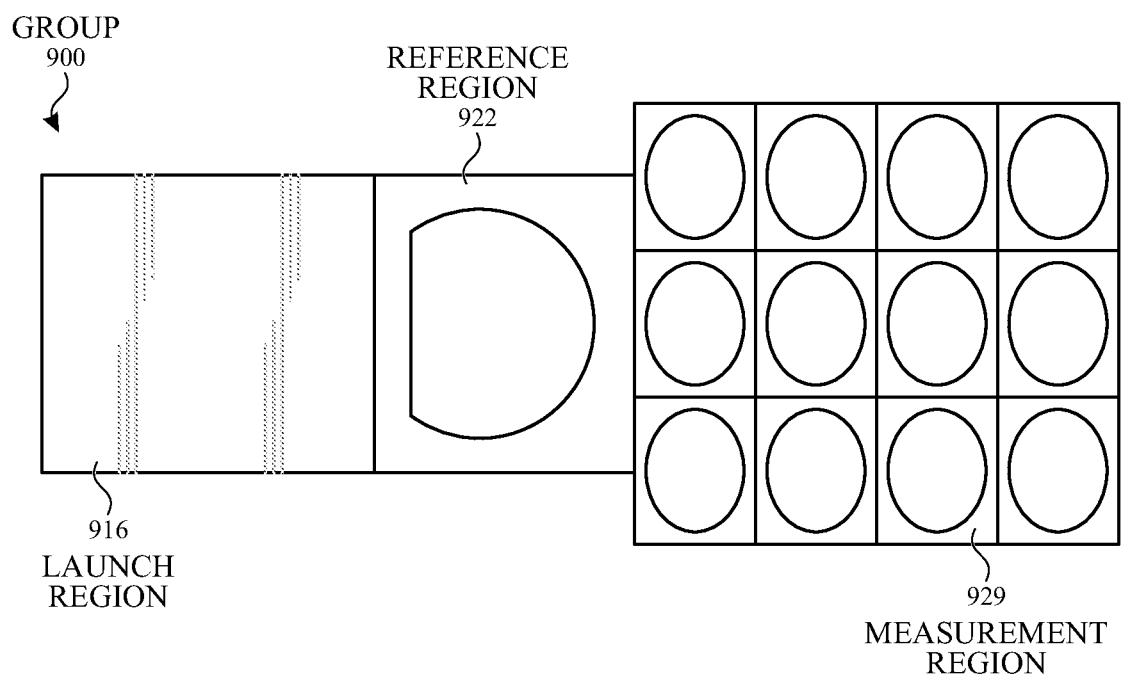
FIGS. 9A-9B illustrate top and perspective views of an exemplary group including an optics unit according to examples of the disclosure.
Figure 9B:
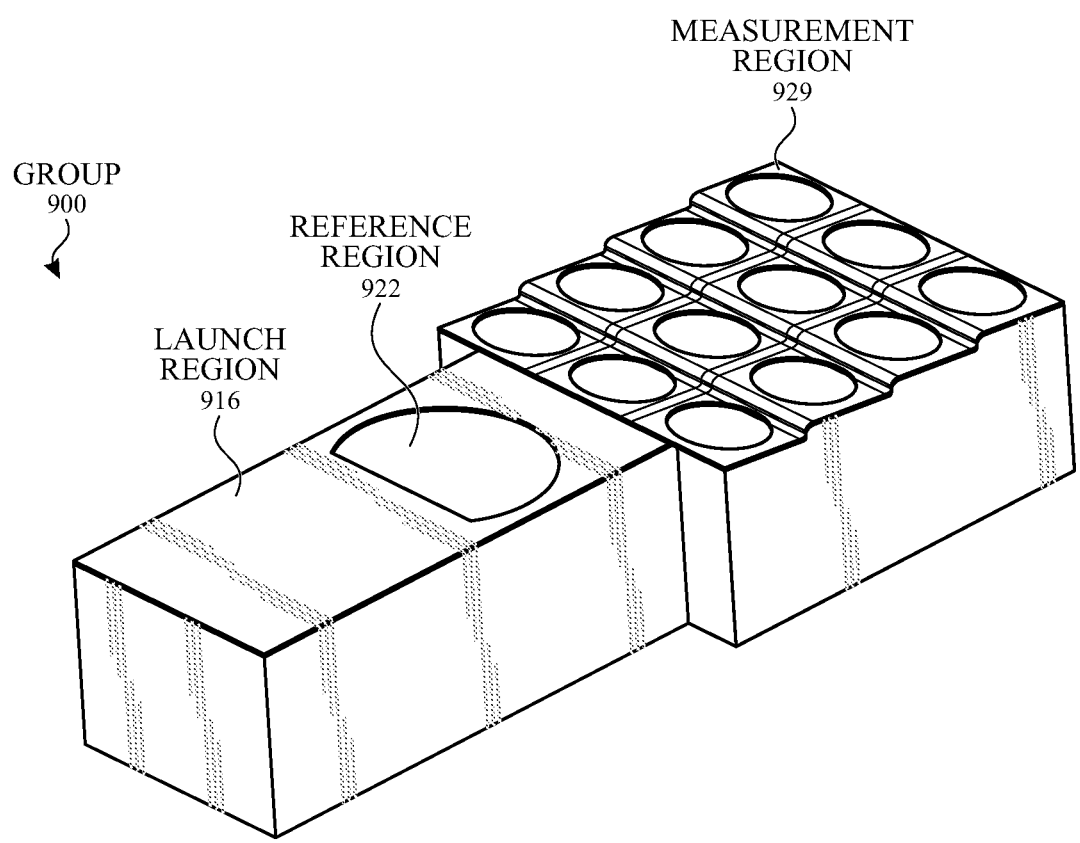

FIGS. 9A-9B illustrate top and perspective views of an exemplary optics unit according to examples of the disclosure. A group 900 can include a plurality of units, each unit including at least three regions: launch region 916, reference region 922, and measurement region 929.

Launch region 916 can be configured to prevent any specular reflection from reaching the detector array. Launch region 916 can include a light blocker or light absorber capable of blocking or absorbing light. In some examples, the light blocker can include any material that prevents incident light from reflecting (e.g., an anti-reflection coating). In some examples, the light blocker can include any material that reflects at wavelengths different from the detection wavelengths of the detector array. In some examples, launch region can include an opaque mask.

Reference region 922 can include any type of optics (e.g., a negative microlens) configured for spreading out incident light beams. Light emitted from the light source can be directed at a reference (e.g., reference 222 included in system 200), which can relay light to reference region 922. Reference region 922 can spread out that light such that one or more light beams are directed to detector pixels on the detector array. In some examples, reference region 922 can include a negative lens or a lens with a focal length that is negative. In some examples, reference region 922 can include a prism. In some examples, reference region 922 can include a different prism wedge angled for each detector pixel in the detector array. In some examples, reference region 922 can include a beamsplitter. In some examples, reference region 922 can be configured to spread out or divide light into multiple beams. In some examples, reference region 922 can be configured to uniformly spread out light such that one or more properties of each light beam is the same. One skilled in the art would appreciate that the same properties can include tolerances that result in a 15% deviation. In some examples, reference region 922 can be configured to spread out the light beam such that intensities of at least two light beams are different. In some examples, reference region 922 can include multiple optics. In some examples, the size and/or shape of optics included in reference region 922 can be based on the number of detector pixels and/or the properties of the one or more light beams exiting reference region 922. In some examples, one or more aperture layers can be located in reference region 922 to control the properties and/or direction of light exiting reference region 922.

Measurement region 929 can include one or more collection optics (e.g., a positive microlens). The collection optics can be configured to reimage and resolve multiple optical paths in the sample, as discussed above. The system can be configured to chop or alternate between emitting light from the light source to be incident on reference region 922 and emitting light from the light source to be incident on measurement region 929. The properties of the collection optics will be discussed below.

Figure 9C:
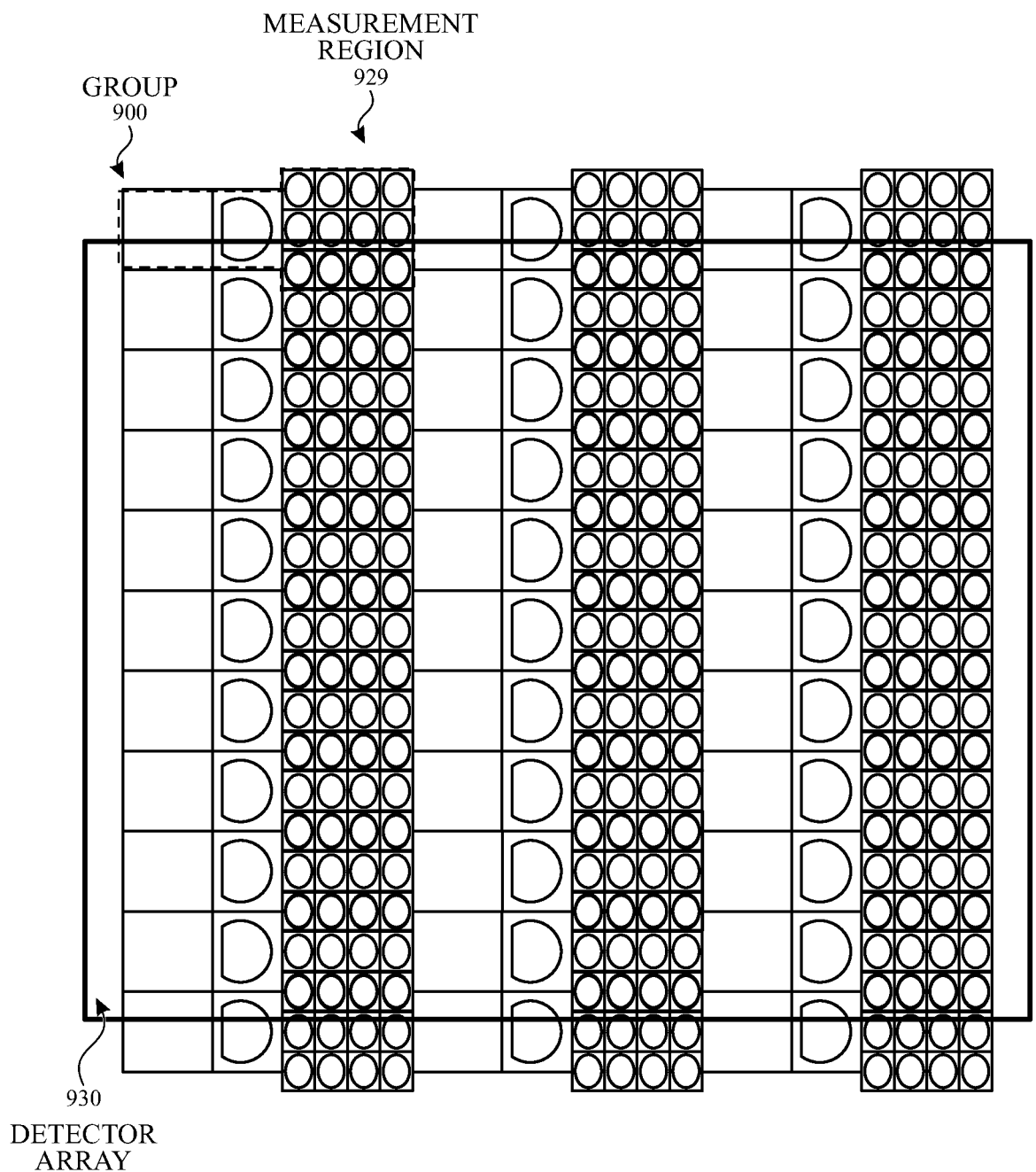
FIG. 9C illustrates a top view of exemplary multiple groups including optics units and detector arrays in a system according to examples of the disclosure.

Although FIGS. 4A-7 illustrate units included the system, where each unit can include one light beam from the outcoupler that exits the sample and is collected by a conjugate optic system and detector array, examples of the disclosure include systems with multiple units. FIG. 9C illustrates a top view of an exemplary optics unit and detector array included in multiple groups included in a system according to examples of the disclosure. The system can include a plurality of groups 900 coupled to a detector array 930. In some examples, one or more optics included in measurement region 929 can be "shared" between adjacent groups 900. In some examples, the system can be configured with one or more groups with light sources that alternate emitting light to the shared optics. In some examples, the system can be configured with 27 groups 900 and a 9×3- detector array 930. In some examples, each group 900 can be separated from another group 900 by at least 2 mm.

Although FIGS. 9A-9B illustrate groups 900 arranged with the reference region 922 located between the launch region 916 and a grid of 3×3 optics included in the measurement region 929, examples of the disclosure can include any arrangement of the three regions and any arrangement of the optics included in the measurement region 929. For example, the launch region 916 can be located in the center of group 900, and the optics can surround the outer edges of the launch region 916.

As discussed above, the configuration and properties of the optics included in the optics unit(s) can be based on numerous factors. These properties can include the effective focal length, working distance, material of the optics, the fill-factor, the aperture size, the pitch, the tilt (or decenter), and the orientation (or rotation), as will be discussed.

The system can be configured with an effective focal length based on the relationship between the range of collection angles and the location on the surface of the detector (or detector pixel) that the light ray is incident upon. The system can also be configured based on the integration of the detector array.

Since the optics unit(s) is located in the path between the sample and the detector, the material of the optics can affect the optical properties of the detected light, and thus, the measurement accuracy. To allow light exiting the sample to reach the detector array, the optics can be configured with a material that is transparent over the wavelength range of interest such that light can be prevented from reflecting off the surfaces of the optics. Additionally, in examples where the optics unit is in contact with the sample, the material of the optics can be based on resistance to material degradation from chemical and physical exposure of the optics to the sample. Furthermore, other considerations, such as compatibility with wafer-scale processing for creating any patterns (e.g., etch profiles) for the optics unit, availability of a material, and cost can be considered.

The material of the optics unit can also be selected based on the refractive index of the sample. For example, the system can be configured with an optics unit with a refractive index of 3.4 (e.g., an unit of silicon lenses) (or within 10%) when the sample has a refractive index 1.42 (or within 10%). Incident light can have an angle of incidence of 45° at the exterior interface of the system (e.g., interface where the system contacts the sample), which can lead to an angle of refraction of 16.9°. In this manner, the material of the optics unit can be selected such that the angle of incidence on the surface of the detector array can be closer to normal, which can be lead to the detector receiving a higher optical power, better measurement accuracy, and a system that can be configured for lower power consumption.

Furthermore, the material of the optics unit can be selected such that less "spreading" (i.e., dispersion of the bundles of light between the exterior interface of the system (e.g., interface where the system contacts the sample) and the surface of the detector) of light rays occurs. For example, light incident on the exterior interface of the system (e.g., interface where the system contacts the sample) with an angle of incidence of 60° can lead to an angle of refraction of 20.9°. Without a refractive index contrast between the optics unit and the sample, the spreading would be 15° (i.e., 60°-45°), whereas with a refractive index contrast between the optics unit and the sample, the spreading of light rays can be 4° (i.e., 20.9°-16.9°). A smaller spread of light rays can lead to a narrower range of collection angles, which can result in smaller optics and a more compact system.

In some examples, the wavelength range of interest can be SWIR (i.e., 1500 nm-2500 nm), and the optics unit can include single-crystal Silicon, Sapphire, fused Silica, oxide glasses, chalcogenide glasses, gallium arsenide (GaAs), Zinc Selenide (ZnSe), Germanium (Ge), or any combination of these materials.

The diameters of the optics can be based on the size of the light beam emitted from the light source. For example, a system configured with a light beam diameter between 100-300 µm can also be configured with an optics unit with diameters between 100-300 µm.

The fill-factor of the optics unit can represent the percentage or fraction of light rays exiting the sample that is collected. In general, reduced spreading of bundles of incident light can lead to a higher fill-factor (i.e., ratio of the area of light directed at the detector to the total area of the optics) at the optics unit, and hence, can lead to a higher optical efficiency. The fill-factor of an optic can be determined by:

$$FF = \frac{\pi}{4}\left(\frac{AD}{\text{pitch}}\right)^2 \quad (4)$$

where AD is the aperture size. The fill-factor FF of a lens or micro-lens can represent the amount of light that exits the sample, refracts into the system, and transmits through an aperture. In some examples, the aperture size of an aperture associated with an optics included in the optics unit(s) included in the optics unit can be based on the spread of the incident light rays. With a lower amount of spreading of incident light rays, the aperture size and optics pitch can be decreased such that a high fill-factor is achieved without loss of incident light rays that include pertinent information (e.g., information that can contribute to better measurement accuracy). In some examples, the optics unit can be configured with a fill-factor FF of 25% or greater. In some examples, the optics unit can be configured with a fill-factor FF of 50% or greater. In some examples, the optics unit can be configured with a fill-factor FF of 60% or greater.

The pitch of the optics unit can be the distance between adjacent optics, which can affect the size of the optics. In some examples, the pitch can be based on the fill-factor of the optics unit. As illustrated in Equation 4, the fill-factor of the optics unit can be related to the aperture size, so pitch of the optics unit can be also based on the aperture size. To increase the fill-factor and the efficiency of capturing light rays exiting the sample, the pitch can be greater than the aperture size. For example, for an aperture size between 100-300 µm, the optics can be configured with a pitch between 125-500 µm. In some examples, the aperture size can be configured to be 175 µm in diameter, the pitch can be 250 µm, and the fill-factor can be 38.4%.

Additionally or alternatively, the optics pitch and the aperture size can be based on the range of collection angles. The aperture size can determine which among the light rays exiting the sample are accepted (i.e., transmitted through to the detector) by the optics and which are rejected (i.e., prevented from reaching the detector). The sample material and substances in the sample can lead to a high anisotropy of scattering. As a result, the collection efficiency (i.e., efficiency of the collected scattered light) can be based on the range of collection angles. While a wider range of collection angles can lead to more light collection (i.e., higher optical power), the collected light may include a larger proportion of unwanted light (e.g., noise or decorrelated light). Different angles of collected light rays can have a different importance or relevance to an accurate measurement. In some examples, the optical power of the light rays can be lower as light deviates (e.g., greater than 70° from normal incidence on the detector surface. The light rays with angles of incidence that deviate from normal incidence can include light rays with smaller crossing angles with light emitted from the light source (which can lead to a larger uncertainty in the scattering location or path length) and light rays with a large number of scattering events. As a result, light rays with angles of incidence that deviate from normal incidence can be less relevant and can lead to less accurate measurements. Furthermore, light rays that deviate from normal incidence can include light scattered from locations at shallow depths within the sample. In some applications, substances of interest in a sample may be located deep within the sample, so light rays scattered from locations at shallow depths within the sample may not contribute relevant information to the measurement.

Affected by the range of collection angles can be the aperture size, optics or optics pitch, collection efficiency, optical power incident on the detector, and the power of the system. The range of collection angles that the system can be configured to measure can be based on a targeted (e.g., pre-determined) range of collection angles. The targeted range of collection angles can be determined based on several factors, such as the collection efficiency, geometrical path uncertainty, number of scattering events likely to occur within the sample, depth of penetration, and limitations of the optics design, which can be determined based on the path length of a light ray. To determine the path length of a light ray, multiple uncertainties that exist can be considered. The total path length uncertainty ΔPL can include spatial resolution uncertainty Δspatial, angular resolution uncertainty Δangular, input Gaussian angular divergence Δinput, and low-angle sample scatter uncertainty Δmultiple scatter, and can be defined as:

$$\Delta PL^2 = (\Delta \text{spatial})^2 + (\Delta \text{angular})^2 + (\Delta \text{input})^2 + (\Delta \text{multiple\_scatter})^2 \quad (5)$$

Figure 10:
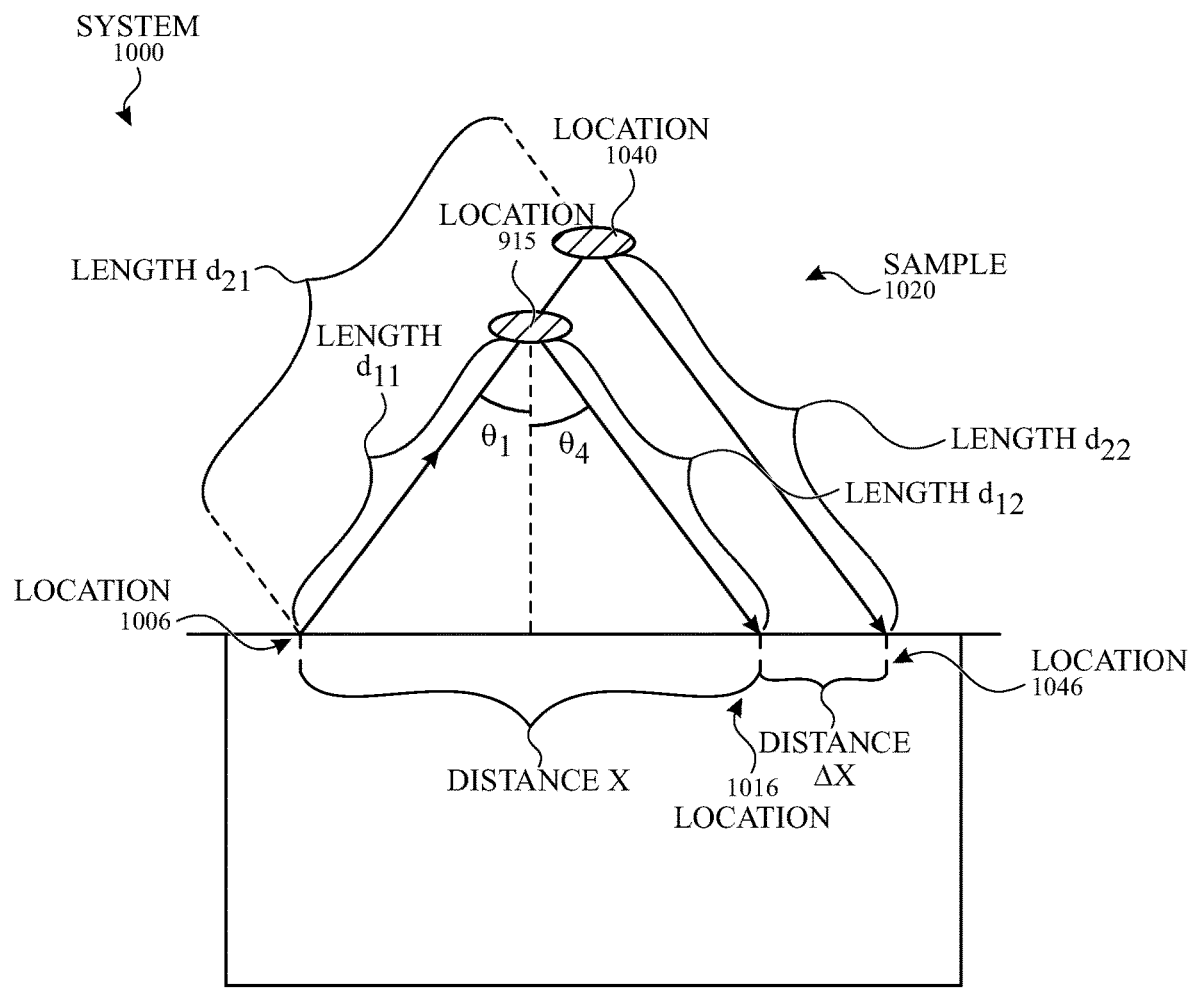
FIG. 10 illustrates an exemplary configuration with light rays having a spatial resolution uncertainty according to examples of the disclosure.

The properties of one or more of the optics and aperture layers in the system can be configured based on the spatial resolution uncertainty. FIG. 10 illustrates an exemplary configuration with light rays having a spatial resolution uncertainty according to examples of the disclosure. System 1000 can be touching or in close proximity to sample 1020. Light can exit system 1000 at location 1006 and can travel a length $d_{11}$ through sample 1020 to location 1010. The angle of the incidence of light at location 1010 can be angle of incidence $\theta_1$. A portion of light can scatter at a scattering angle $\theta_4$, travel a length $d_{12}$ through sample 1020, and can reach the exterior interface of the system (e.g., interface where the system contacts the sample) at location 1016. The distance between location 1006 and location 1016 can be referred to as distance x. Another portion of light can travel further into the sample 1020, traveling a total length $d_{21}$, to location 1040. In some examples, the angle of incidence of light at location 1040 can also be the angle of incidence $\theta_1$, and light can also scatter at the scattering angle $\theta_4$. The scattered light can travel a length $d_{22}$ through sample 1020 and can reach the exterior interface of the system (e.g., interface where the system contacts the sample) at location 1046. The spatial resolution or the distance between location 1016 and location 1046 can be referred to as spatial resolution or distance Δx.

The spatial resolution uncertainty Δspatial can be based on the difference in optical path lengths between scattered light incident at location 1016 and scattered light incident at location 1046 and can be defined as:

$$\Delta \text{spatial} = d_{21} + d_{22} - d_{11} - d_{12} \quad (6)$$

Based on the law of sines:

$$\frac{x}{\sin(\theta_1 + \theta_4)} = \frac{d_{12}}{\sin(90° - \theta_1)} = \frac{d_{11}}{\sin(90° - \theta_4)} \quad (7)$$

$$d_{11} = \frac{\sin(90° - \theta_4)}{\sin(\theta_1 + \theta_4)} x \quad (8)$$

$$d_{12} = \frac{\sin(90° - \theta_1)}{\sin(\theta_1 + \theta_4)} x \quad (9)$$

$$d_{21} = \frac{\sin(90° - \theta_4)}{\sin(\theta_1 + \theta_4)} (x + \Delta x) \quad (10)$$

$$d_{22} = \frac{\sin(90° - \theta_1)}{\sin(\theta_1 + \theta_4)} (x + \Delta x) \quad (11)$$

Therefore, the spatial resolution uncertainty Δspatial can be reduced to:

$$\Delta \text{spatial} = \frac{\sin(90° - \theta_1) + \sin(90° - \theta_4)}{\sin(\theta_1 + \theta_4)} (\Delta x) \quad (12)$$

As illustrated in Equation 12, the spatial resolution uncertainty Δspatial can decrease as the angle of incidence $\theta_1$, and scattering angle $\theta_4$ can increase. Additionally, the spatial resolution uncertainty Δspatial can increase as the spatial resolution Δx (i.e., distance between light incident at location 1016 and light incident at location 1046) increases. In some examples, the aperture size, tilt, or orientation of the optics, or a combination can be configured based on the spatial resolution uncertainty Δspatial. In some examples, the spatial resolution uncertainty Δspatial can be between 150-200 μm, which can coincide with an angle of incidence $\theta_1=45°$ and collection angle (which can be equal to the scattering angle $\theta_4$) of 45°.

Figure 11:
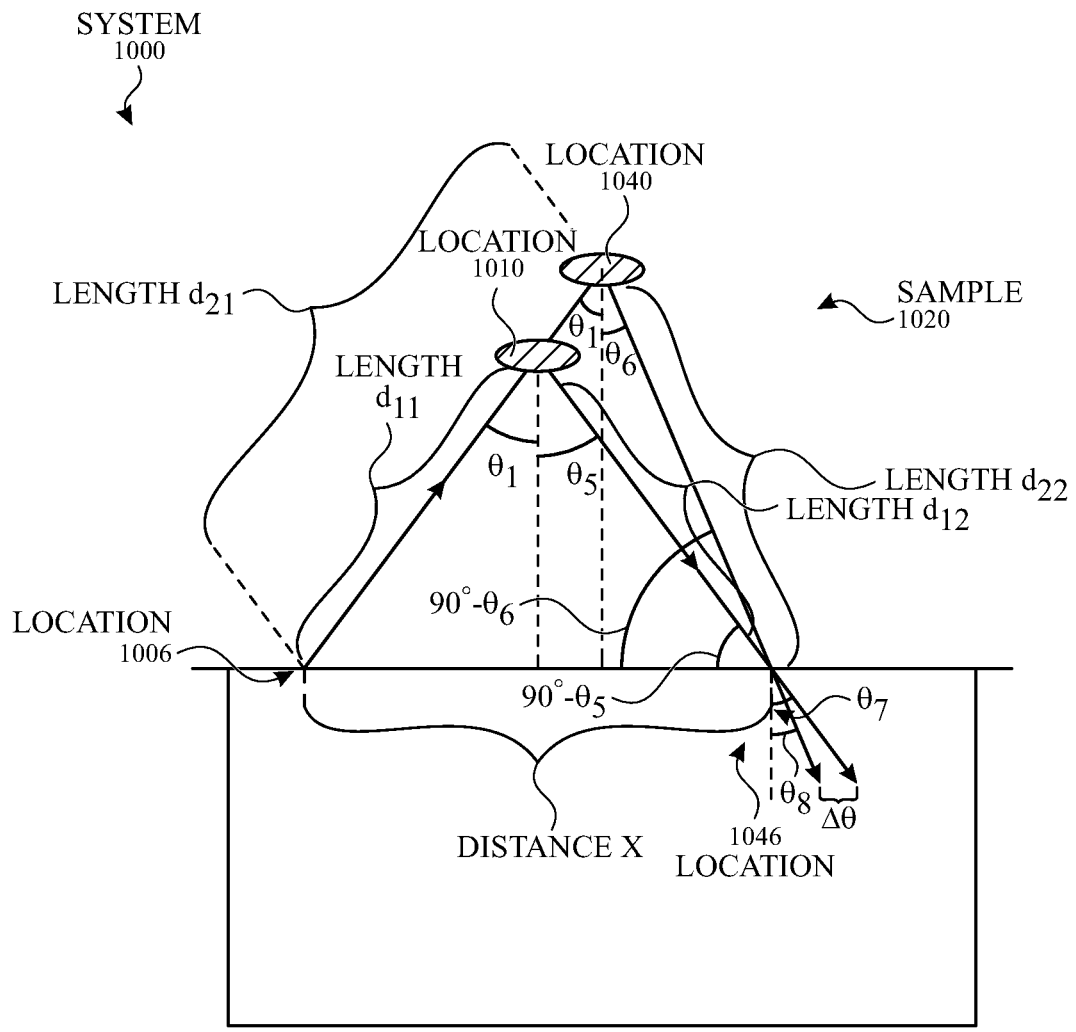
FIG. 11 illustrates an exemplary configuration with light rays having an angular resolution uncertainty according to examples of the disclosure.

The properties of one or more of the optics in the system can also be configured based on the angular resolution uncertainty. FIG. 11 illustrates an exemplary configuration with light rays having an angular resolution uncertainty according to examples of the disclosure. System 1100 can be touching or in close proximity to sample 1120. Light can exit system 1100 at location 1106, and can travel a length $d_{11}$ through sample 1120 to location 1110. The angle of incidence of at location 1110 can be angle of incidence $\theta_1$. A portion of light can scatter from location 1110 at a scattering angle $\theta_5$, travel a length $d_{12}$ through sample 920, and reach the exterior interface of the system (e.g., interface where the system contacts the sample) at location 1146. The change in refractive index at the exterior interface of the system (e.g., interface where the system contacts the sample) can lead to an angle of refraction $\theta_8$. Another portion of light can travel further into sample 1120, traveling a total length $d_{21}$, to location 1140. In some examples, the angle of incidence of light at location 1140 can also be angle of incidence $\theta_1$, and light scattered from location 1140 can have a scattering angle $\theta_6$. In some examples, scattering angle $\theta_6$ can be different from scattering angle $\theta_1$. Light scattered from location 1140 can travel a length $d_{22}$ through sample 1120 and reach the exterior interface of the system (e.g., interface where the system contacts the sample) at location 1146. The change in refractive index at the exterior interface of the system (e.g., interface where the system contacts the sample) can lead to an angle of refraction $\theta_7$. The distance between location 1106 and location 1146 can be referred to as distance x. In some examples, angle of refraction $\theta_8$ can be different from angle of refraction $\theta_7$ by an angular resolution of Δθ.

The angular resolution uncertainty Δangular can be based on the difference in angles of refraction between the two scattered light beams (e.g., light scattered from location 1110 and light scattered from location 1140) and can be defined as:

$$\Delta \text{angular} = d_{21} + d_{22} - d_{11} - d_{12} \quad (13)$$

Based on the law of sines and Snell's law:

$$d_{11} = \frac{\sin(90° - \theta_6)}{\sin(\theta_1 + \theta_6)} x \quad (14)$$

$$d_{12} = \frac{\sin(90° - \theta_1)}{\sin(\theta_1 + \theta_6)} x \quad (15)$$

$$d_{21} = \frac{\sin(90° - \theta_5)}{\sin(\theta_1 + \theta_5)} x \quad (16)$$

$$d_{22} = \frac{\sin(90° - \theta_5)}{\sin(\theta_1 + \theta_5)} x \quad (17)$$

Therefore, the angular resolution uncertainty Δangular can be reduced to:

$$\Delta \text{angular} = \left[ \left( \frac{\sin(90° - \theta_6) + \sin(90° - \theta_1)}{\sin(\theta_6 + \theta_1)} \right) - \left( \frac{\sin(90° - \theta_5) + \sin(90° - \theta_1)}{\sin(\theta_5 + \theta_1)} \right) \right] x \quad (18)$$

As illustrated in Equation 18, the angular resolution uncertainty Δangular can increase as the distance x between light emitted from the light source and the exit location increases. In some examples, the system can be configured with a distance between the light source and the corresponding optics included in the optics unit that is based on the angular resolution uncertainty Δangular. In some examples, the system can be configured with a range of collection angles (i.e., angle bin) based on the angular resolution uncertainty Δangular. In some examples, the tilt, orientation, or both of the optics in the system can be configured based on the angular resolution uncertainty Δangular. In some examples, the angular resolution uncertainty can be between 40-100 μm, and the range of collection angles can be between 5° and 10°.

Figure 12:
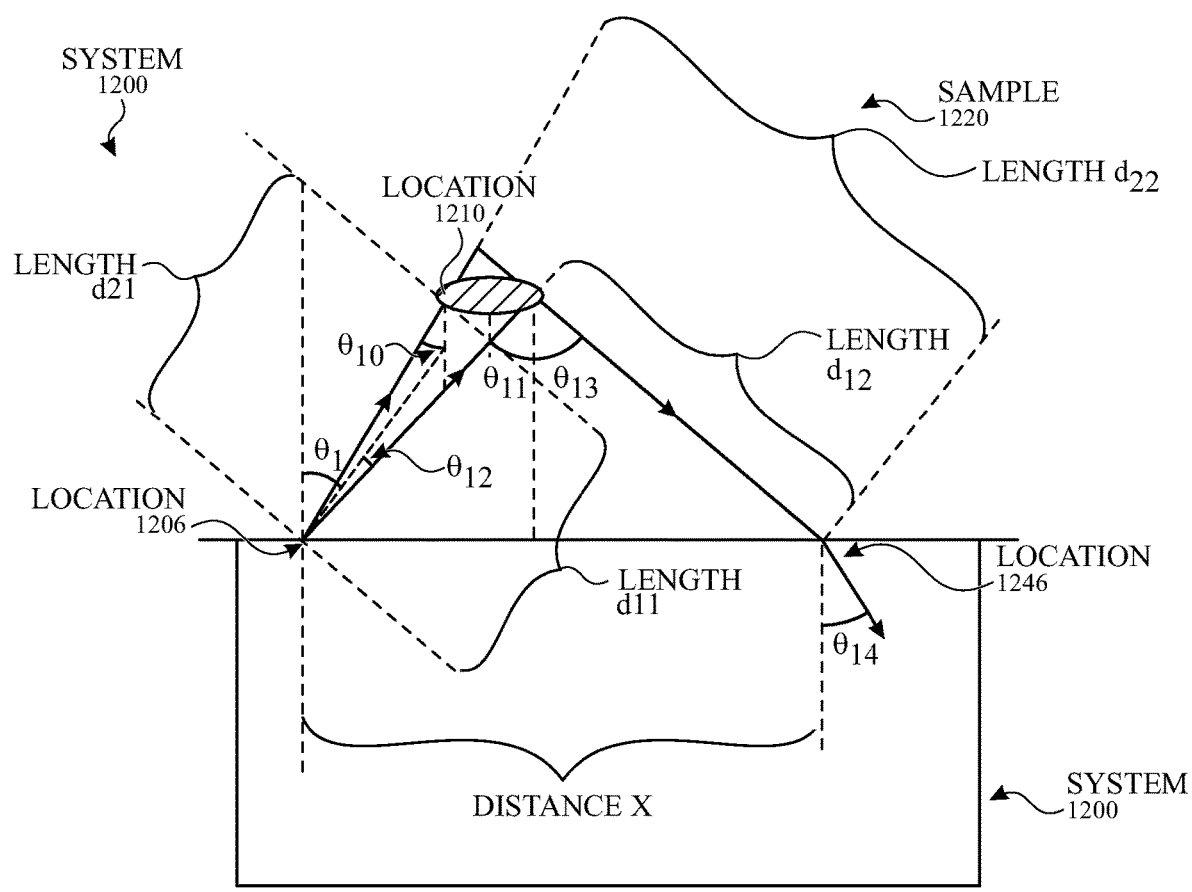
FIG. 12 illustrates an exemplary configuration with an input light beam with a Gaussian angular divergence according to examples of the disclosure.

The properties of the light beam in the system can be configured based on the Gaussian angular divergence. FIG. 12 illustrates an exemplary configuration with an input light beam with a Gaussian angular divergence according to examples of the disclosure. System 1200 can be touching or in close proximity to sample 1220. Light can exit system 1200 at location 1206 and can have an angle of incidence $\theta_1$ (measured relative to the half-angle divergence $\theta_{12}$). In some examples, a portion of light emitted from the light sources can diverge with a portion of light having an angle of incidence $\theta_{10}$ at location 1210 and travel a length $d_{21}$ through sample 1220 to location 1210. Another portion of light emitted from the light sources can diverge with an angle of incidence $\theta_{11}$ also at location 1210 and travel a length $d_{12}$ through sample 1220 to location 1210. Light can scatter from location 1210 to location 1246 on the exterior interface of the system (e.g., interface where the system contacts the sample) at a scattering angle $\theta_{13}$. A portion of the scattered light can travel a length $d_{12}$ through sample 1220, and the other portion of the scattered light can travel a length $d_{22}$ through sample 1220. The change in refractive index at the exterior interface of the system (e.g., interface where the system contacts the sample) can lead to angle of refraction $\theta_{14}$.

The Gaussian angular divergence Δinput can be based on the difference in optical path lengths between the diverged light rays and can be defined as:

$$\Delta\text{input} = d_{21} + d_{22} - d_{11} - d_{12} \quad (19)$$

Based on the law of sines:

$$d_{11} = \frac{\sin(90° - \theta_{13})}{\sin(\theta_{13} + \theta_1 + \theta_{12})} x \quad (20)$$

$$d_{12} = \frac{\sin(90° - \theta_1 - \theta_{12})}{\sin(\theta_{13} + \theta_1 + \theta_{12})} x \quad (21)$$

$$d_{21} = \frac{\sin(90° - \theta_{13})}{\sin(\theta_{13} + \theta_1 - \theta_{12})} x \quad (22)$$

$$d_{22} = \frac{\sin(90° - \theta_1 + \theta_{12})}{\sin(\theta_{13} + \theta_1 - \theta_{12})} x \quad (23)$$

As the Gaussian angular divergence Δinput increases, the path length uncertainty ΔPL can become dominated by the angular resolution uncertainty Δangular. In some examples, the spatial resolution uncertainty can contribute to more than half of the path length uncertainty ΔPL. In some examples, the system can be configured with a range of collection angles of 50° with 5-10 angle bins.

The tilt of the optics can be configured based on the collection efficiency, which can affect measurement accuracy and the power consumption of the system. By tilting (i.e., orienting the axis) of the optics such that the collection direction is parallel to the axis of incident light (i.e., the collection direction faces incident light direction), the collection efficiency can be increased. For example, the axis of incident light can be at 45°, and the collection direction can be at −45°. In some examples, the tilt of the optics can be based on the range of collection angles. For example, the collection angles can range from 0° to −75°, and the collection direction can be at −37.5°. In some examples, the collection angles can range from −25° to −70°, and the collection direction can be at −47.5°. In some examples, the collection angles can range from −30° to −60°, and the collection direction can be at −45°. In some examples, the optics can include a convex surface, which can be tilted (or decentered) to account for any asymmetry (i.e., bias) in the range of collection angles. Compensating for any asymmetry can reduce the magnitude or effects of the optical aberrations of the optics. In some examples, all the optics can be tiled in the same direction from normal incidence.

In addition to optics, the system performance can be affected by the properties of one or more other components included in the system. In some examples, the system can include a spacer located between the optics unit and the optical platform. In some examples, the optics unit and optical platform can include single-crystal Silicon. In some examples, the light sources, optical traces, or both can include silicon waveguides formed on the optical platform. In some examples, the ROIC coupled to the detector can be fabricated on silicon. By configuring one or more of the optics unit, optical platform, and ROIC to include silicon, the thermal expansion of the components can be similar, which can minimize any mechanical weaknesses, and the robustness of the system can be improved. Additionally, silicon can be a material with many desirable properties, such as good mechanical strength, good thermal conductance, low cost, and good reliability.

Figure 13A:
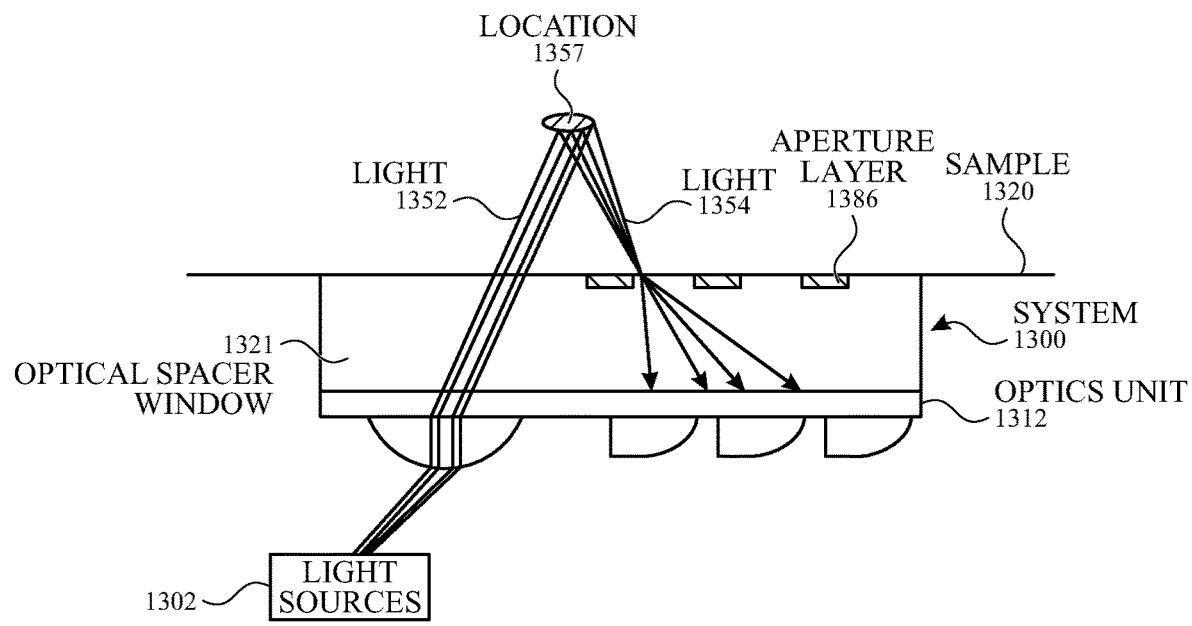
FIG. 13A illustrates a cross-sectional view of an exemplary system including an optical spacer window and aperture layer located between the optics unit and the sample according to examples of the disclosure.

In some examples, the system can include an optical spacer window located between the optics and the sample. FIG. 13A illustrates a cross-sectional view of an exemplary system including an optical spacer window and aperture layer located between the optical spacer window and the sample according to examples of the disclosure. System 1300 can include light sources 1302, optics unit 1312, aperture layer 1386, and optical spacer window 1321, where optical spacer window 1321 can be in contact with sample 1320. Light sources 1302 can emit light 1352 exiting sample 1320. Light, referred to as light 1354, can reflect off location 1357 within sample 1320, can be transmitted through aperture layer 1386, and can reach optics unit 1312.

Figure 13B:
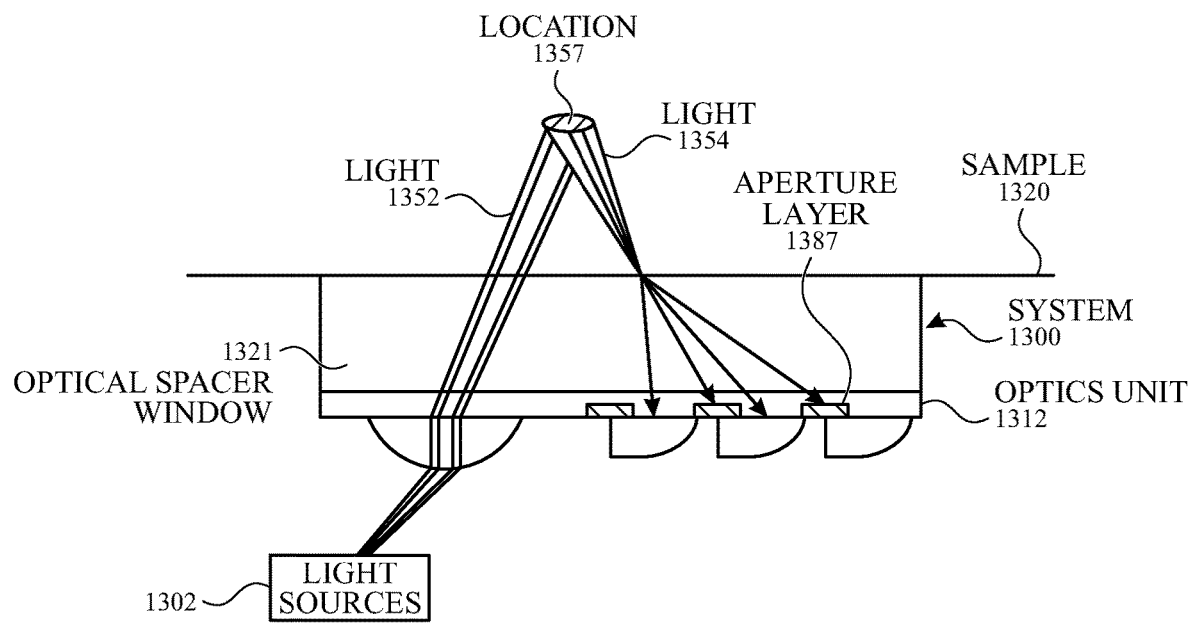
FIG. 13B illustrates a cross-sectional view of an exemplary system including an optical spacer window located between the optics unit and the sample according to examples of the disclosure.

As illustrated in FIG. 13A, placement of aperture layer 1386 can lead to stray light generated by scattering at the edge interfaces and optical aberrations, which could degrade the imaging properties of optics unit 1312. FIG. 13B illustrates a cross-sectional view of an exemplary system including an optical spacer window and aperture layer located between the optical spacer window and the optics unit according to examples of the disclosure. With aperture layer 1387 located between optical spacer window 1321 and optics unit 1312, light rays light 1354 can propagate to the appropriate optics included in optics unit 1312 and stray light generated by scattering at the edge interfaces can be reduced or eliminated.

In some examples, optical spacer window 1321 can be multi-functional and can be configured to provide mechanical support to the optics. The thickness of optics unit 1312 can be configured based on the amount of light bending performed by optics unit 1312 and the ability to separate different angles of refraction. As the thickness of optics unit 1312 decreases, the performance of optics unit 1312 increases. However, a decrease in thickness of the optics unit 1312 can lead to an optics unit that is fragile, costly, and can require complicated fabrication schemes with low yields. The system can be configured such that the optical spacer window 1321 compensates for the fragility of a thin optics unit 1312 without compromising optical performance. In some examples, the thickness of optical spacer window 1321 can be between 400-700 μm. In some examples, the thickness of optical spacer window 1321 can be 650 μm.

In some examples, optical spacer window 1321 can be configured with a thickness such that thermal crossover effects between sample 1320 and the active components (e.g., detector, light source, and electronics) can be reduced. The active components can generate heat and can also be sensitive to any temperature fluctuations, and the temperature of sample 1320 can vary or can be different from the operating temperature of the active components. As a result, a difference in temperature of sample 1320 and operating temperature of the active components can lead to thermal crossover effects, which can degrade the measurement accuracy. In some examples, sample 1320 can be skin, for which any difference in temperature can cause discomfort if the thermal crossover effects are not otherwise mitigated.

In some examples, optical spacer window 1321 can include an intermediate coating (i.e., a dielectric material with a refractive index between the refractive index of sample 1320 and the refractive index of optics unit 1312). Without an intermediate coating, optics unit 1312 or any anti-reflection coating disposed on optics unit 1312 would be configured such that a high refractive index contrast between optics unit 1312 and sample 1320 would result or the angle of refraction in the system would be compromised. The inclusion of an intermediate coating, on the other hand, can reduce the complexity and increase the angle of refraction in the system.

In some examples, optical spacer window 1321 can include a dielectric material. In some examples, the dielectric material can have higher chemical durability, higher physical durability, or both compared to the optics. In some examples, optical spacer window 1321 can include sapphire. By including an optical spacer window between the optics and the sample, the system can have enhanced mechanical robustness, enhanced device durability, and reduced thermal crossover.

Figure 14A:
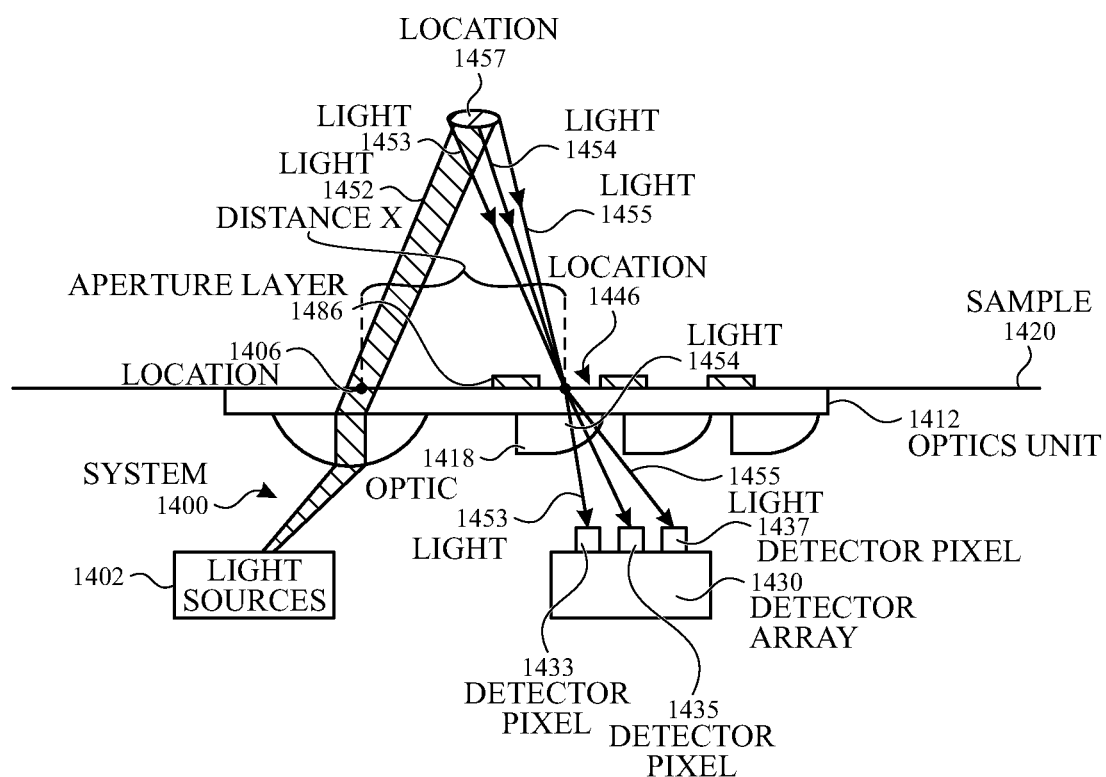
FIG. 14A illustrates a cross-sectional view of an exemplary system excluding an optical spacer window and corresponding determination of the lateral position of light incident at the exterior interface of the system (e.g., interface where the system contacts the sample) according to examples of the disclosure.

The inclusion of optical spacer window 1321 can alter the manner in which light is distributed among the optics and detector pixels in the detector array. However, this alteration can be accounted for and light incident on the detector array can still allow each detector pixel to describe a trajectory or optical path in the sample. FIG. 14A illustrates a cross-sectional view of an exemplary system excluding an optical spacer window and corresponding determination of the lateral position of light incident at the exterior interface of the system (e.g., interface where the system contacts the sample) according to examples of the disclosure. System 1400 can include light sources 1402, optics unit 1412, aperture layer 1486, and detector array 1430. Light sources 1402 can emit light 1452 exiting sample 1420 at location 1406. Light 1453, light 1454, and light 1455 can reflect off location 1457 within sample 1420 and can be incident on the exterior interface of the system (e.g., interface where the system contacts the sample) at location 1446, which can be located a distance x away from location 1406. Light 1453, light 1454, and light 1455 can transmit through aperture layer 1486 and can reach optic 1418 included in optics unit 1412. Detector array 1430 can include detector pixel 1433, detector pixel 1435, and detector pixel 1437. Light 1453 can be incident on detector pixel 1433, light 1454 can be incident on detector pixel 1435, and light 1455 can be incident on detector pixel 1437. Therefore, optic 1418, detector pixel 1433, detector pixel 1435, and detector pixel 1437 can be associated with location 1446. In this manner, the lateral position of incident light at the exterior interface of the system (e.g., interface where the system contacts the sample) can be associated with the optics included in the optics unit.

Figure 14B:
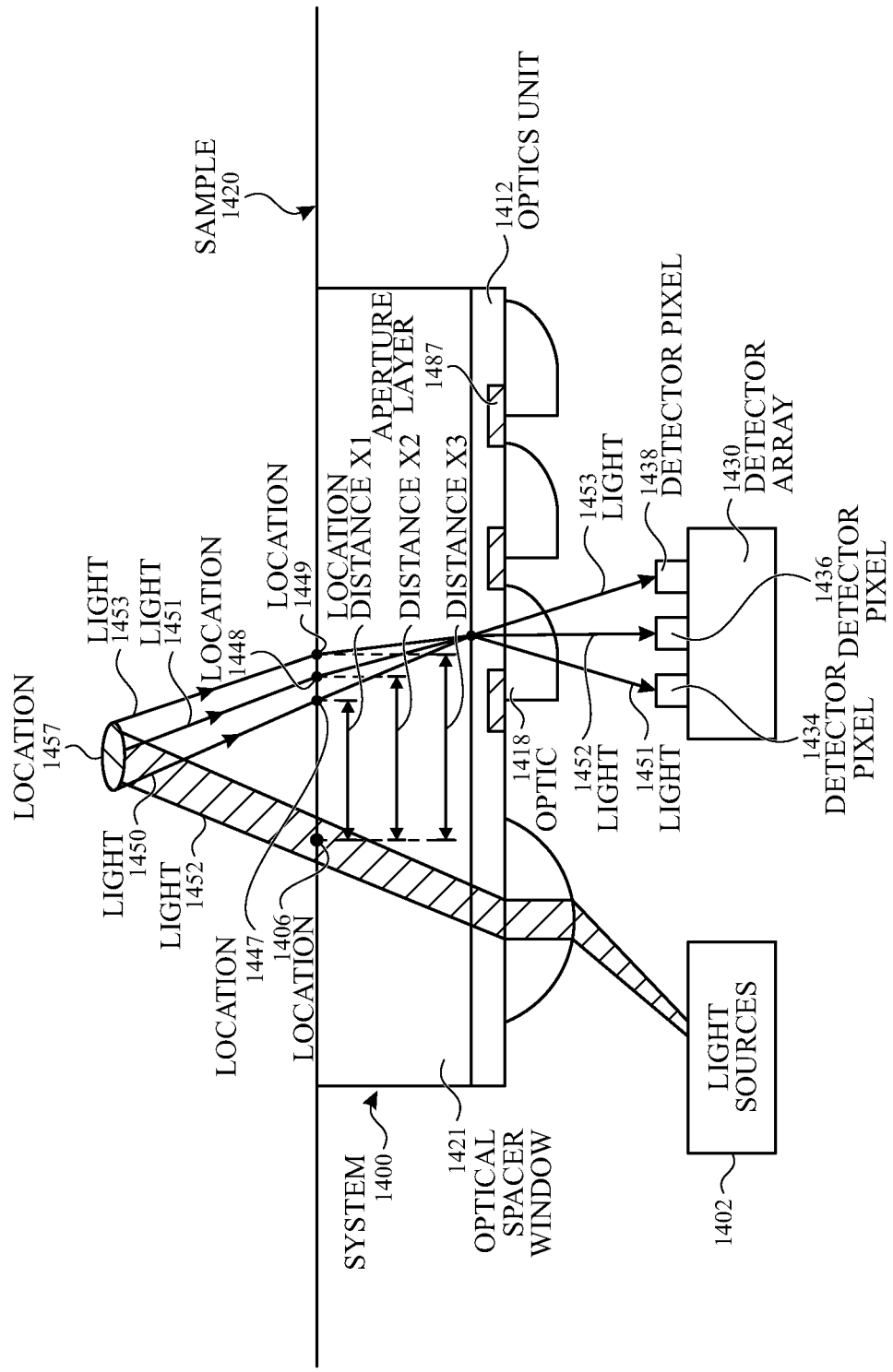
FIGS. 14B-14C illustrate cross-sectional views of an exemplary system including an optical spacer window and corresponding determination of the lateral position of light incident at the exterior interface of the system (e.g., interface where the system contacts the sample) according to examples of the disclosure.

Inclusion of the optical spacer window can lead to a determination of the lateral position of incident light at the exterior interface of the system (e.g., interface where the system contacts the sample) based on both the optics included in the optics unit and the detector pixel included in the detector array. FIG. 14B illustrates a cross-sectional view of an exemplary system including an optical spacer window and corresponding determination of the lateral position of light incident at the exterior interface of the system (e.g., interface where the system contacts the sample) according to examples of the disclosure. System 1490 can include light sources 1402, optics unit 1412, aperture layer 1487, optical spacer window 1421, and detector array 1430. Light sources 1402 can emit light 1452 exiting system 1490 at location 1406. Light 1452, light 1451, and light 1453 can reflect off location 1457 within sample 1420, can transmit through aperture layer 1487, and can travel through optical spacer window 1421. In some examples, the scattering angles of light 1452, light 1451, and light 1453 can be different. Sample 1420 can include a plurality of locations, such as location 1447, location 1448, and location 1449 at the exterior interface of the system (e.g., interface where the system contacts the sample). Location 1447 can be located a distance $x_1$ away from location 1406, location 1448 can be located a distance $x_2$ away from location 1406, and location 1449 can be located a distance $x_3$ away from location 1406. Light 1452 can be incident at location 1447, light 1451 can be incident at location 1448, and light 1453 can be incident at location 1449. Detector array 1430 can include detector pixel 1434, detector pixel 1436, and detector pixel 1438. Light 1452 can be incident on detector pixel 1434. Similarly, light 1451 and light 1453 can be incident on detector pixel 1436 and detector pixel 1438, respectively. Detector pixel 1434 can be associated with location 1447, detector pixel 1436 can be associated with location 1448, and detector pixel 1438 can be associated with location 1449. Each location (e.g., location 1447, location 1448, and location 1449) can have a different lateral position, which can be associated with a different scattering angle. In this manner, the lateral position of incident light at the exterior interface of the system (e.g., interface where the system contacts the sample) can be associated with both the optics included in the optics unit and the detector pixel included in the detector array.

Figure 14C:
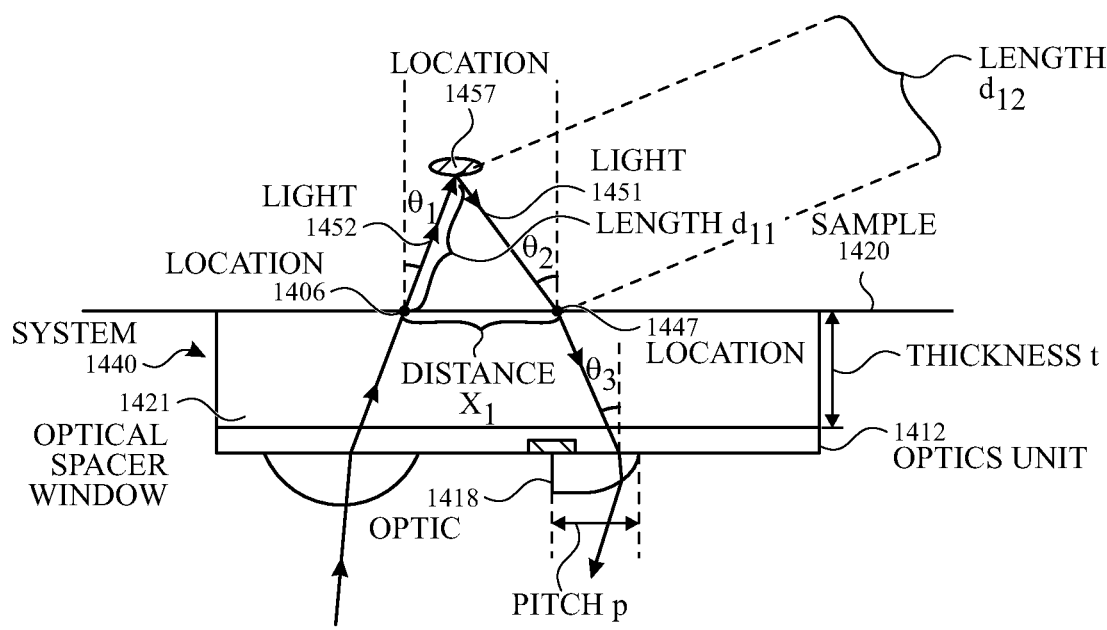

To determine the association of the optics and detector pixel to the lateral position of incident light at the exterior interface of the system (e.g., interface where the system contacts the sample) and the path length of the optical path, the exemplary system with optical spacer window can be simplified, as illustrated in FIG. 14C. The angle of light exiting system 1450 at location 1406 can be referred to as exiting angle $\theta_1$, and the angle of scattered light 1451 from location 1457 can be referred to as scattering angle $\theta_2$. The scattering angle $\theta_2$ can be defined as:

$$\theta_2 = \frac{\theta_{CA1} + (j-1)(\theta_{CA2} - \theta_{CA1})}{j} \tag{24}$$

where $\theta_1$ and $\theta_2$ are the range of collection angles and j represents the $j^{th}$ detector pixel included in the detector array. The corresponding angle of incidence at the spacer-optics unit interface $\theta_3$ can be defined as:

$$\theta_3 = \sin^{-1}\left(\frac{n_{sample}}{n_{spacer}}\sin\theta_2\right) \tag{25}$$

where $n_{sample}$ is the refractive index of sample 1420 and $n_{spacer}$ is the refractive index of optical spacer window 1421. The distance between location 1447 and the center of optic 1418 can be defined as:

$$\delta(j) = t \times \tan(\theta_3) \tag{26}$$

where t is the thickness of optical spacer window 1421. The distance $x_i$ (i.e., lateral position of light) can be defined as:

$$x_1(j, m) = (m-1) \times p + \frac{p}{2} - \delta(j) \tag{27}$$

where m represents the m$^{th}$ optics in the optics unit 1412 and p is the pitch of optic 1418. The optical path length PL(j,m) of a light ray can be defined as:

$$PL(j,m) = d_{11} + d_{12} = \left( \frac{\sin(90° - \theta_2)}{\sin(\theta_1 + \theta_2)} + \frac{\sin(90° - \theta_1)}{\sin(\theta_1 + \theta_2)} \right) x_1(j,m) \quad (28)$$

where $d_{11}$ is the path length of light 1452 and $d_{12}$ is the path length of light 1451.

For example, optic 1418 can be configured with a range of collection angles $\theta_{CA2}$ equal to 75° and $\theta_{CA1}$ equal to 25°, and optics included in optics unit 1412 can be configured with a pitch of 150 μm. Optical spacer window 1421 can be configured to include sapphire, which has a refractive index of 1.74, and can be configured with a thickness of 500 μm. Optical spacer window 1421 can be in contact with the sample, which can have a refractive index of 1.4 The detector array can be configured with 10 detector pixels coupled to the same optics in optics unit 1412. The exiting angle $\theta_1$ can be 45°, which can lead to scattering of a light ray with a scattering angle of 45°. The refractive index difference between optical spacer window 1421 and sample 1420 can lead the light ray being incident on the 8$^{th}$ optics in optics unit 1412 with angle of incidence $\theta_3$ at the optical spacer window-optics unit interface to be equal to 34.7° at a distance 8 of 346 μm. The lateral position of the light ray $x_1(j,m)$ can be equal to 779 μm, and the optical path length of the light ray can be 1.1 mm.

Figure 14D:
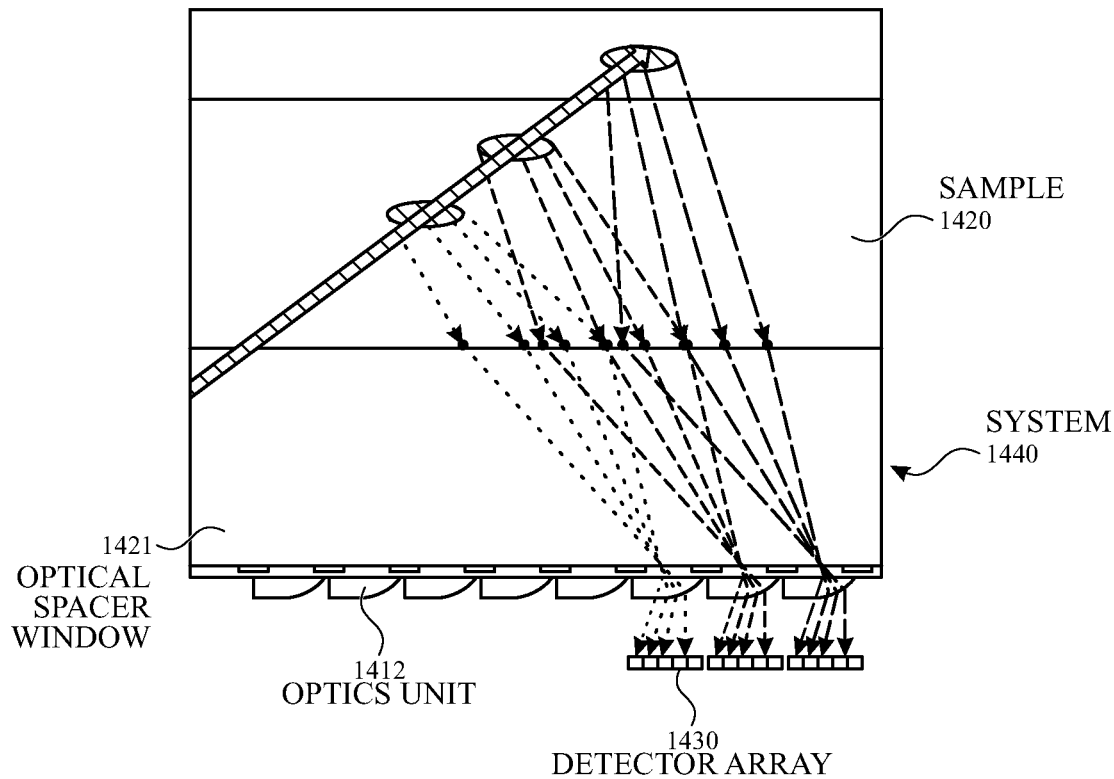
FIGS. 14D-14E illustrate cross-sectional views of an exemplary system including an optical spacer window according to examples of the disclosure.
Figure 14E:
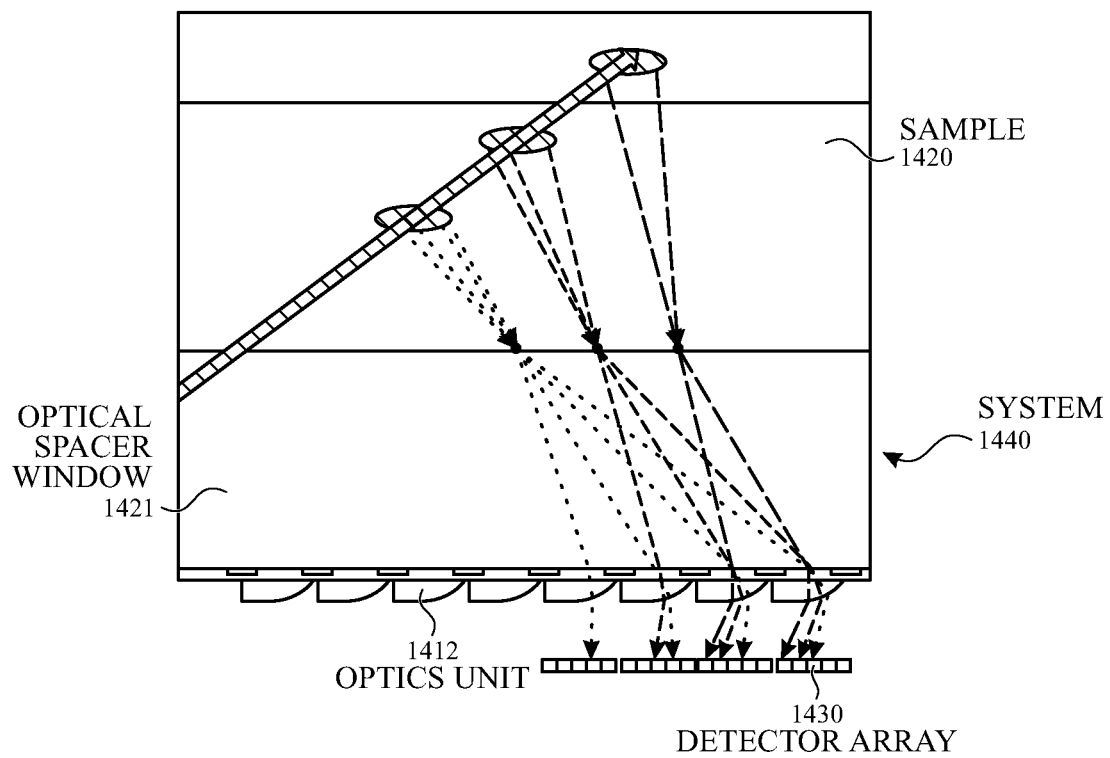

FIGS. 14D-14E illustrate cross-sectional views of an exemplary system including an optical spacer window according to examples of the disclosure. As illustrated in FIG. 14D, the inclusion of the optical spacer window in the system can allow a single optics in the optics unit to collect a range of scattering angles. The range of (different) scattering angles can lead to different locations, together forming a range length, on the exterior interface of the system (e.g., interface where the system contacts the sample) that the light rays are incident upon. In some examples, the thickness of the optical spacer window can be configured based on the total range length. The optics in the optics unit can collect light rays from interleaving portions of the sample, and as a result, the aggregate of the optics in the optics unit can collect multiple angles of incidence and exit location permutations without compromising loss of light rays or information.

As illustrated in FIG. 14E, the inclusion of the optical spacer in the system can also allow a single location on the exterior interface of the system (e.g., interface where the system contacts the sample) to emit light into multiple optics the optics unit. Although the light rays and information can be mixed among multiple optics and multiple detector pixels, the sum total information can be the same.

One or more of the functions described above can be performed, for example, by firmware stored in memory and executed by a processor or controller. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

A system for reimaging a plurality of optical paths in a sample is disclosed. The system can comprise: one or more light sources, each light source configured to emit a first light and a second light, the first light incident on the sample and including the plurality of optical paths, and the second light incident on a reference; a modulator configured to alternate between modulating the first light and the second light; one or more optics units configured to collect at least a portion of a reflection of the first light incident on the sample; a detector array including a plurality of detector pixels and configured to detect at least a portion of the collected reflected first light; and logic configured to resolve at least one of optical path lengths and angles of incidence of the plurality of optical paths and configured to associate a detector pixel in the detector array with an optical path included in the plurality of optical paths. Additionally or alternatively, in some examples, the system further comprises: a plurality of units, each unit including: a launch region configured to reflect or absorb one or more wavelengths different from wavelengths of light emitted from the one or more light sources, a reference region configured to receive a reflection of the second light, and a measurement region including the one or more optics units, wherein each unit included the plurality of units is coupled to a measurement region of the sample. Additionally or alternatively, in some examples, the reference region includes one or more negative lenses configured to spread out the reflection of the second light. Additionally or alternatively, in some examples, each unit is separated from another unit by at least 2 mm. Additionally or alternatively, in some examples, at least one unit included in the plurality of units includes at least a portion of the measurement region shared by another unit included in the plurality of units. Additionally or alternatively, in some examples, each unit includes at least one of the one or more light sources, and at least one unit is configured to measure a region on the sample with a diameter or perimeter less than or equal to 2 mm, the region on the sample including at least 70% of the reflection of the first light. Additionally or alternatively, in some examples, a first surface of at least one of the one or more optics units is flat and in contact with a surface of the sample, and a second surface of the at least one of the one or more optics unit is convex. Additionally or alternatively, in some examples, the system further comprises a spacer located between the one or more optics units and the sample. Additionally or alternatively, in some examples, the spacer includes sapphire. Additionally or alternatively, in some examples, the spacer has a thickness between 400-700 microns. Additionally or alternatively, in some examples, the system further comprises an aperture layer located between the spacer and the one or more optics units. Additionally or alternatively, in some examples, the system further comprises an aperture layer configured to provide the one or more optics units with access to one or more optical paths with a path length in a first range of path lengths and an angle of incidence in a first range of angles, and further configured to reject one or more optical paths with a path length in a second range of path lengths, different from the first range of path lengths, having an angle of incidence in a second range of angles, different from the first range of angles. Additionally or alternatively, in some examples, the aperture layer is located on a same layer as at least the one or more optics units. Additionally or alternatively, in some examples, the one or more optics units include a plurality of recessed optics. Additionally or alternatively, in some examples, the system further comprises a junction located between the one or more light sources and the sample and further located between the one or more light sources and the reference, the junction configured to split light emitted from the one or more light sources into the first light and the second light, an intensity of the first light being greater than an intensity of the second light. Additionally or alternatively, in some examples, the system further comprises: a first outcoupler including a bridge, the first outcoupler configured to receive and redirect the first light towards the sample; and a second outcoupler including a bridge, the second coupler configured to receive and redirect the second light towards the reference. Additionally or alternatively, in some examples, the system further comprises one or more optics coupled to the first outcoupler and the sample, a first surface of the one or more optics in contact with a surface of the first outcoupler. Additionally or alternatively, in some examples, the system further comprises at least one of one or more integrated tuning elements, one or more multiplexers, optical routing, one or more waveguides, and integrated circuitry included in a silicon-photonics chip. Additionally or alternatively, in some examples, a beam size of at least one of the one or more light sources is between 100-300 microns. Additionally or alternatively, in some examples, a thickness of at least one of the one or more optics units is between 100-300 microns. Additionally or alternatively, in some examples, the system is included in a package with a size less than 1 cm$^3$.

A system is disclosed. The system can comprise: one or more light sources, each light source configured to emit a first light and a second light, the first light directed toward an exterior interface of the system and including a plurality of optical paths, and the second light incident on a reference; one or more first optics configured to collect at least a portion of a reflection of the first light incident on the sample and change an angle of the first light; one or more second optics configured to receive the first light from the one or more first optics and focus the first light to a detector array; and the detector array including a plurality of detector pixels and configured to detect at least a portion of the focused first light from the one or more second optics. Additionally or alternatively, in some examples, the system further comprises: a plurality of groups, each group including: a launch region configured to reflect or absorb one or more wavelengths different from wavelengths of light emitted from the one or more light sources, a reference region configured to receive a reflection of the second light, and a measurement region including the one or more first optics. Additionally or alternatively, in some examples, each group includes one launch region, one reference region, and a plurality of measurement regions. Additionally or alternatively, in some examples, at least one group shares at least a portion of the measurement region with another group. Additionally or alternatively, in some examples, a first surface of at least one first optic is flat and located at the exterior interface of the system, and a second surface of the at least one optic is convex. Additionally or alternatively, in some examples, the system further comprises: an aperture layer configured to allow one or more first optical paths to pass through to the one or more first optics, the one or more second optics, or both, the one or more first optical paths having a path length in a first range of path lengths, wherein the aperture layer is further configured to reject one or more second optical paths with a path length in a second range of path lengths, different from the first range of path lengths. Additionally or alternatively, in some examples, the system further comprises an aperture layer configured to allow one or more first optical paths to pass through to the one or more first optics, the second layer of optics, or both, the one or more first optical paths having an angle of incidence in a first range of angles, wherein the aperture layer is further configured to reject one or more second optical paths having an angle of incidence in a second range of angles, different from the first range of angles. Additionally or alternatively, in some examples, the system further comprises: a junction located between the one or more light sources and the exterior interface of the system, wherein the junction is further located between the one or more light sources and the reference, and wherein the junction is configured to split light emitted from the one or more light sources into the first light and the second light, wherein an intensity of the first light is greater than an intensity of the second light. Additionally or alternatively, in some examples, the system further comprises: a first outcoupler including a bridge, the first outcoupler configured to receive and redirect the first light towards the exterior interface of the system; and a second outcoupler including a bridge, the second coupler configured to receive and redirect the second light towards the reference. Additionally or alternatively, in some examples, the system further comprises one or more third optics coupled to the first outcoupler and the exterior interface of the system, wherein a first surface of the one or more third optics is in contact with a surface of the first outcoupler. Additionally or alternatively, in some examples, the system further comprises at least one of one or more integrated tuning elements, one or more multiplexers, optical routing, one or more waveguides, and integrated circuitry, wherein the one or more integrated tuning elements are included in a silicon-photonics chip. Additionally or alternatively, in some examples, each detector pixel is associated with a first optic and a second optic. Additionally or alternatively, in some examples, each first optic is associated with a second optic and a plurality of the plurality of detector pixels. Additionally or alternatively, in some examples, the one or more first optics includes material different from material included in the one or more second optics.

An optical system for determining one or more properties of a sample is disclosed. In some examples, the optical system comprises: a first optics unit disposed on a first substrate and configured for receiving and redirecting a reflection of a first light incident on the sample, the first optics unit including a plurality of first optics, each first optics coupled to a detector pixel included in a detector array and an optical path included in the plurality of optics paths. Additionally or alternatively, in some examples, a surface of the first optics unit is in contact with a surface of the sample and is further configured for focusing the reflection of the first light towards a surface of the detector array. Additionally or alternatively, in some examples, the plurality of first optics is configured with a tilt oriented in a same direction relative to normal incidence. Additionally or alternatively, in some examples, the system further comprises a second optics unit disposed on a second substrate and configured for receiving and focusing the first light from the first optics unit, the second optics unit including a plurality of second optics, each second optics coupled to a first optics included in the first optics unit. Additionally or alternatively, in some examples, the first optics unit is attached to the second optics unit through a plurality of mechanical registration features formed on the first optics unit, the second optics unit, or both. Additionally or alternatively, in some examples, each first optics includes a prism and is configured to have one or more properties different from other first optics. Additionally or alternatively, in some examples, at least one of the first optics includes silicon. Additionally or alternatively, in some examples, each first optics is coupled to a plurality of detector pixels included in a detector array. Additionally or alternatively, in some examples, at least one of the plurality of first optics is configured with a range of collection angles equal to 50° and configured with 5-10 angle bins. Additionally or alternatively, in some examples, at least one of the plurality of first optics is configured with a range of collection angles centered at 45°.

An optical system is disclosed. The optical system can comprise: one or more first optics disposed on a first substrate and configured for receiving and redirecting a first light; one or more second optics disposed on a second substrate and configured for receiving the first light from the one or more first optics, the one or more second optics further configured to focus the received first light; and an aperture layer including one or more openings, the aperture layer configured to allow a first portion of incident light to pass through and to prevent a second portion of the incident light from passing through, wherein the aperture layer is located on a same layer as the one or more first optics or the one or more second optics. Additionally or alternatively, in some examples, the aperture layer allows the first portion of incident light to pass through based on an angle of incidence of the incident light. Additionally or alternatively, in some examples, the aperture layer allows the first portion of incident light to pass through based on a path length. Additionally or alternatively, in some examples, the system further comprises: a second aperture layer located on a same layer as the one or more second optics, wherein the first aperture layer is located on a same layer as the one or more first optics. Additionally or alternatively, in some examples, the aperture layer is a lithographic pattern disposed on a surface of the one or more first optics or the one or more second optics. Additionally or alternatively, in some examples, the system further comprises: a third optic located on a same layer as the one or more second optics, wherein the third optic is configured to receive light from a first surface of the system and direct light to a second surface of the system, wherein the one or more first and second optics are configured to receive the first light from the second surface of the system.

A method of determining one or more properties of a sample is disclosed. In some examples, the method comprises: determining a first angle of incidence of a first light at a first interface, the first interface including the sample and a spacer, the first light emitted from a light source; determining a second angle of incidence of a second light at the first interface, the second light being a reflection of the first light and including a first information; determining a third angle of incidence of a third light at the a second interface, the second interface including the spacer and one or more optics units; and determining a path length of an optical path based on the first, second, and third angles of incidence. Additionally or alternatively, in some examples, the system further comprises: determining a fourth angle of incidence of a fourth light at the first interface, the fourth light being a reflection of the first light originating from a same location in the sample as the second light originates from and includes a second information, wherein the second light is incident at a first location along the first interface and the fourth light is incident at a second location along the second interface, the second location different from the first location, further wherein the second and fourth light are collected by a first optics; and determining a third information based on an aggregate of the first and second information. Additionally or alternatively, in some examples, the method further comprises: determining a fourth angle of incidence of a fourth light at the first interface, the fourth light being a reflection of the first light originating from a same location in the sample as the second light originates from and includes a second information, wherein the second light and fourth light are incident at a first location along the first interface and incident at a second location along the second interface, further wherein the second light and fourth light are collected by different optics included in the one or more optics units; and determining a third information based on an aggregate of the first and second information. Additionally or alternatively, in some examples, the method further comprises: associating the optical path with a optics included in the one or more optics units and a detector pixel included in a detector array, wherein determining the path length of the optical path is further based on a range of collection angles of the optics and a thickness of the spacer. Additionally or alternatively, in some examples, the optical path is included in a plurality of optical paths, each optical path having a set of information, the set of information including a path length, an angle of incidence, and a location in the sample, wherein each set of information is different from other sets of information included in the plurality of optical paths.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A system comprising:
   one or more light sources that emit a first light and a second light, the first light directed toward an exterior interface of the system and including a plurality of optical paths, and the second light incident on a reference;
   one or more first optics that collect at least a portion of a reflection of the first light and change an angle of the first light;
   one or more second optics configured to receive the first light from the one or more first optics and focus the first light to a detector array; and
   the detector array including a plurality of detector pixels that detect at least a portion of the focused first light from the one or more second optics.

2. The system of claim 1, further comprising:
a plurality of groups, each of the plurality of groups including:
a launch region configured to reflect or absorb one or more wavelengths different from wavelengths of light emitted from the one or more light sources,
a reference region that receives a reflection of the second light, and
a measurement region including the one or more first optics.

3. The system of claim 2, wherein each group includes one launch region, one reference region, and a plurality of measurement regions.

4. The system of claim 2, wherein at least one group shares at least a portion of the measurement region with another of the plurality of groups.

5. The system of claim 1, wherein a first surface of at least one of the one or more first optics is flat and located at the exterior interface of the system, and a second surface of the at least one of the one or more second optics is convex.

6. The system of claim 1, further comprising:
an aperture layer configured to allow one or more first optical paths to pass through to the one or more first optics, the one or more second optics, or both, the one or more first optical paths having a path length in a first range of path lengths,
wherein the aperture layer is further configured to reject one or more second optical paths with a path length in a second range of path lengths, different from the first range of path lengths.

7. The system of claim 1, further comprising:
an aperture layer configured to allow one or more first optical paths to pass through to the one or more first optics, the one or more second optics, or both, the one or more first optical paths having an angle of incidence in a first range of angles,
wherein the aperture layer rejects one or more second optical paths having an angle of incidence in a second range of angles, different from the first range of angles.

8. The system of claim 1, further comprising:
a junction located between the one or more light sources and the exterior interface of the system,
wherein the junction is further located between the one or more light sources and the reference, and
wherein the junction is configured to split light emitted from the one or more light sources into the first light and the second light, wherein an intensity of the first light is greater than an intensity of the second light.

9. The system of claim 1, further comprising:
a first outcoupler including a bridge, the first outcoupler positioned to receive and redirect the first light towards the exterior interface of the system; and
a second outcoupler including a bridge, the second outcoupler positioned to receive and redirect the second light towards the reference.

10. The system of claim 9, further comprising one or more third optics coupled to the first outcoupler and the exterior interface of the system, wherein a first surface of the one or more third optics is in contact with a surface of the first outcoupler.

11. The system of claim 1, further comprising at least one of one or more integrated tuning elements, one or more multiplexers, optical routing, one or more waveguides, and integrated circuitry, wherein the one or more integrated tuning elements are included in a silicon-photonics chip.

12. The system of claim 1, wherein each detector pixel is associated with at least one of the one or more first optics and at least one of the one or more second optics.

13. The system of claim 1, wherein each of the one or more first optics is associated with at least one of the one or more second optics and at least two of the plurality of detector pixels.

14. The system of claim 1, wherein the one or more first optics includes material different from material included in the one or more second optics.

15. A method of operating a system, the method comprising:
emitting light using one or more light sources, wherein the light includes a first light and a second light;
directing the first light towards an exterior interface of the system;
directing the second light towards a reference;
collecting at least a portion of a reflection of the first light using one or more first optics;
changing an angle of the first light using the one or more first optics;
focusing the first light to a detector array using one or more second optics; and
detecting at least a portion of the focused first light from the one or more second optics using the detector array.

16. The method of claim 15, further comprising:
splitting the light into the first light and the second light using a junction, wherein an intensity of the first light is greater than an intensity of the second light.

17. The method of claim 15, wherein the system includes a plurality of groups, the plurality of groups including a first group comprising a first launch region, a first reference region, and a first measurement region,
wherein the one or more first optics and the one or more second optics are associated with the first group,
wherein the first light is associated with the first launch region, the second light is associated with the first reference region, and the portion of the reflection of the first light is associated with the first measurement region.

18. The method of claim 17, wherein the detector array receives the portion of the focused first light from the plurality of groups.

19. The method of claim 15, further comprising:
allowing one or more first optical paths to pass through to the one or more first optics, the one or more second optics, or both, using an aperture layer, wherein the one or more first optical paths have a path length in a first range of path lengths; and
rejecting one or more second optical paths with a path length in a second range of path lengths, wherein the second range of path lengths is different from the first range of path lengths.

20. The method of claim 15, further comprising:
allowing one or more first optical paths to pass through to the one or more first optics, the one or more second optics, or both, using an aperture layer, wherein the one or more first optical paths have an angle of incidence in a first range of angles; and
rejecting one or more second optical paths with an angle of incidence in a second range of angles, wherein the second range of angles is different from the first range of angles.

* * * * *